(12) United States Patent
Jakubowski et al.

(10) Patent No.: US 11,390,696 B2
(45) Date of Patent: *Jul. 19, 2022

(54) CONTROL OVER CONTROLLED RADICAL POLYMERIZATION PROCESSES

(71) Applicant: Pilot Polymer Technologies, Inc., Pittsburgh, PA (US)

(72) Inventors: Wojciech Jakubowski, Sugar Land, TX (US); James Spanswick, Pittsburgh, PA (US)

(73) Assignee: Pilot Polymer Technologies, Inc., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/525,289

(22) Filed: Jul. 29, 2019

(65) Prior Publication Data

US 2019/0352435 A1 Nov. 21, 2019

Related U.S. Application Data

(63) Continuation of application No. 15/824,819, filed on Nov. 28, 2017, now abandoned, which is a continuation of application No. 14/666,946, filed on Mar. 24, 2015, now Pat. No. 9,856,331, which is a continuation of application No. 14/459,871, filed on Aug. 14, 2014, now Pat. No. 9,546,225, which is a continuation of application No. 12/926,780, filed on Dec. 8, 2010, now Pat. No. 8,822,610, which is a continuation-in-part of application No. 12/653,937, filed on Dec. 18, 2009, now Pat. No. 8,815,971.

(60) Provisional application No. 61/203,387, filed on Dec. 22, 2008.

(51) Int. Cl.
| | |
|---|---|
| *C08F 2/38* | (2006.01) |
| *C08F 4/00* | (2006.01) |
| *C08F 4/40* | (2006.01) |
| *C08F 2/00* | (2006.01) |
| *C08F 4/04* | (2006.01) |
| *C08F 4/50* | (2006.01) |

(52) U.S. Cl.
CPC ............... *C08F 2/38* (2013.01); *C08F 2/001* (2013.01); *C08F 4/00* (2013.01); *C08F 4/04* (2013.01); *C08F 4/40* (2013.01); *C08F 4/50* (2013.01); *C08F 2400/02* (2013.01); *C08F 2438/01* (2013.01); *C08F 2438/03* (2013.01)

(58) Field of Classification Search
CPC .................................................. C08F 2438/03
See application file for complete search history.

(56) References Cited

FOREIGN PATENT DOCUMENTS

| | | | | |
|---|---|---|---|---|
| CA | 2399690 A1 | * | 8/2001 | ........... C07C 329/16 |
| GB | 1043748 A | * | 9/1966 | .......... B01J 19/0013 |
| WO | WO-2008009997 A1 | * | 1/2008 | ................ C08F 2/38 |

OTHER PUBLICATIONS

Lowe et al. "Reversible addition-fragmentation chain transfer (RAFT) radical polymerization and the synthesis of water-soluble (co) polymers under homogeneous conditions in organic and aqueous media", Prog. Polym. Sci. 32 (2007) 283-351 (Year: 2007).*
Qi, "Synthesis of Novel RAFT Reagents Based on Carbazole and Application in RAFT Polymerization", Thesis of Tianjin University, Dec. 25, 2004 (Year: 2004).*
Translation of Qi, "Synthesis of Novel RAFT Reagents Based on Carbazole and Application in RAFT Polymerization", Thesis of Tianjin University, Dec. 25, 2004, received Sep. 2021 (Year: 2021).*
Synthesis and application of a novel RAFT reagent based on carbazole, Qi Guicun, Chinese Doctoral Dissertation & Master's Theses Full-text Database (Master) Engineering Science and Technology I, B016-142, No. 6, 2006, published on Jun. 15, 2006. (English Translation).

* cited by examiner

*Primary Examiner* — Nicole M. Buie-Hatcher
(74) *Attorney, Agent, or Firm* — Ulmer & Berne, LLP

(57) ABSTRACT

A procedure for improved temperature control in controlled radical polymerization processes is disclosed. The procedure is directed at controlling the concentration of the persistent radical in ATRP and NMP polymerizations procedures and the concentration of radicals in a RAFT polymerization process by feeding a reducing agent or radical precursor continuously or intermittently to the reaction medium through one of more ports.

18 Claims, 44 Drawing Sheets

Change of temperature inside the reactor

CONTROL OVER CONTROLLED RADICAL POLYMERIZATION PROCESSES

CROSS REFERENCE TO RELATED APPLICATIONS

This application is a continuation of U.S. patent application Ser. No. 15/824,819, filed Nov. 28, 2017, which is a continuation of U.S. patent application Ser. No. 14/666,946, filed Mar. 24, 2015, now U.S. Pat. No. 9,856,331, which is a continuation of U.S. patent application Ser. No. 14/459,871, filed Aug. 14, 2014, now U.S. Pat. No. 9,546,225, which is a continuation of U.S. patent application Ser. No. 12/926,780, filed Dec. 8, 2010, now U.S. Pat. No. 8,822,610, which is a continuation-in-part of U.S. patent application Ser. No. 12/653,937, filed Dec. 18, 2009, now U.S. Pat. No. 8,815,971, which claims the priority benefit of U.S. Provisional Patent App. Ser. No. 61/203,387 field Dec. 22, 2008, each of which is incorporated herein by reference.

TECHNICAL FIELD OF THE INVENTION

Three controlled radical polymerization (CRP) procedures are presently broadly utilized for the synthesis of high performance functional materials. They are: atom transfer radical polymerization (ATRP) inclusive of ARGET ATRP (Activators ReGenerated by Electron Transfer for Atom Transfer Radical Polymerization) and/or ICAR ATRP (Initiators for Continuous Activator Regeneration for Atom Transfer Radical Polymerization), reversible addition fragmentation transfer (RAFT) and nitroxide mediated polymerization (NMP). Procedures for improved levels of control over various CRP processes for radically (co)polymerizable monomers are disclosed. The improvements are focused on defining industrially scalable procedures with reduced environmental impact for the three CRP procedures. In the case of atom transfer radical polymerization (ATRP) the improved process is conducted in the presence of low parts per million of a transition metal catalyst complex and a high degree of control is attained by running the reaction under conditions of controlled addition/activation of a reducing agent/radical initiator. In the case of RAFT overall control is improved by conducting the reaction under conditions of controlled addition/activation of the radical initiator. The rate of polymerization in a nitroxide mediated polymerization (NMP) is controlled under conditions of controlled addition/activation of a radical initiator to control the concentration of the persistent radical.

BACKGROUND OF THE INVENTION

Many high-performance materials, particularly segmented copolymers or composite structures, require controlled synthesis of polymers from functional monomers employing well defined initiators. [*Macromolecular Engineering. Precise Synthesis, Materials Properties, Applications*; Wiley-VCH: Weinheim, 2007.] For optimal performance in many applications the materials also require controlled processing taking into account the size and topology of phase separated domains and the dynamics of testing response rates.

Access to well-defined block copolymers was opened by Szwarc in the 1950's [*Nature* 1956, 176, 1168-1169] by the development of living anionic polymerization. The biggest limitation of this technique is its sensitivity to impurities (moisture, carbon dioxide) and even mild electrophiles, which limits the process to a narrow range of monomers. The reaction medium and all components have to be extensively purified before polymerization, thus preparation of functional block copolymers or other well-defined polymeric materials in high purity can be challenging. Nevertheless, anionic polymerization, which was first implemented in an academic setting, was quickly adapted on an industrial scale and ultimately led to the mass production of several well-defined block copolymers, such as polystyrene-b-polybutadiene-b-polystyrene, performing as a thermoplastic elastomer. [*Thermoplastic Elastomers, 3rd Ed.*; Hanser: Munich, 2004]

The fast industrial adaptation of such a challenging technique may be explained by the fact that anionic polymerization was the first and, indeed only example of a living polymerization process for more than three decades, that allowed for the synthesis of previously inaccessible well defined high-performance materials from a very narrow selection of vinyl monomers. Nevertheless materials based on modified block copolymers with properties that were desired in many applications, were the main driving force for scaling up anionic polymerization processes. [Ionic Polymerization and Living Polymers; Chapman and Hall, New York, 1993, ISBN 0-412-03661-4.]

In late 1970's to early 1990's, living carbocationic polymerization was discovered and optimized. [*Adv. Polym. Sci.* 1980, 37, 1-144.] However this procedure is just as sensitive to impurities as anionic polymerization and the range of polymerizable monomers for both techniques was essentially limited to non-polar vinyl monomers.

While many earlier attempts were made to develop controlled radical polymerization (CRP) processes the critical advances were made in the mid 1990s. CRP can be applied to the polymerization of functional monomers and hence preparation of many different site specific functional (co)polymers under mild conditions became feasable. [*Materials Today* 2005, 8, 26-33 and *Handbook of Radical Polymerization*; Wiley Interscience: Hoboken, 2002.] From a commercial point of view, CRP processes can be conducted at convenient temperatures, do not require extensive purification of the monomers or solvents and can be conducted in bulk, solution, aqueous suspension, emulsion, etc. CRP allows the preparation of polymers with predetermined molecular weights, low polydispersity and controlled composition, and topology. Radical polymerization is much more tolerant of functional groups than ionic polymerization processes and a broader range of unsaturated monomers can be polymerized providing materials with site specific functionality. In addition, copolymerization reactions, which are generally challenging for ionic polymerizations due to large differences in reactivity ratios of monomers under ionic polymerization conditions, are easy to perform using radical based CRP. This provides an opportunity to synthesize polymeric materials with predetermined molecular weight (MW), low polydispersity (PDI), controlled composition, site specific functionalities, selected chain topology and composite structures that can be employed to incorporate bio- or inorganic species into the final product.

The three most studied, and commercially promising, methods of controlling radical polymerization are nitroxide mediated polymerization (NMP), [*Chemical Reviews* 2001, 101, 3661-3688] atom transfer radical polymerization (ATRP), [*J. Chem. Rev.* 2001, 101, 2921-2990; *Progress in Polymer Science* 2007, 32, 93-146.] and degenerative transfer with dithioesters via reversible addition-fragmentation chain transfer polymerization (RAFT). [*Progress in Polymer Science* 2007, 32, 283-351] Each of these methods relies on establishment of a dynamic equilibrium between a low concentration of active propagating chains and a predominant amount of dormant chains that are unable to propagate or terminate as a means of extending the lifetime of the propagating chains.

The simple four component atom transfer radical polymerization (ATRP) process, shown below in Scheme 1, was discovered by Matyjaszewski at Carnegie Mellon University and he and his coworkers have disclosed ATRP, and many improvements to the basic AIRY process which may be applicable to some or all of the embodiments herein, in a number of patents and patent applications [U.S. Pat. Nos. 5,763,546; 5,807,937; 5763548, 5,789,487; 5,945,491; 6,111,022; 6,121,371; 6,124,411; 6,162,882; 6,624,262; 6,407,187; 6,512,060; 6,627,314; 6,790,919; 7,019,082; 7,049,373; 7,064,166; 7,157,530 and U.S. patent application Ser. No. 09/534,827; International Publication WO 2007/025310 A1 and International Application Nos. PCT/US2004/009905; PCT/US2005/007264; PCT/US2005/007265; PCT/US2006/033152, PCT/US2006/033792 and PCT/US2006/048656], all of which are herein incorporated by reference in their entirety. Based on the number of publications, ATRP has emerged as the preferred process for controlled/living polymerization of radically (co)polymerizable monomers. Typically, an ATRP process comprises use of a transition metal complex that acts as a catalyst for the controlled polymerization of radically (co)polymerizable monomers from an initiator with one or more transferable atoms or groups. Suitable initiators are frequently substituted alkyl halides attached to a low molecular weight molecule with an additional non-initiating functionality, a low molecular weight initiator or macroinitiator with two or more transferable atoms or groups or a solid inorganic or organic material with tethered initiating groups. The transition metal catalyst participates in a repetitive redox reaction whereby the lower oxidation state transition metal complex ($M_t^n$/Ligand) homolytically removes a transferable atom or group from an initiator molecule or dormant polymer chain, $P_n$—X, to form the active propagating species, $P^{\bullet}_n$, in an activating reaction with a rate of activation $k_a$ which propagates at a rate $k_p$ before the higher oxidation state transition metal complex (X-$M_t^{n+1}$/Ligand) deactivates the active propagating species, $P^{\bullet}_n$, by donating back a transferable atom or group to the active chain end, rate $k_{da}$, not necessarily the same atom or group from the same transition metal complex (Scheme 1).

Scheme 1. General mechanism for the ATRP process

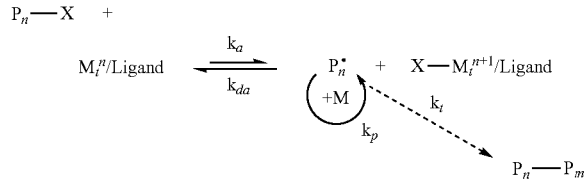

The catalyst is not bound to the chain end, as in coordination polymerization, and can therefore be used in a controlled/living polymerization process at sub-stoichiometric amounts relative to the initiator. Nevertheless, as a consequence of radical-radical termination reactions, proceeding with a rate=$k_t$ in Scheme 1, forming $P_n$—$P_m$ dead chains and an excess of X-$M_t^{n+1}$/Ligand.

Examples of the spectrum of new well-defined polymeric materials prepared using ATRP in the past decade include block copolymers, branched polymers, polymeric stars, brushes, and networks, each with pre-determinable site specific functionality as well as hybrids with inorganic materials or bio-conjugates. However, its widespread commercial utilization is still limited. [*Chem. Rev.* 2007, 107, 2270-2299.] Nevertheless, these custom fabricated materials have potential to improve the performance of a multitude of commercial products in the areas of personal care and cosmetics, detergents and surfactants, paints, pigments and coatings, adhesives, thermoplastic elastomers, biocompatible materials and drug delivery systems if a cost effective, environmentally benign, scalable process can be defined.

The initially defined normal ATRP process requires a high catalyst concentration, often approaching 0.1 M in bulk monomer polymerization reactions, typical concentrations range from 0.5% to 1 mol % vs. monomer, [*Handbook of Radical Polymerization*; Wiley Interscience: Hoboken, 2002] to overcome the effects of continuous buildup of ATRP's equivalent of the persistent radical (X-$M_t^{n+1}$/Ligand). [*Journal of the American Chemical Society* 1986, 108, 3925-3927 and *Macromolecules* 1997, 30, 5666-5672.] The high levels of catalyst employed in the initial ATRP reactions, even those involving more active catalyst complexes, were required to overcome the effects of unavoidable increase in the concentration of the higher oxidation state catalyst due to unavoidable radical-radical termination reactions. Since the final reactor product contained between 1,000 and 10,000 ppm of the transition metal complex, the resulting polymer has a strong color and could be mildly toxic. This level of catalyst has to be removed from the final polymer prior to use in most applications. The added production costs associated with adsorption or extraction of the catalyst in addition to isolation and recycle of organic solvents have slowed industrial acceptance of ATRP to produce materials desired by the marketplace. An additional problem of industrial relevance involves the use of the more recently developed highly active (i.e., very reducing) ATRP catalysts. Special handling procedures are often required to remove all oxygen and oxidants from these systems prior to addition of the rapidly oxidizable catalyst complex. The energy used in these purification process(es) and/or the need of rigorously deoxygenated systems contributes to the generation of chemical waste and adds cost. These are the major factors which constrain the commercial application of ATRP.

Recent advances in ATRP by the present inventors in conjunction with one of the inventors of ATRP, K. Matyjaszewski, has been disclosed in International Application No. PCT/US2006/048656, published as WO 2007/075817, hereby incorporated in their entirety by reference and further including incorporation of references disclosed therein to define the state of the art in ATRP and definitions for some of the language used herein. In that application, it was disclosed that the concentration of the catalyst used for an ATRP can be reduced to 1-100 ppm by addition of a reducing agent, or a free radical initiator, that acts throughout the reaction to continuously regenerate the lower oxidation state activator from accumulating higher oxidation state deactivator, Scheme 2. Some suitable reducing agents listed in incorporated references include; sulfites, bisulfites, thiosulfites, mercaptans, hydroxylamines, amines, hydrazine ($N_2H_4$), phenylhydrazine ($PhNHNH_2$), hydrazones, hydroquinone, food preservatives, flavonoids, beta carotene, vitamin A, α-tocopherols, vitamin E, propyl gallate, octyl gallate, BHA, BHT, propionic acids, ascorbic acid, sorbates, reducing sugars, sugars comprising an aldehyde group, glucose, lactose, fructose, dextrose, potassium tartrate, nitrites, nitrites, dextrin, aldehydes, glycine, and many antioxidants.

Scheme 2. Proposed mechanism for activator regenerated by electron transfer for atom transfer radical polymerization (ARGET ATRP).

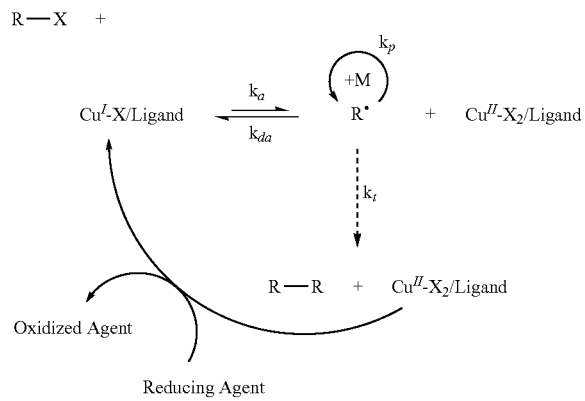

This improvement in ATRP was called ARGET ATRP because the Activator was continuously ReGenerated by Electron Transfer. In Scheme 2 the regeneration is conducted by addition of a reducing agent but the deactivator can also be reduced by addition of a free radical initiator in a process called ICAR (Initiators for Continuous Activator Regeneration) ATRP.

These novel initiation/catalyst reactivation procedures allow a decrease in the amount of catalyst needed to drive a controlled ATRP to high conversion from 10,000 ppm employed in classical ATRP to, in some cases, 10 ppm or less where catalyst removal or recycling would be unwarranted for many industrial applications.

Furthermore ARGET/ICAR ATRP processes can start with the oxidatively stable, easy to handle and store $Cu^{II}$ species, as it is reduced in situ to the $Cu^{I}$ state. Furthermore, the level of control in the disclosed ICAR/ARGET ATRP processes are essentially unaffected by an excess (still small amount compared to initiator) of the reducing agent to continuously regenerate the lower oxidation state activator when/if it is oxidized in the presence of limited amounts of air. [*Langmuir* 2007, 23, 4528-4531.]

Chain-end functionality in a normal ATRP may be lost by a combination of radical-radical termination reactions and by side reactions between growing radicals and the catalyst complex; $Cu^{I}$ (oxidation of radical to carbocation) or $Cu^{II}$ species (reduction of radical to carbanion). Therefore another important feature of the new ARGET/ICAR catalytic systems is the suppression/reduction of side reactions due to the use of a low concentration of the transition metal complex. Reduced catalyst-based side reactions in ICAR and ARGET ATRP allow synthesis of higher molecular weight polymers and polymers with higher chain-end functionality which may allow the preparation of pure, certainly purer, block copolymers.

It was envisioned to be a simple robust procedure.

In application PCT/US2006/048656 the re-activator was added to the reaction in a single addition and control was exerted over the reaction by continuous adjustment of $K_{ATRP}$ in the presence of excess reducing agent. Successful polymerization was achieved on the laboratory scale, 10-50 mL Schlenk flasks, for common monomers such as methyl methacrylate (MMA), butyl acrylate (nBA), styrene (St) and acrylonitrile (AN). The successful synthesis of block copolymers from common monomers such as MMA, nBA, MA and St was reported.

The critical phrase in the above paragraph discloses the scale at which the innovative work to define the improved procedures was conducted: 10-50 mL. When the procedures disclosed in PCT/US2006/048656 were scaled up some critical process disadvantages accompanying the improvements made in application became apparent:
 a) slow reactions (especially for methacrylates, styrenes)
 b) exothermic process (especially for acrylates) requiring
 c) the need of precise temperature control
 a) d) limited information for scale up and automation of process.

Procedures to overcome these limitations, particularly at larger scale, are disclosed herein. Indeed in one embodiment of the invention disclosed controlled radical polymerization processes where the rate of addition of a reducing agent/radical initiator is continuously adjusted allows conversion of monomer to polymer to exceed 80%, preferably exceed 90% and optimally exceed 95%.

SUMMARY OF THE INVENTION

One embodiment of the polymerization processes of the present invention are directed to polymerizing free radically polymerizable monomers in the presence of a polymerization medium initially comprising at least one transition metal catalyst, for example at a relatively low concentration, and an atom transfer radical polymerization initiator. The polymerization medium may additionally comprise a reducing agent or a radical initiator and/or ligand. Sufficient ligand may be added to the reaction medium to modify solubility and activity of the transition metal catalyst. The one or more reducing agents or radical initiators may be added initially or during the polymerization process in a continuous or intermittent manner or activated in an intermittent manner. The polymerization process may further comprise reacting the reducing agent with at least one of the transition metal catalyst in an oxidized state further comprising a radically transferable atom or group to form a compound that does not participate significantly in control of the polymerization process. A transition metal in the zero oxidation state can be employed as a reducing agent.

Another embodiment of the disclosed process is directed towards continuous control over the concentration of the persistent radical in a NMP. In this embodiment the rate of decomposition of the initiator added continuously or intermittently to the reaction is selected to match the rate of radical/radical termination reactions that would otherwise build up the concentration of the stable free radical and reduce the rate of propagation.

A further embodiment of the disclosed process concerns RAFT polymerizations. In a RAFT polymerization the rate of polymerization is controlled by the rate of decomposition of the added initiator. Normally all of the initiator is added to the reaction at the beginning of the reaction and this could lead to an increased rate of initiator decomposition if the temperature of the reaction is not well controlled throughout the polymerization vessel during each stage of the reaction. As noted for ICAR ATRP continuous addition of the initiator and monitoring of the temperature of the reaction provides information on, if and when addition of the initiator should be stopped in order to retain control over the reaction.

Embodiments of the polymerization process of the present invention include bulk polymerization processes, polymerization processes performed in a solvent, polymerization processes conducted from solid surfaces, biphasic polymerization process including emulsion polymerization processes, mini-emulsion polymerization processes, microemulsion processes, reverse emulsion polymerization processes, and suspension polymerization processes. In such biphasic polymerization processes the polymerization processes may further comprise at least one of a suspending medium, a surfactant or reactive surfactant, and a monomer phase comprising at least a portion of the radically polymerizable monomers.

It must be noted that, as used in this specification and the appended claims, the singular forms "a," "and," and "the" include plural referents unless the context clearly dictates otherwise. Thus, for example, reference to "a polymer" may include more than one polymer or copolymers.

This disclosed procedures provide a means to optimize and automate the polymerization processes by exercising continuous control over the ratio of activator/deactivator, concentration of persistent radical or concentration of initiator present in a CRP.

The advantages of the disclosed 'starve feeding/activation' method include:
a) use of lower amounts of catalyst and radical initiator or reducing agent,
b) reduced need for precise temperature control,
c) higher reaction temperature, which allows higher conversions in a shorter time with reduced amounts of solvents,
d) the potential for automation of the whole process, and
e) the development of safe scalable processes for exothermic polymerization reactions, although heat removal is still a requirement.

The resulting expansion of the utilization of the proposed system for CRP will allow a reduced cost for purification of the products, a significant decrease in waste and improve safety by providing an additional means to control reaction temperature. Furthermore the rate of addition of a reducing agent/radical initiator can be continuously adjusted to allow the conversion of monomer to polymer to exceed 80%, preferably exceed 90% and optimally exceed 95% by taking into consideration the viscosity of the reaction medium and the rate of diffusion of the added reducing agent.

In the following examples, and discussion of examples, ATRP is employed as an exemplary CRP but the disclosed procedures, components, and ranges may be applied to NMP and RAFT as indicated above.

In one embodiment, a method for safely operating a fast large-scale ICAR ATRP polymerization process is provided, comprising: (a) mixing an unsaturated monomer, an initiator, and a metal catalyst; (b) adding a non-activated reducing agent (inclusive of, for example, a thermo-activated or photo-activated reducing agent); (c) maintaining the polymerization process at or above a temperature wherein the non-activated reducing agent has a activation-dependent (for example, temperature or electromagnetic activation) $t_{1/2}$ value of between 30 sec. and 30 min. and optionally ligand.

In another embodiment, a method of polymerizing unsaturated monomers is provided, comprising: (a) mixing unsaturated monomers with an inactive metal catalyst, an initiator having a transferable atom and optionally ligand, wherein the inactive metal catalyst is present in the mixture at an amount of less than 250 ppm, on a mass basis relative to the total mixture; (b) heating the mixture to a reaction temperature; (c) adding a first portion of a non-activated reducing agent to the system to generate an activated reducing agent, wherein the non-activated reducing agent has a decomposition activation dependent $t_{1/2}$ value of between 30 sec. and 30 min. at the reaction conditions (for example, temperature or electromagnetic energy value); (d) reducing the inactive metal catalyst with the activated reducing agent to form an active metal catalyst; (e) transferring the transferable atom with the active metal catalyst, thereby activating the initiator for unsaturated monomer addition; and (f) adding at least a further portion of the non-activated reducing agent to the mixture to induce further polymerization of the unsaturated monomer; wherein the at least further portion is added to the mixture at a point where at least 10, 20 or 30 molar %, relative to the amount of unsaturated monomer introduced into the mixture, has been polymerized, and wherein at least one polymer product has a degree of polymerization, with respect to the monomer residues corresponding to the unsaturated monomer, of at least 10, 15, 20 or 25 and the overall mixture has a conversion of at least 60 molar % relative to the amount of unsaturated monomer introduced into the mixture.

In another embodiment, a method of radical polymerization of an unsaturated monomer is provided, comprising: (a) polymerizing an unsaturated monomer in a system comprising an initiator, optionally ligand and a metal catalyst at or above a reaction temperature; (b) adding at a controlled rate a first amount of non-activated reducing agent to the system; and (c) controlling the rate of polymerization of the unsaturated monomer by adding at a controlled rate a further amount of the non-activated reducing agent to the system at a point where at least 10, 20 or 30 molar %, relative to the amount of unsaturated monomer introduced into the system, has been polymerized; wherein the reaction conditions are sufficient to activate the non-activated reducing agent.

In certain embodiments, the initiator utilized in the method may comprise a halide-substituted alkyl initiator.

In certain embodiments, the metal catalyst utilized in the method may comprise an inactive metal-halide catalyst.

In certain embodiments, the metal catalyst utilized in the method may comprise an active metal-halide catalyst.

In another embodiment, a method of making a polymer is provided, comprising: (a) preparing a reaction mixture comprising a radically-polymerizable unsaturated monomer, an initiator, optionally ligand and an inactive metal catalyst in a molar ratio of the unsaturated monomer to the initiator of 25-5000:1 and a molar ratio of the catalyst to the initiator of 0.001 to 0.5:1; and/or where the metal catalyst is present in the mixture at an amount of less than 250 ppm, on a mass basis relative to the total mixture; (b) heating the reaction mixture to a first temperature; (c) disbursing a portion of a non-activated reducing agents (e.g., thermo-activated reducing agent) into the heated reaction mixture; (d) allowing a quantity of said portion of the non-activated reducing agent to decompose to an activated reducing agent; (e) reducing a portion of the inactive metal catalyst with a portion of the activated reducing agent to form at least one active metal catalyst; (f) activating one or more of the initiators with the at least one active metal catalyst to form one or more activated initiators; (g) polymerizing at least one monomer in the presence of one or more activated initiators to extend a polymer chain; and (h) repeating steps (c)-(g) while maintaining the reaction conditions at or above a the point that triggers the non-activated reducing agent to decompose to form an intiator at an activation-dependent $t_{1/2}$ value of between 30 sec. and 30 min. In certain embodiments, the method steps (c)-(h) may be conducted substantially continuously for a period of at least 2 hours and the non-activated reducing agent may be introduced in a steady, continuous, dis-continuous, varying, gradient, variable, increasing, decreasing, increasing follow-by decreasing, decreasing followed by increasing and/or combinations of these techniques.

In certain embodiments, the non-activated reducing agent (may be for example a thermo-activated reducing agent and/or a photo-activated reducing agent) utilized in the method may be continuously disbursed into the heated reaction mixture and the portion may be adjusted periodically over the course of the polymerization reaction, relative to the molar conversion of unsaturated monomer.

In certain embodiments, the non-activated reducing agent (may be for example a thermo-activated reducing agent and/or a photo-activated reducing agent) utilized in the method may be continuously disbursed into the heated reaction mixture and the portion is adjusted periodically over the time course of the polymerization reaction, relative to the process parameters of temperature and viscosity.

In certain embodiments, the non-activated reducing agent (may be for example a thermo-activated reducing agent and/or a photo-activated reducing agent) utilized in the method may be continuously disbursed into the heated reaction mixture and the portion is adjusted periodically over the course of the polymerization reaction, relative to the molar conversion of unsaturated monomer, over an interval of time, wherein the interval of time is greater than three minutes.

In certain embodiments, the non-activated reducing agent utilized in the method may not be added until at least 15, 30, 45 or 60 molar % conversion of the unsaturated monomer is achieved, relative to the molar amount of unsaturated monomer.

In certain embodiments, the second temperature utilized in the method may be at least 10 degrees, for example 12 or 15 degrees hotter than said first temperature.

BRIEF DESCRIPTION OF THE DRAWING FIGURES

The following figures exemplify aspects of the disclosed process but do not limit the scope of the process to the examples discussed.

FIG. 1. Variation of temperature inside a 1 L batch reactor during ARGET ATRP of nBA. Experimental conditions: nBA/DEBMM/CuBr$_2$/TPMA/Sn(EH)$_2$=500/1/0.025/0.1/0.1, in bulk at 60° C.

FIG. 2. Parameters employed for the computer simulation of the polymerization of MMA under a series of reaction conditions. The purpose: to find optimal conditions for new feeding method. Results: models were built and successful simulations were performed and optimal conditions for the particular embodiment were found. Concerns: heat transfer, side reactions, catalyst stability, etc. not taken into account.

FIGS. 3A-3C. The results for the very first computer simulation for the new 'feeding' method for an ICAR ATRP of MMA, wherein:

Figure 4A:
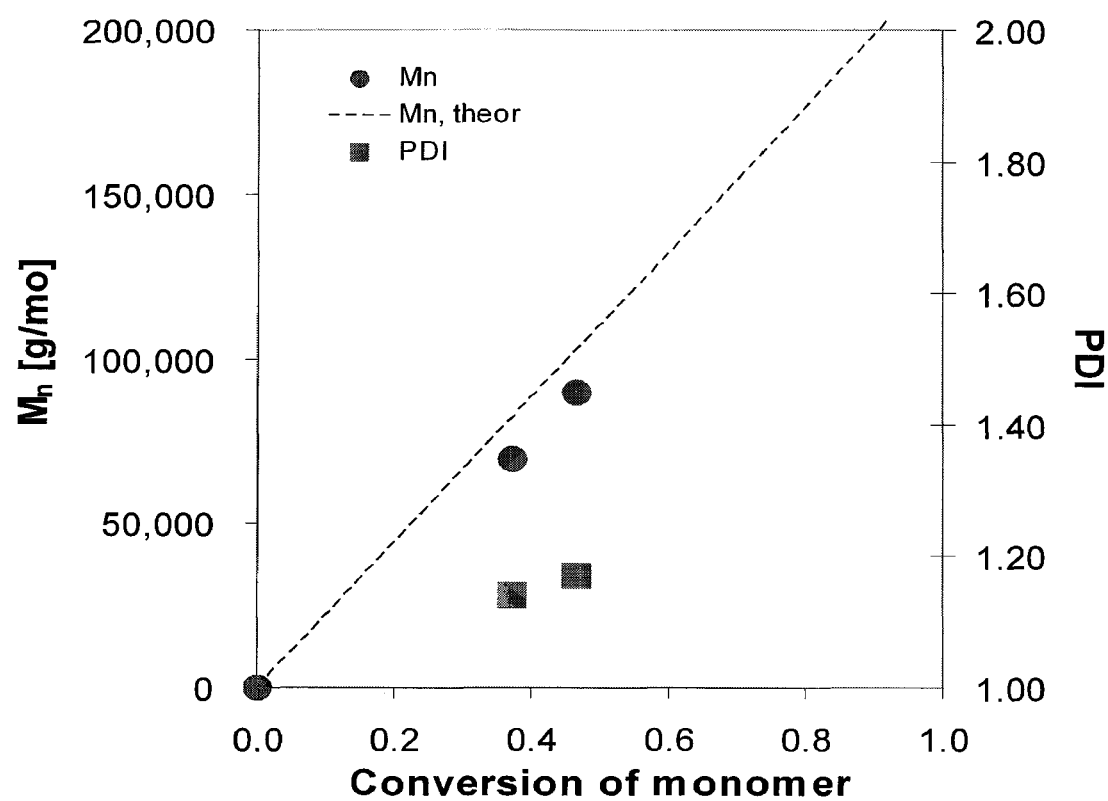

FIG. 4A. Molecular weight and PDI vs. conversion for comparative example C1.

Figure 4B:
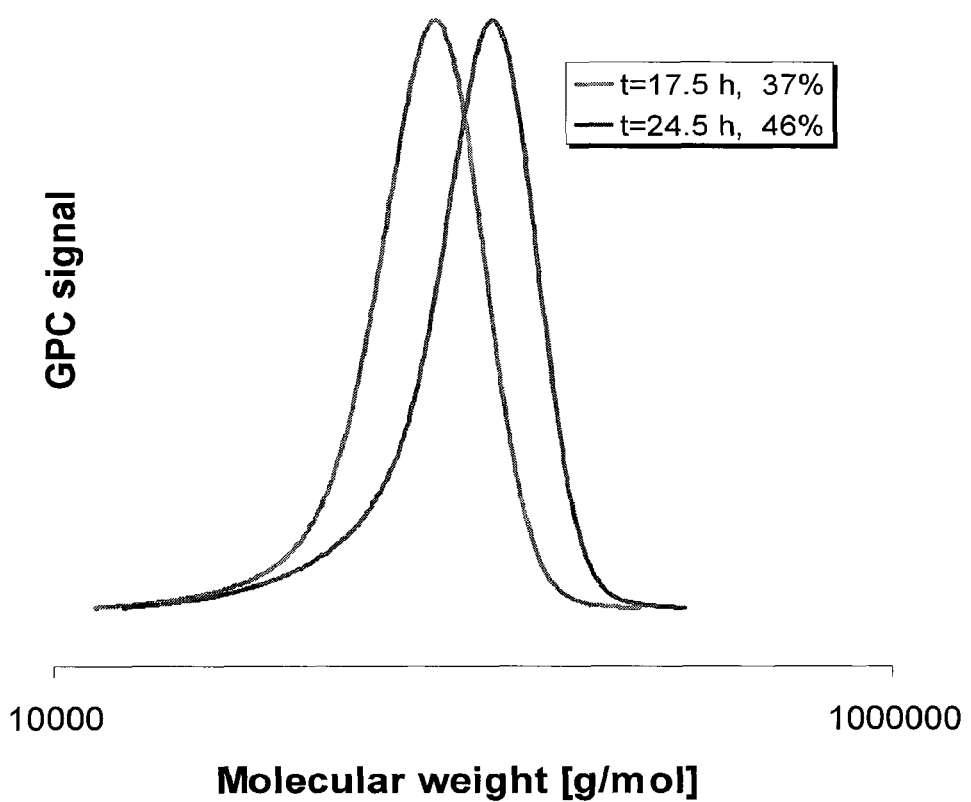

FIG. 4B. GPC curves for comparative example C1.

Figure 5A:
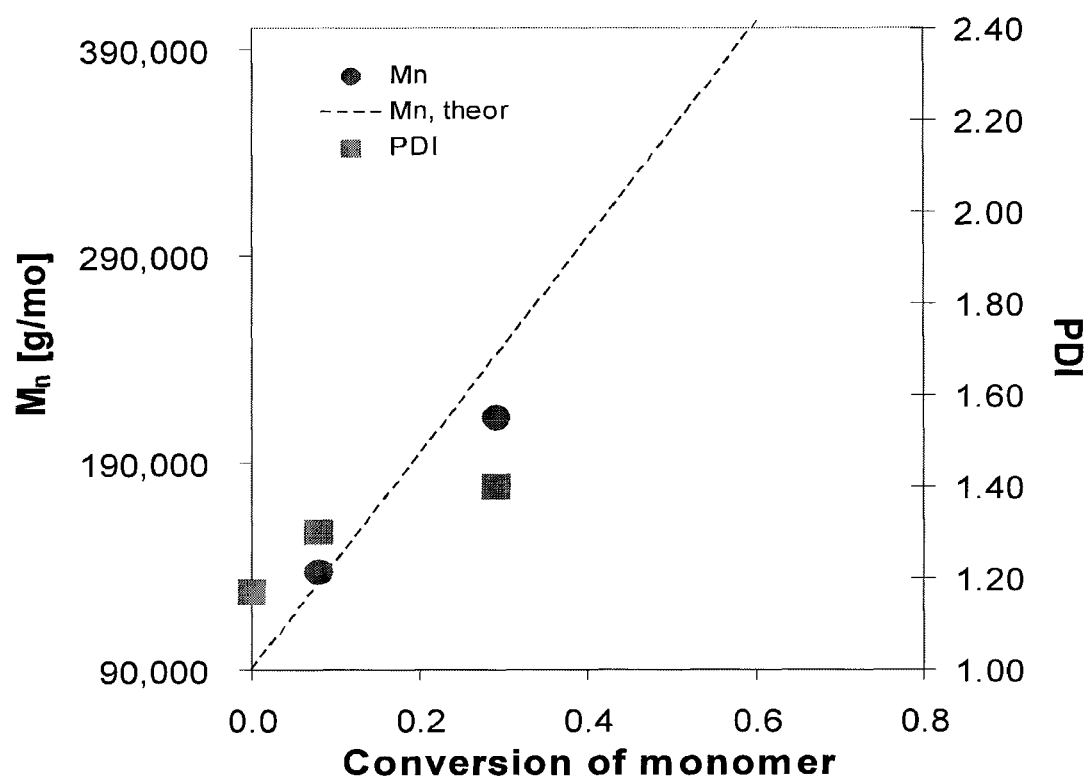

FIG. 5A. Molecular weight and PDI vs. conversion for comparative example C2.

Figure 5B:
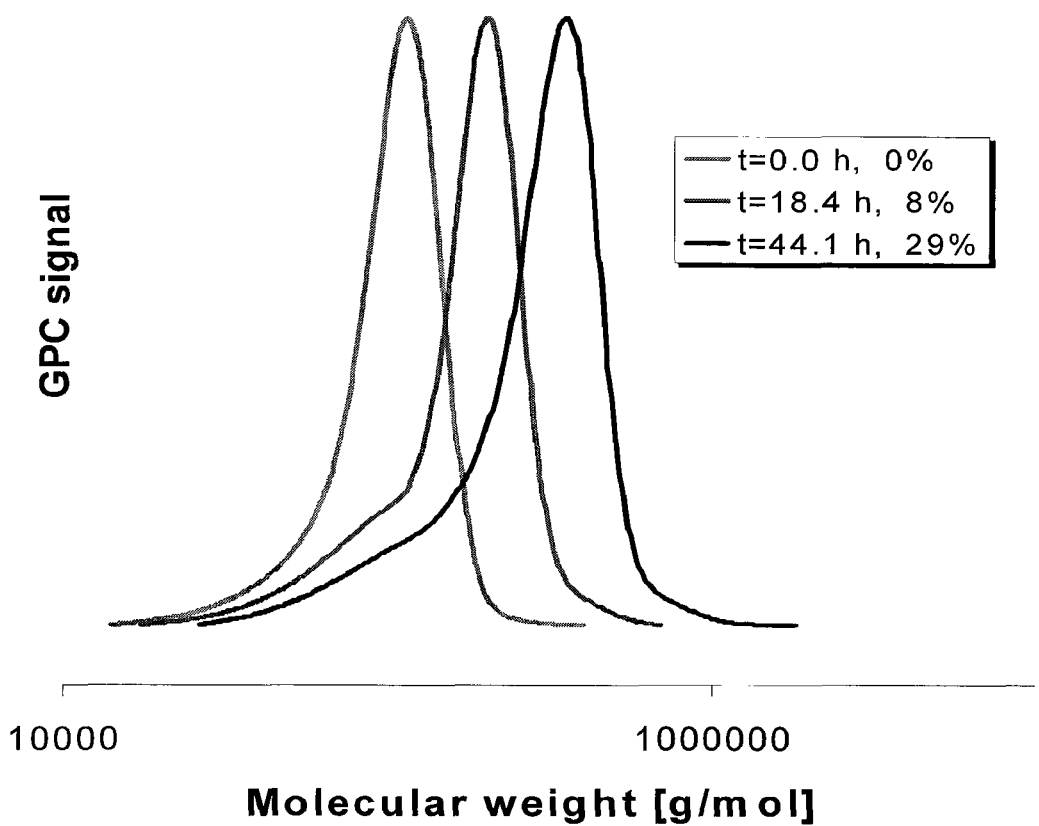

FIG. 5B. GPC traces for comparative example C2.

Figure 6A:
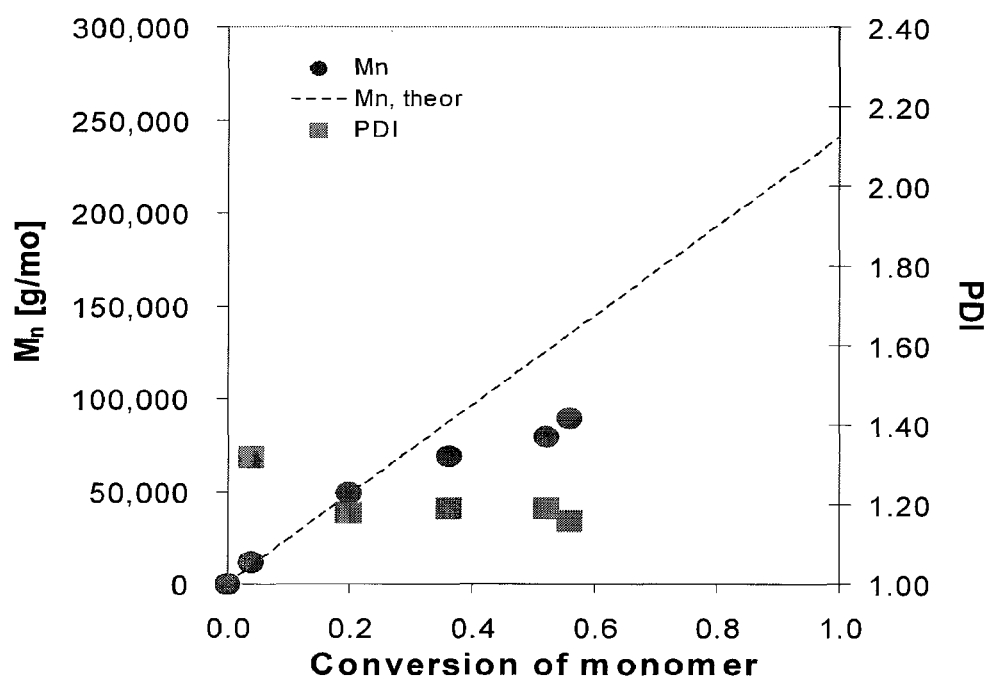

FIG. 6A. Molecular weight and PDI vs. conversion for comparative example C3.

Figure 6B:
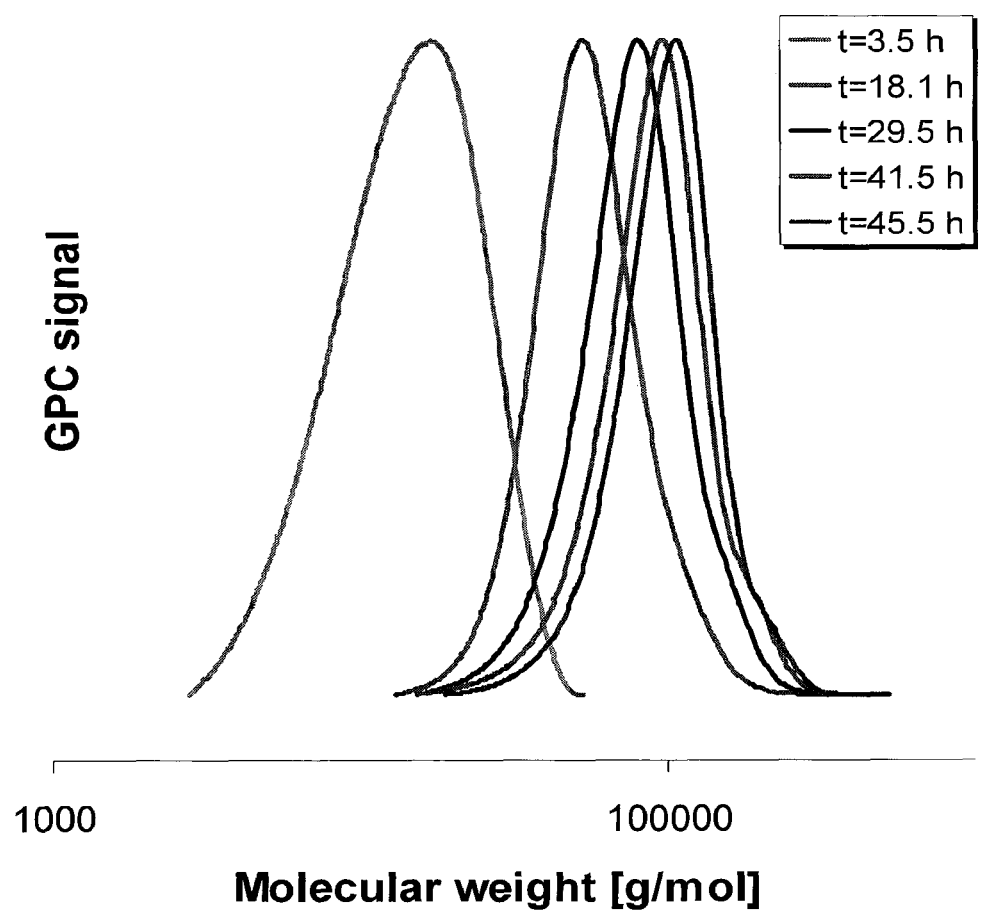

FIG. 6B. GPC curves for comparative example C3.

Figure 7A:
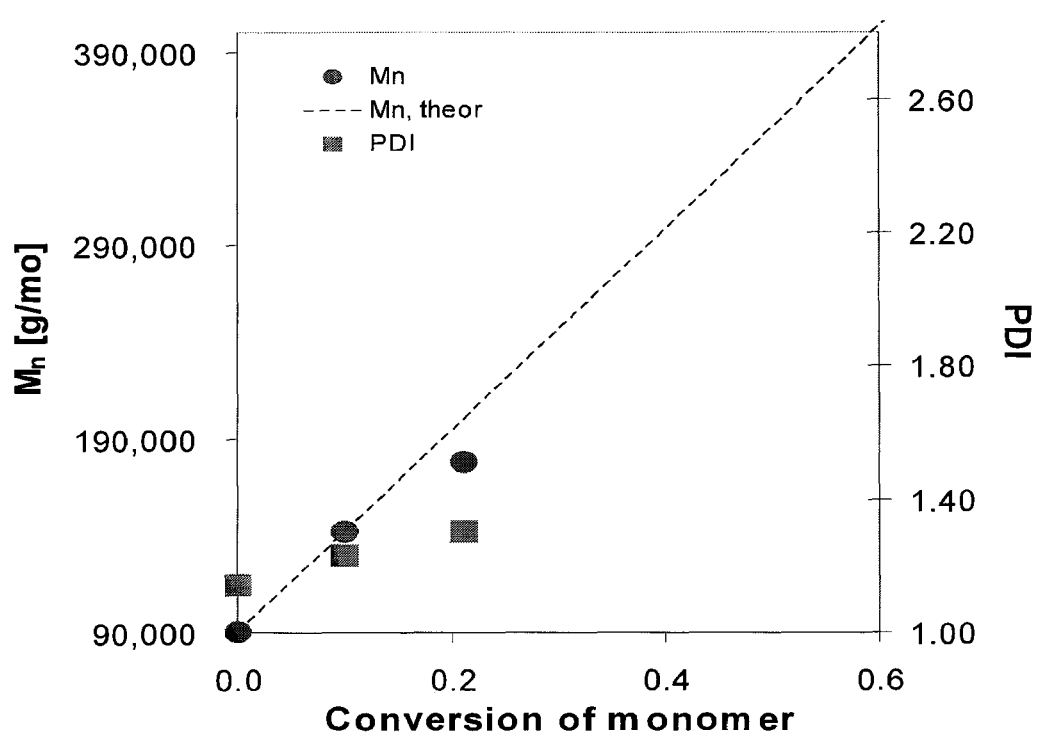

FIG. 7A. Molecular weight and PDI vs. conversion for comparative example C4.

Figure 7B:
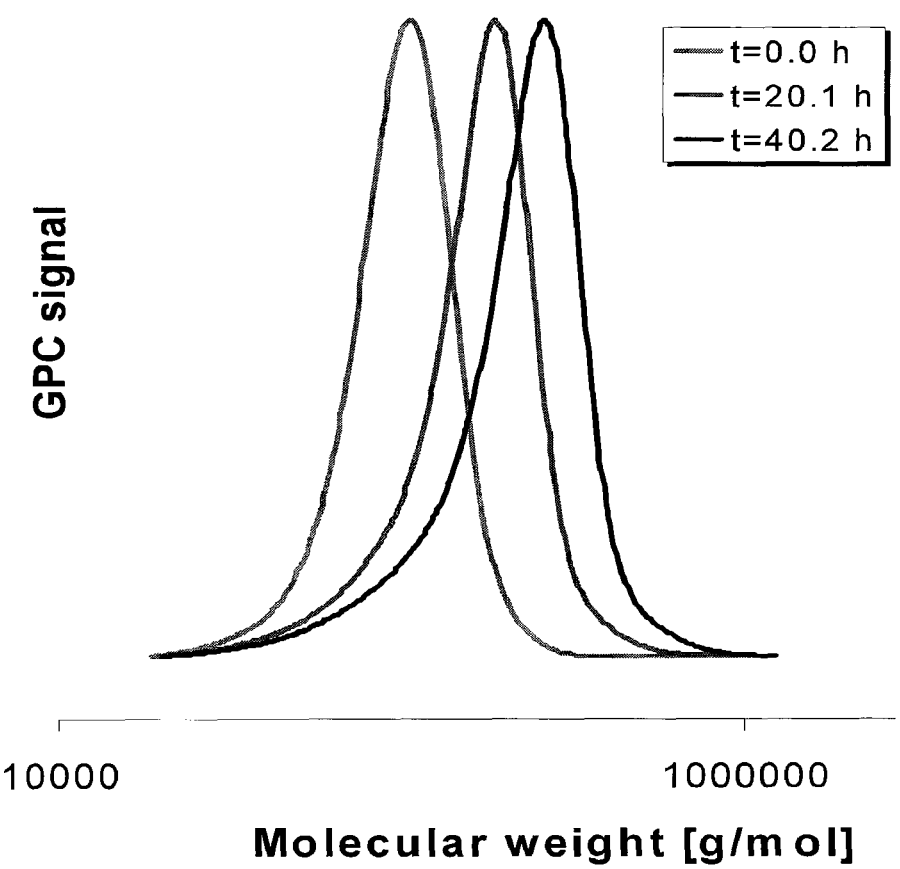

FIG. 7B. GPC curves for comparative example C4.

Figure 8A:
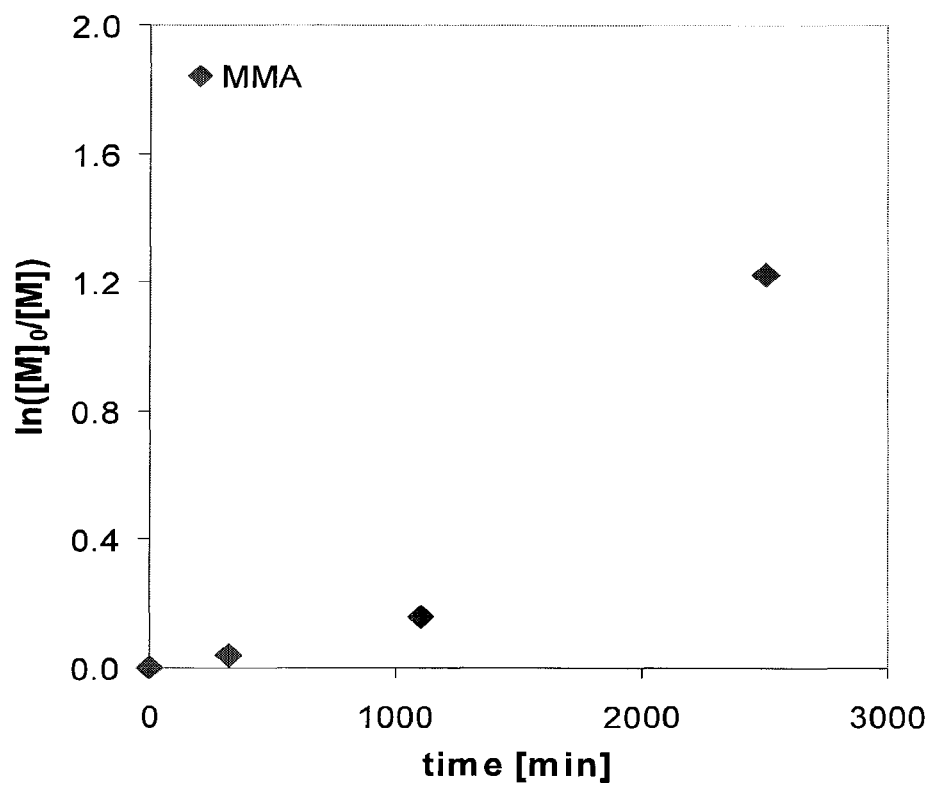

FIG. 8A. Kinetic plot for comparative example C5.

Figure 8B:
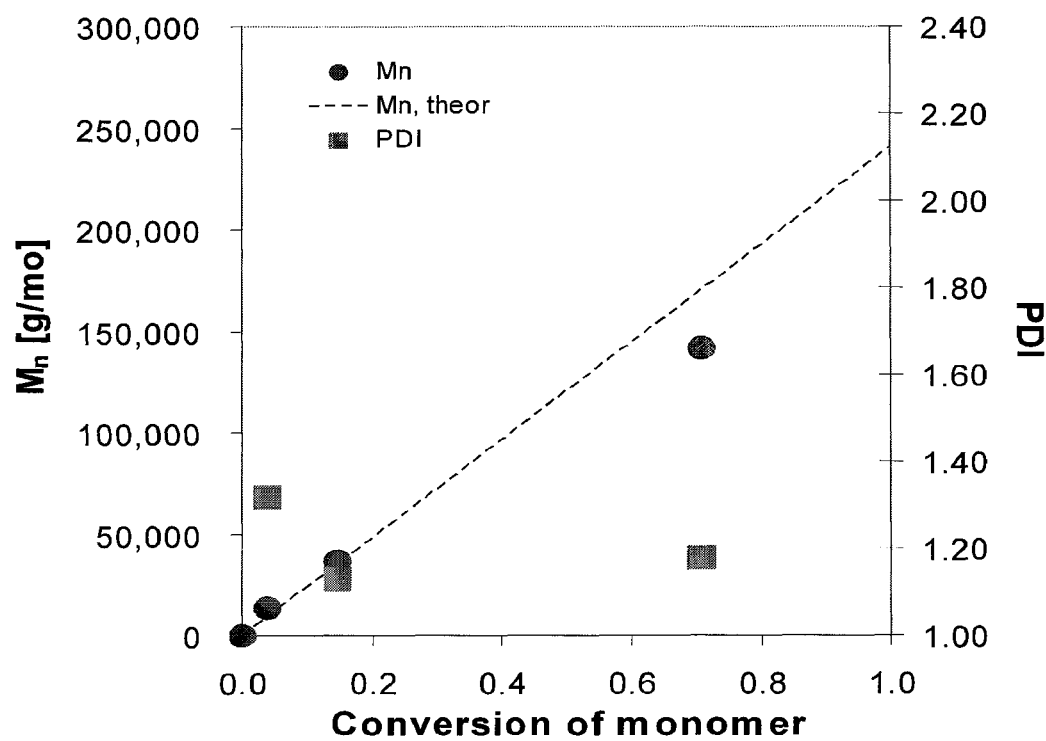

FIG. 8B. Molecular weight and PDI vs. conversion for comparative example C5.

Figure 8C:
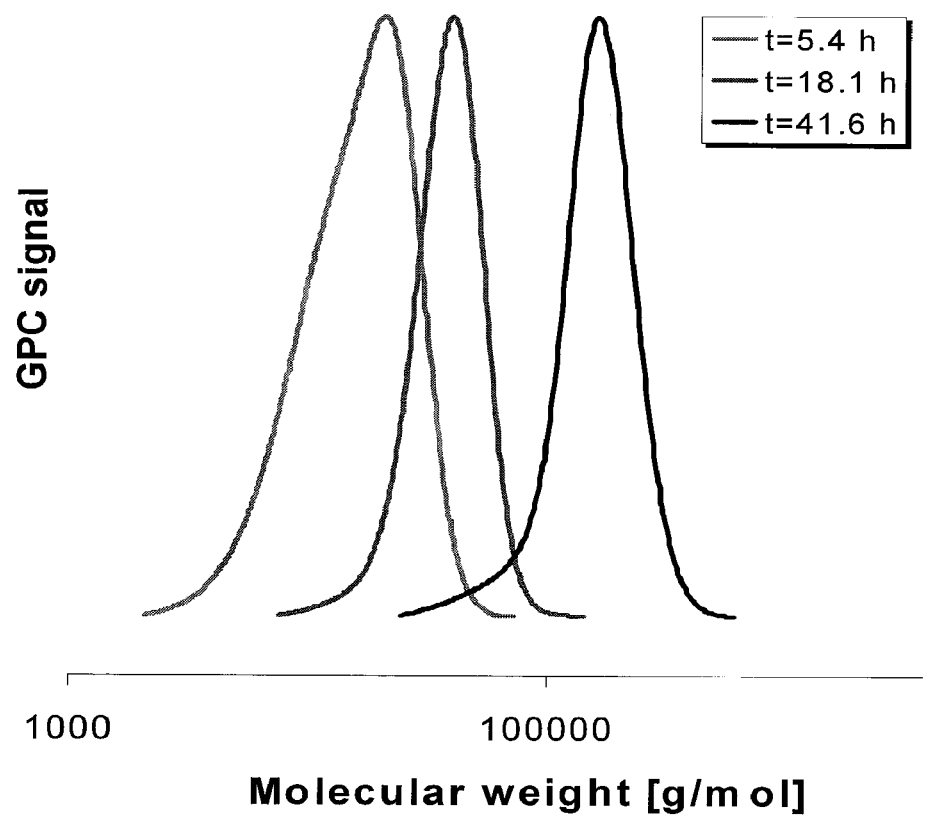

FIG. 8C. GPC curves for comparative example C5.

Figure 8D:
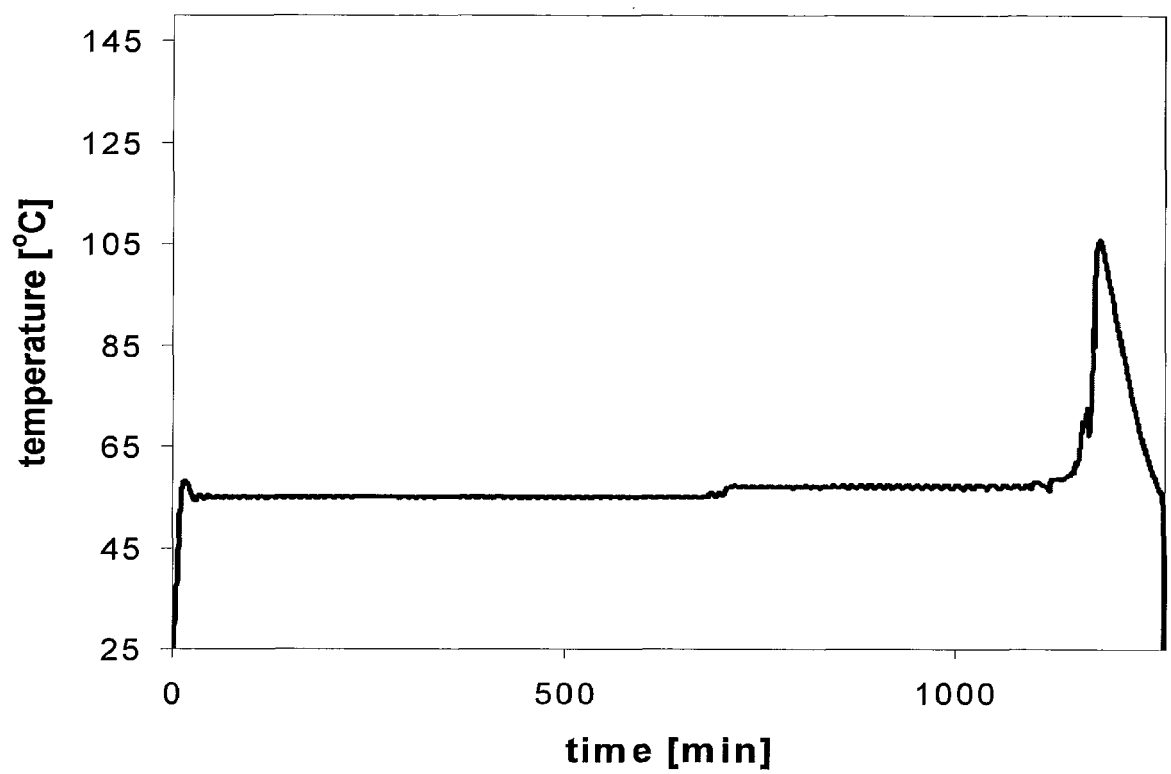

FIG. 8D. Temperature profile for comparative example C5.

Figure 9A:
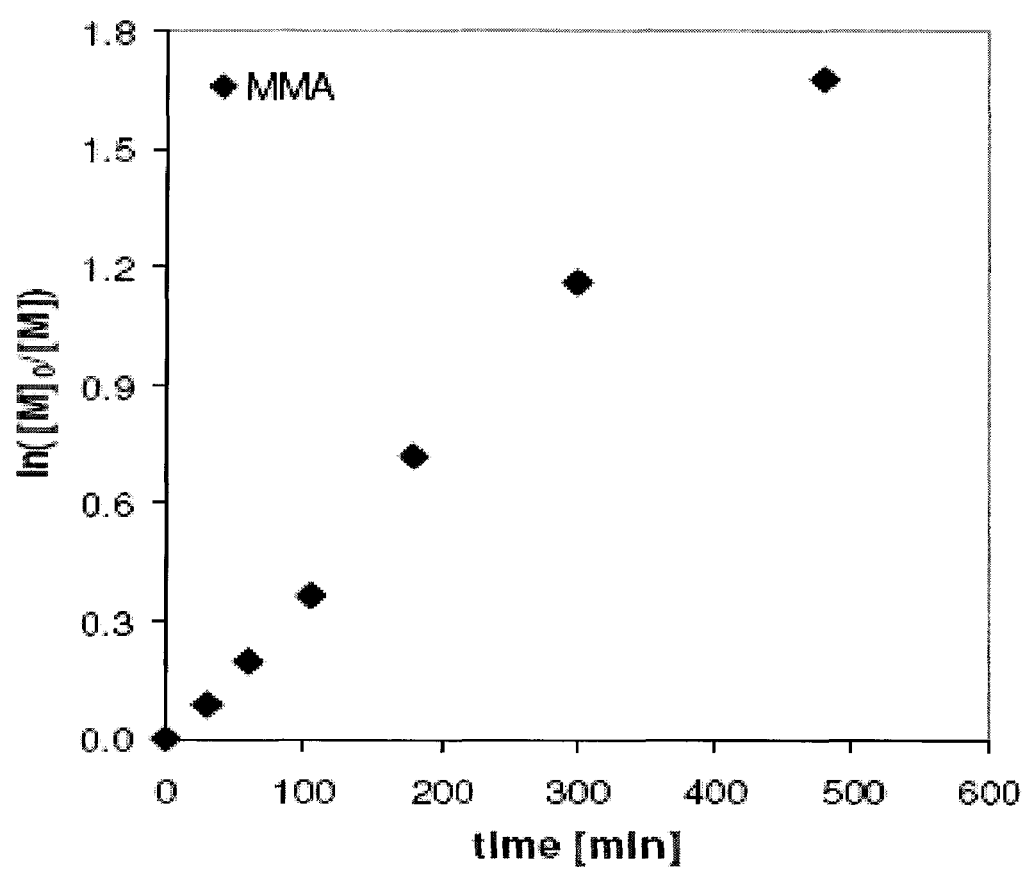
Figure 9B:
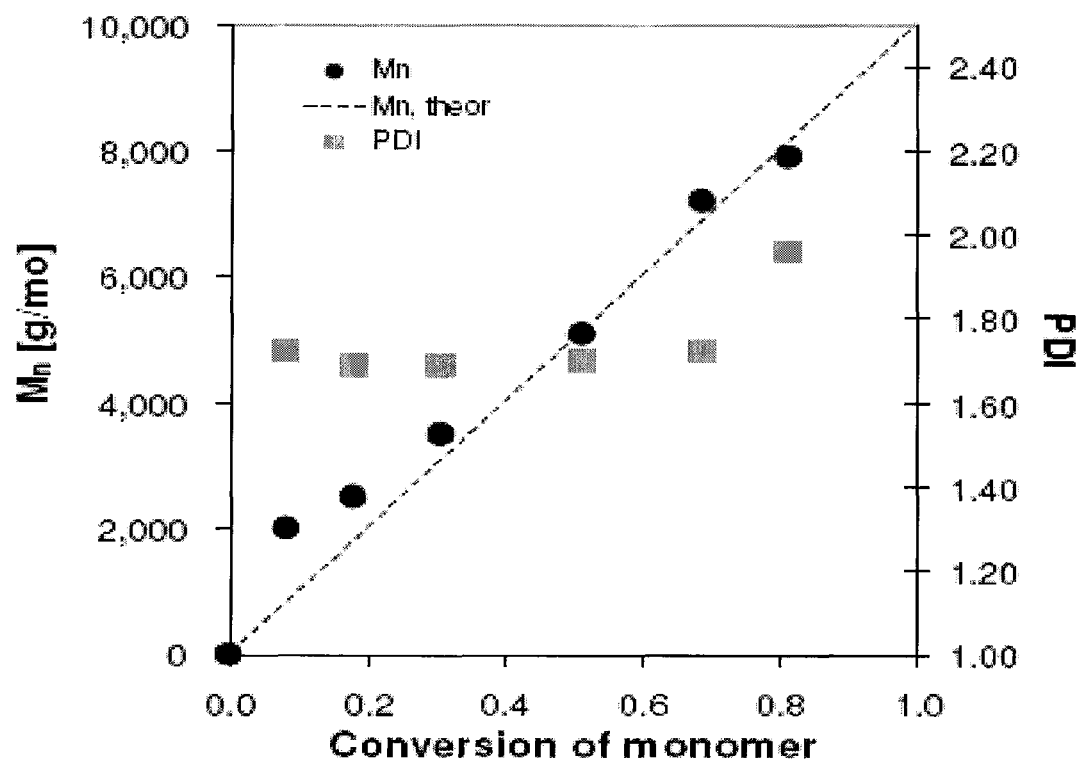
Figure 9C:
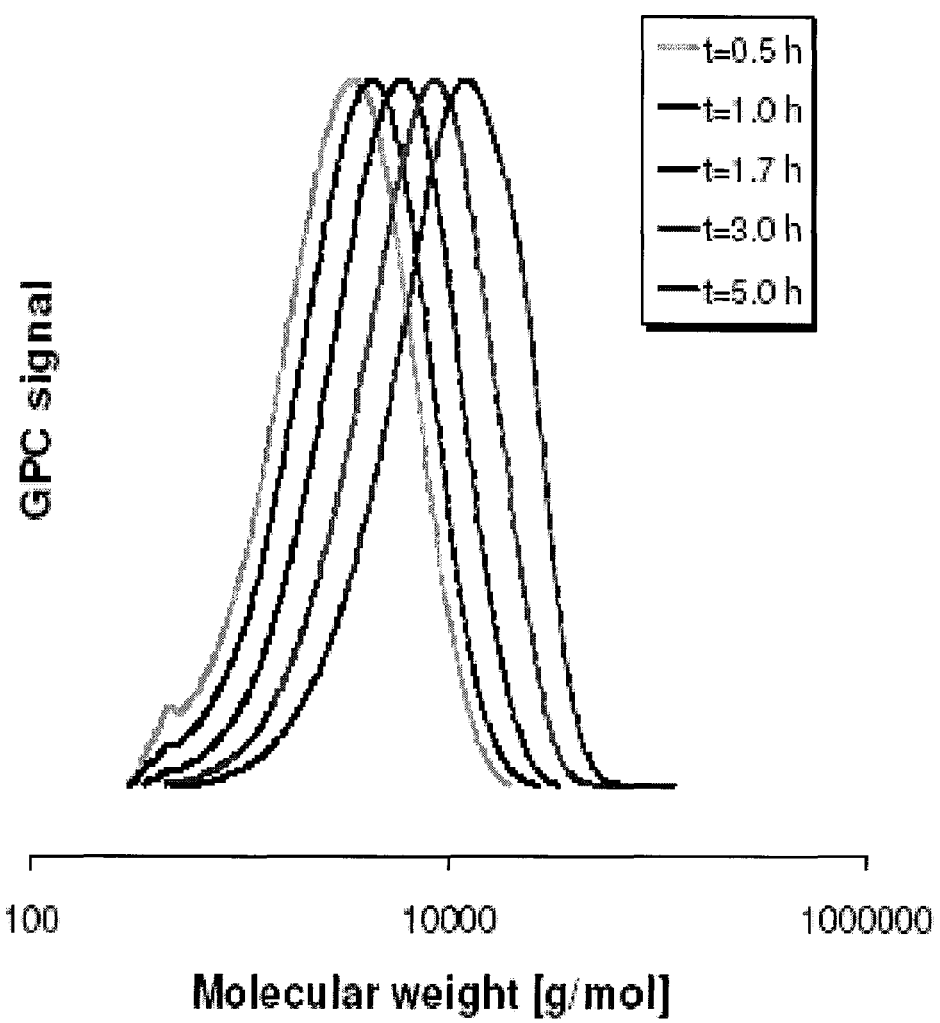

FIGS. 9A-9C. Polymerization of MMA targeting low degree of polymerization, wherein:

FIG. 9A is a kinetic plot;

FIG. 9B shows molecular weight and PDI vs. conversion; and

FIG. 9C are GPC traces for ICAR ATRP of MMA with feeding of AIBN (experiment 08-006-165). Conditions: MMA/DEBMM/CuBr$_2$/TPMA/AIBN=100/1/0.005/0.025/–; in hulk [MMA]=8.9 mol/L, 50 ppm of Cu, T=90° C. Feeding rate slow: 0.002 mol equivalent of AIBN vs. DEBMM in 1 h (AIBN in 40 ml of solvent to 850 ml of the reaction solution).

Figure 10A:
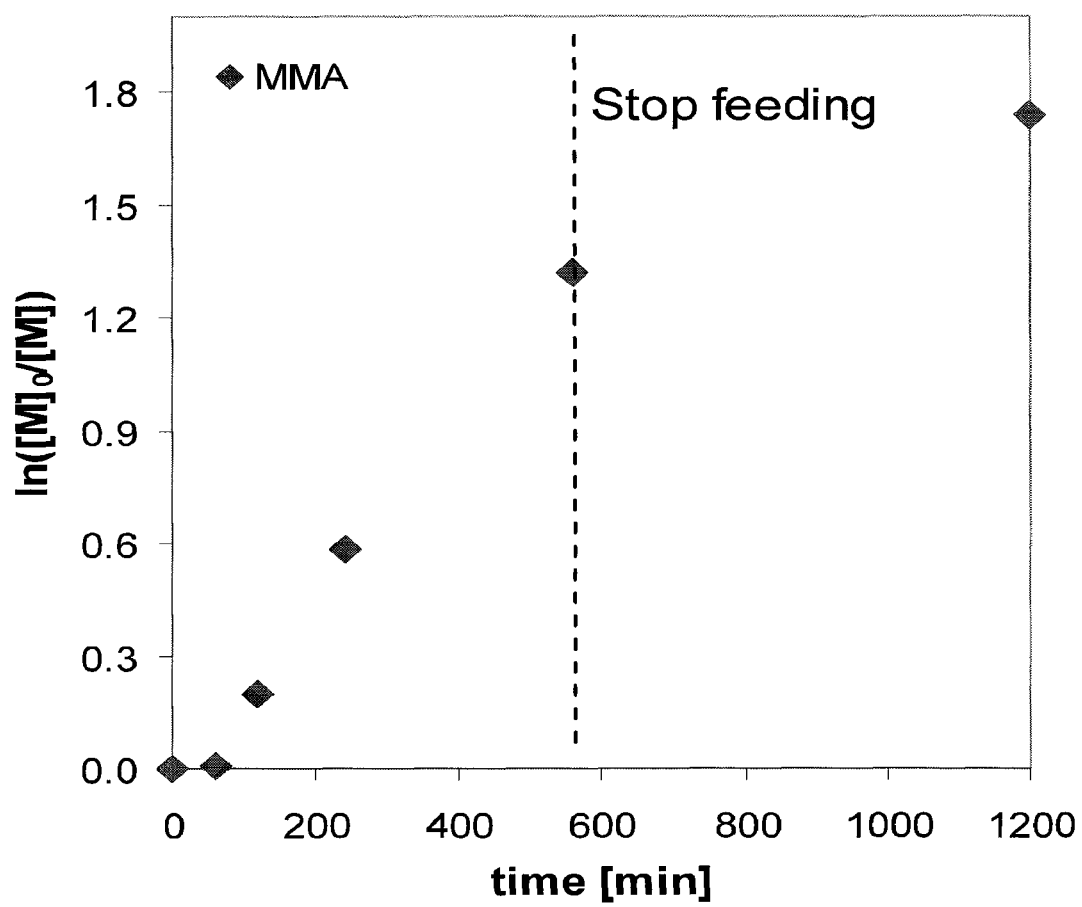
Figure 10B:
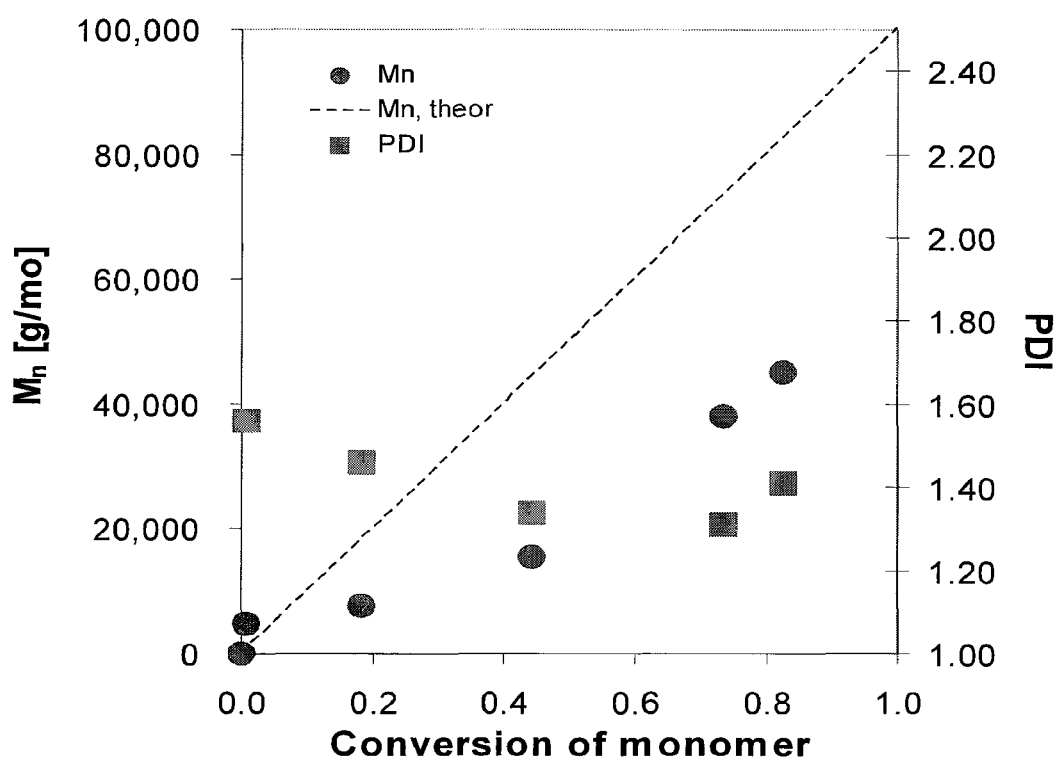
Figure 10C:
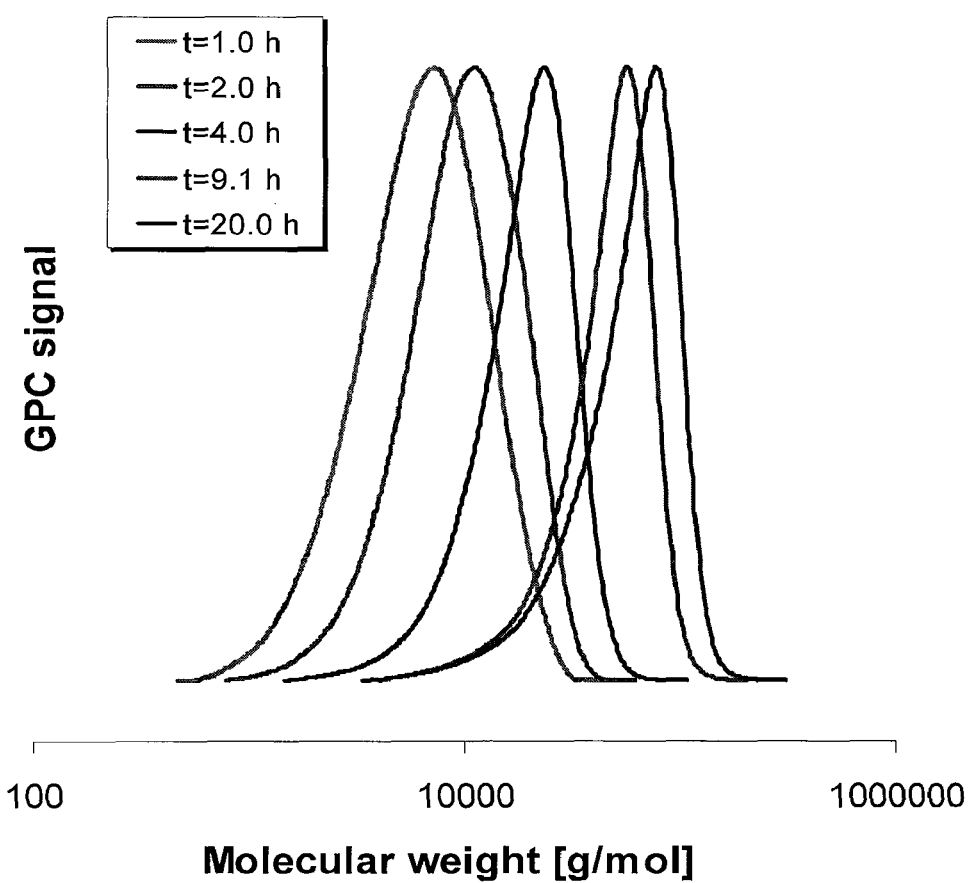

FIGS. 10A-10C. Polymerization of MMA targeting high degree of polymerization, wherein:

FIG. 10A is a kinetic plot;

FIG. 10B shows molecular weight and PDI vs. conversion; and

FIG. 10C is a GPC trace for ICAR ATRP of MMA with feeding of V-70 (experiment 08-006-180). Conditions: MMA/DEBMM/CuBr$_2$/TPMA/V-70=1000/1/0.05/0.1/–; in bulk [MMA]=8.9 mol/L, 50 ppm of Cu, T=80° C. Feeding rate slow: 0.004 mol equivalent of V-70 vs. DEBMM in 1 h (V-70 in 40 ml of solvent to 850 ml of the reaction solution).

Figure 11A:
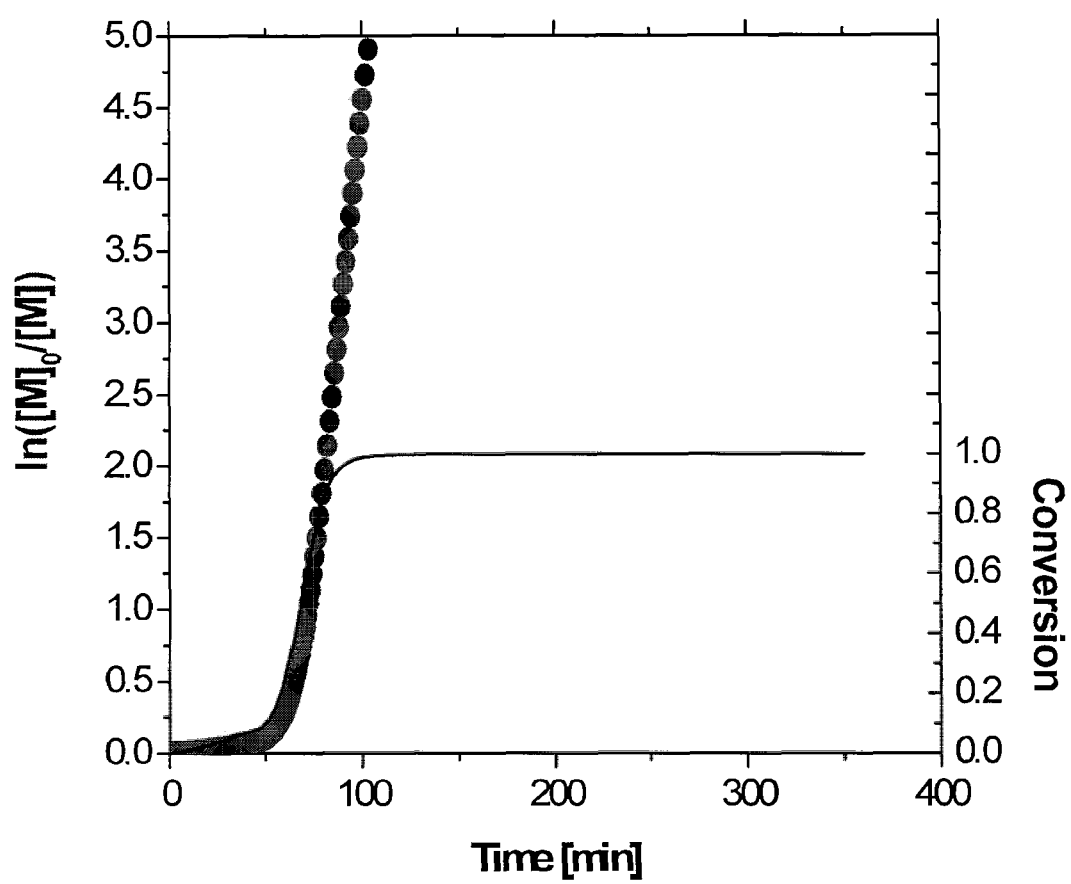
Figure 11B:
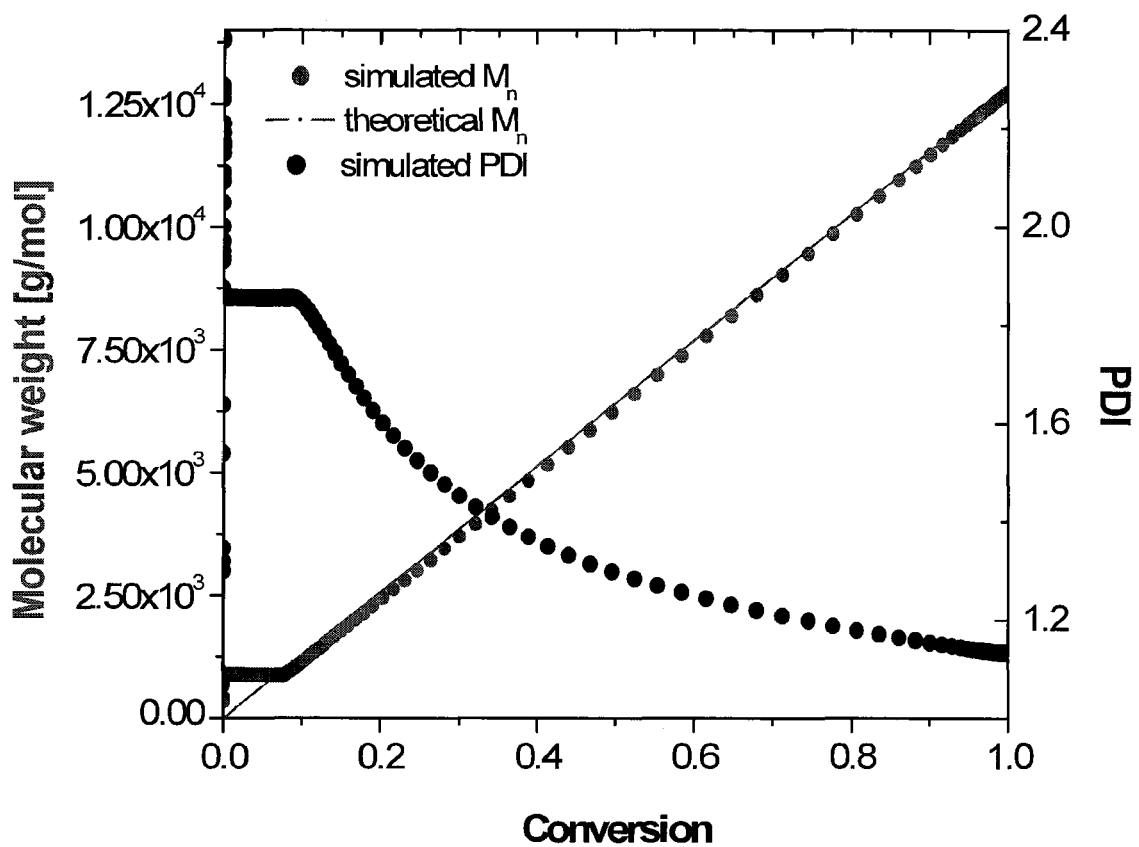

FIGS. 11A-11F. Computer simulation of polymerization of n-butyl acrylate, specifically:

FIGS. 11 A-C with the feeding of AIBN, wherein:

FIG. 11A is the kinetic plot;

FIG. 11B is the molecular weight and PDI vs. conversion; and

Figure 11C:
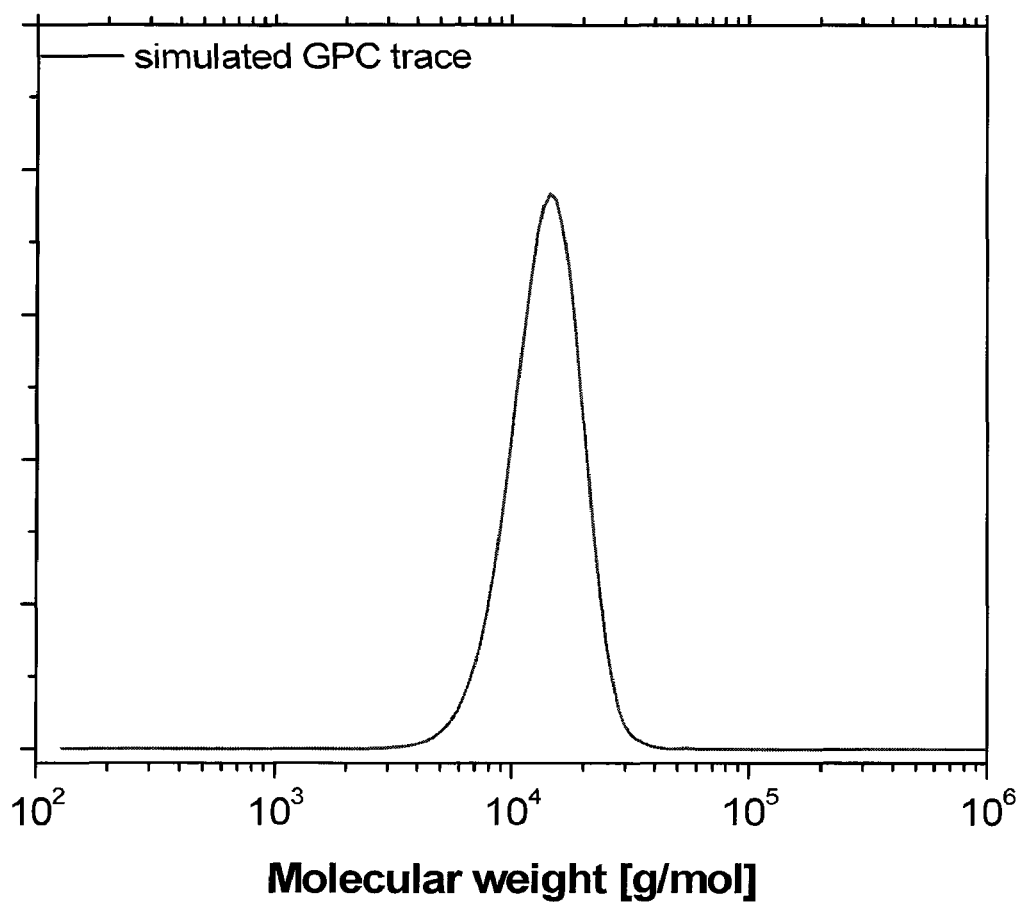
Figure 11D:
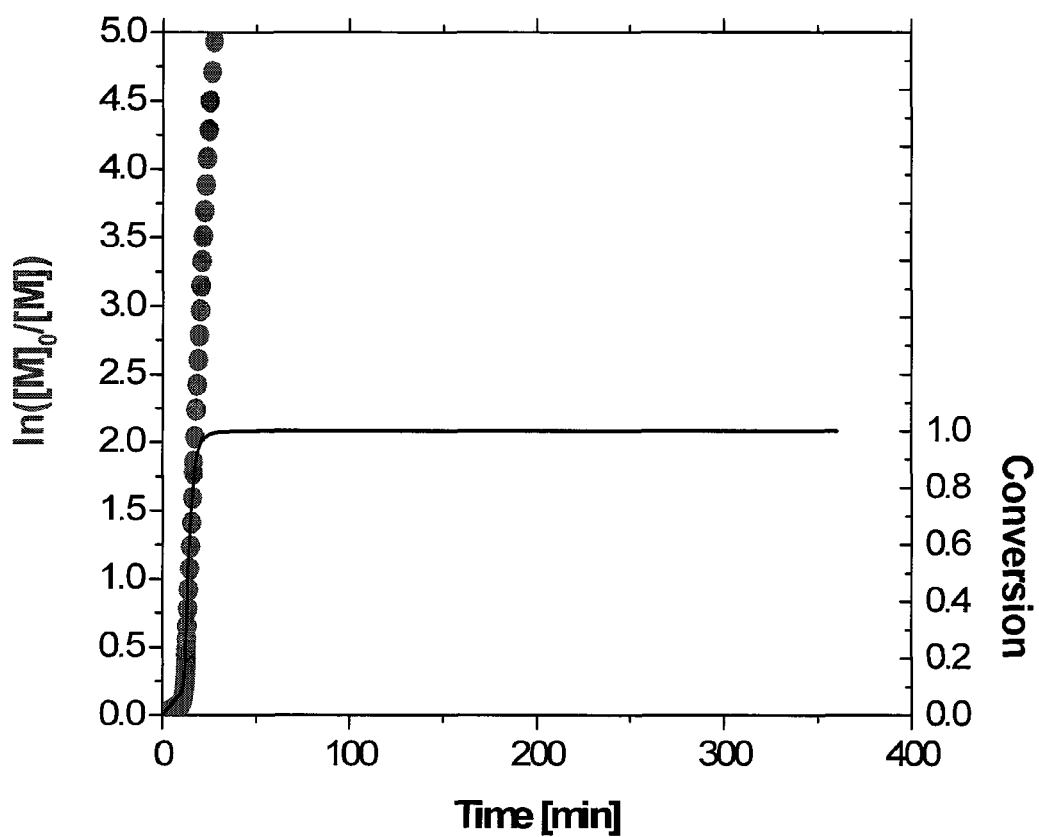
Figure 11E:
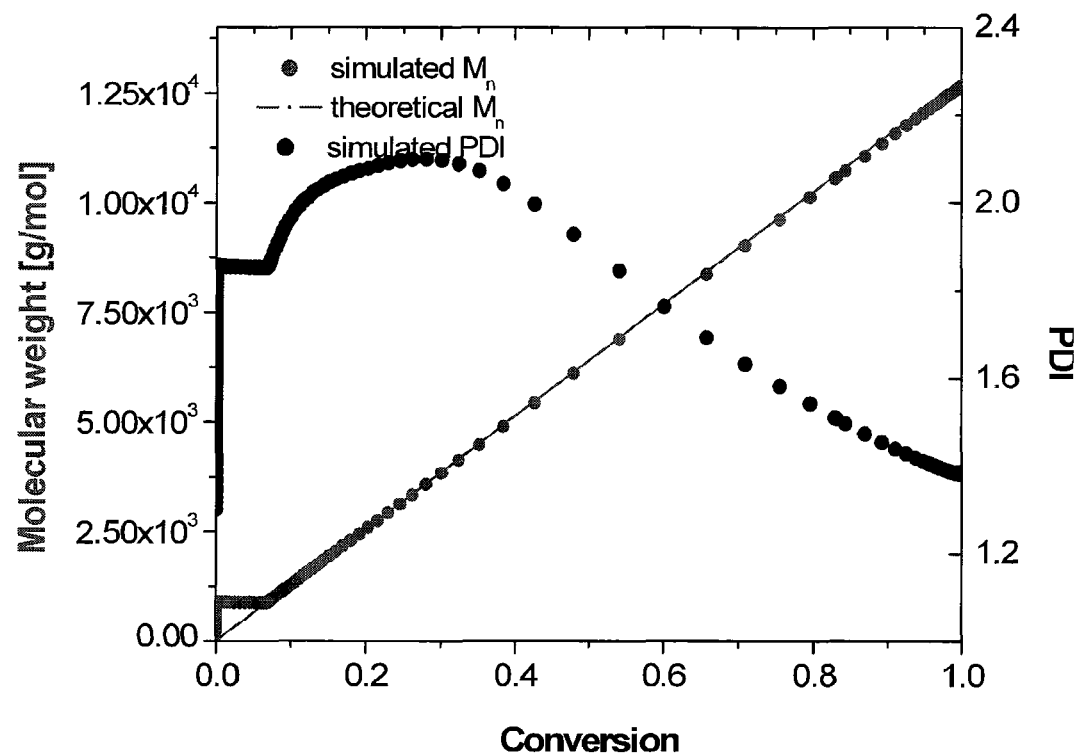

FIG. 11C are GPC traces. Conditions for ICAR ATRP of nBA with feeding of AIBN: nBA/DEBMM/CuBr$_2$/TPMA/AIBN=100/1/0.005/0.005/–; in bulk [nBA]=7.0 mol/L, 50 ppm of Cu, T=90° C. Feeding rate fast: 0.03 mol equivalent of AIBN vs. DEBMM in 6 h (AIBN in 90 ml of solvent to 1 L of the reaction solution). Comments: simulated polymerization reached 99.2% conversion in 1.7 h (PDI=1.13; chain-end functionality=99%); there is a short induction period but reaction was very fast and well controlled; amount of AIBN added after 1.7 h was 0.0086 mol equivalents vs. initiator; and FIGS. 11 D-F without the feeding of AIBN, wherein:

FIG. 11D is the kinetic plot;

FIG. 11E is the molecular weight and PDI vs. conversion; and

Figure 11F:
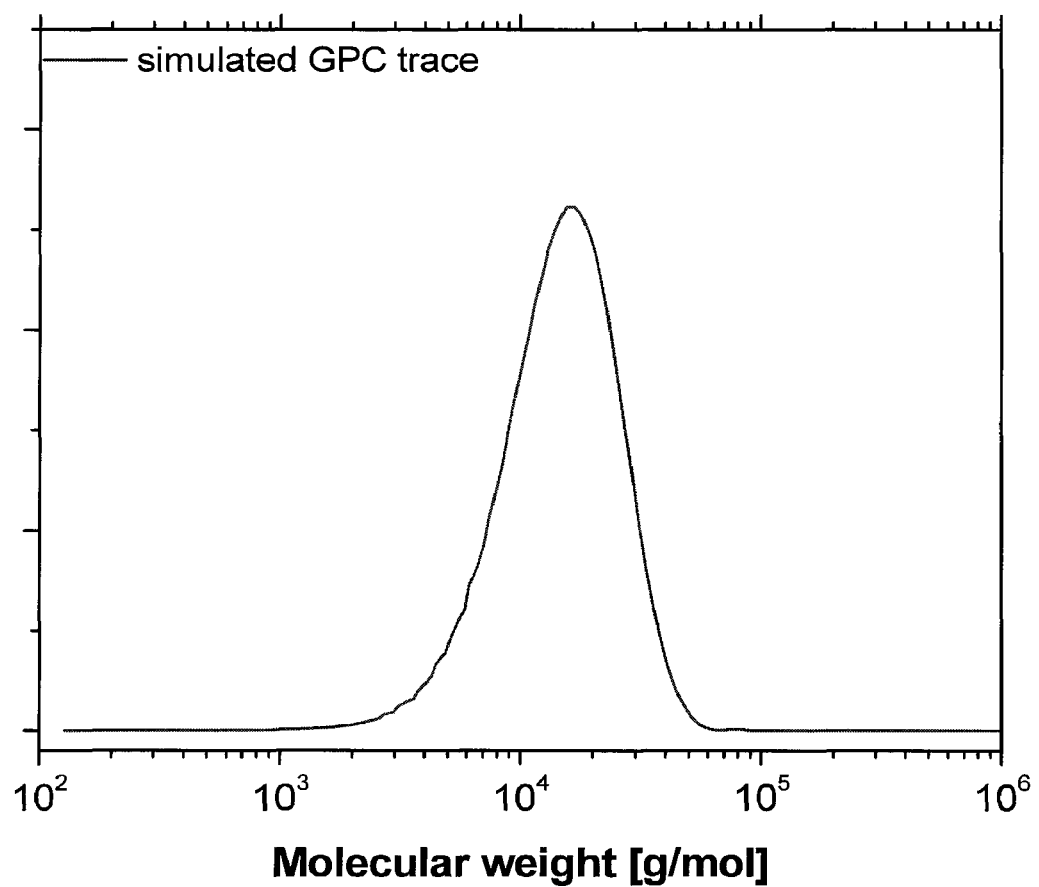

FIG. 11F are GPC traces. Conditions for ICAR ATRP of nBA without feeding of AIBN: nBA/DEBMM/CuBr$_2$/TPMA/AIBN=100/1/0.005/0.005/0.03; in bulk [nBA]=7.0 mol/L, 50 ppm of Cu, T=90° C. Comments: simulated polymerization reached 99.2% conversion in 28 minutes (PDI=1.38; chain-end functionality=99%); polymerization was extremely fast and resulted in polymer with relatively broad molecular weight distribution (PDI=1.6–2.2 for lower conversions).

Figure 12A:
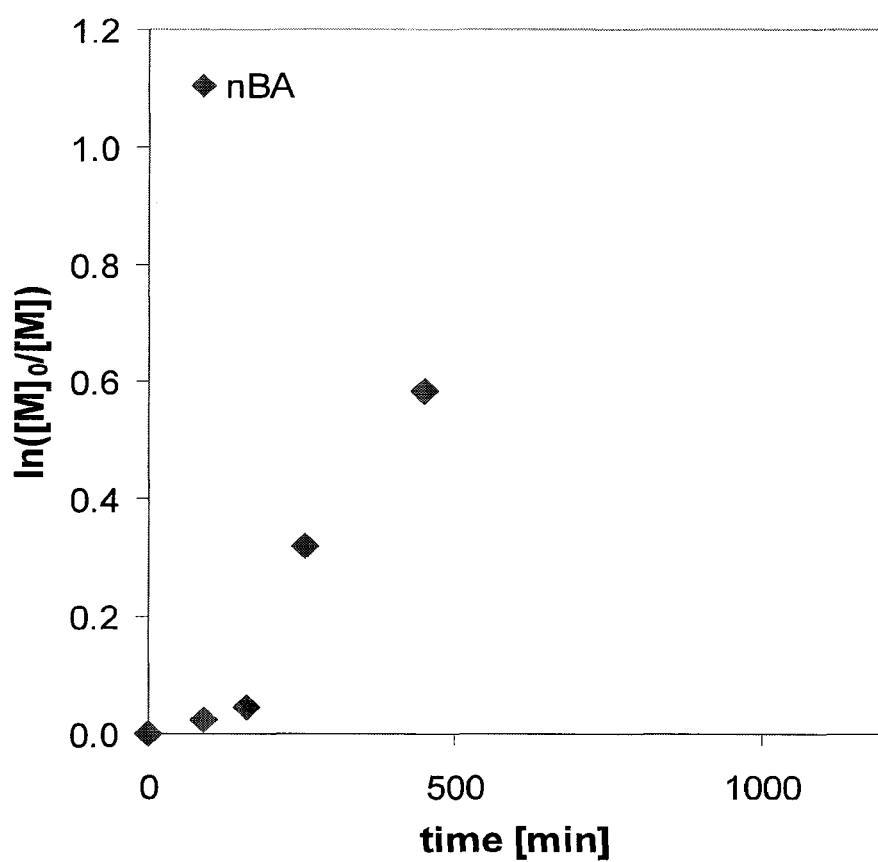

FIG. 12A. Kinetic plot for example 2A.

Figure 12B:
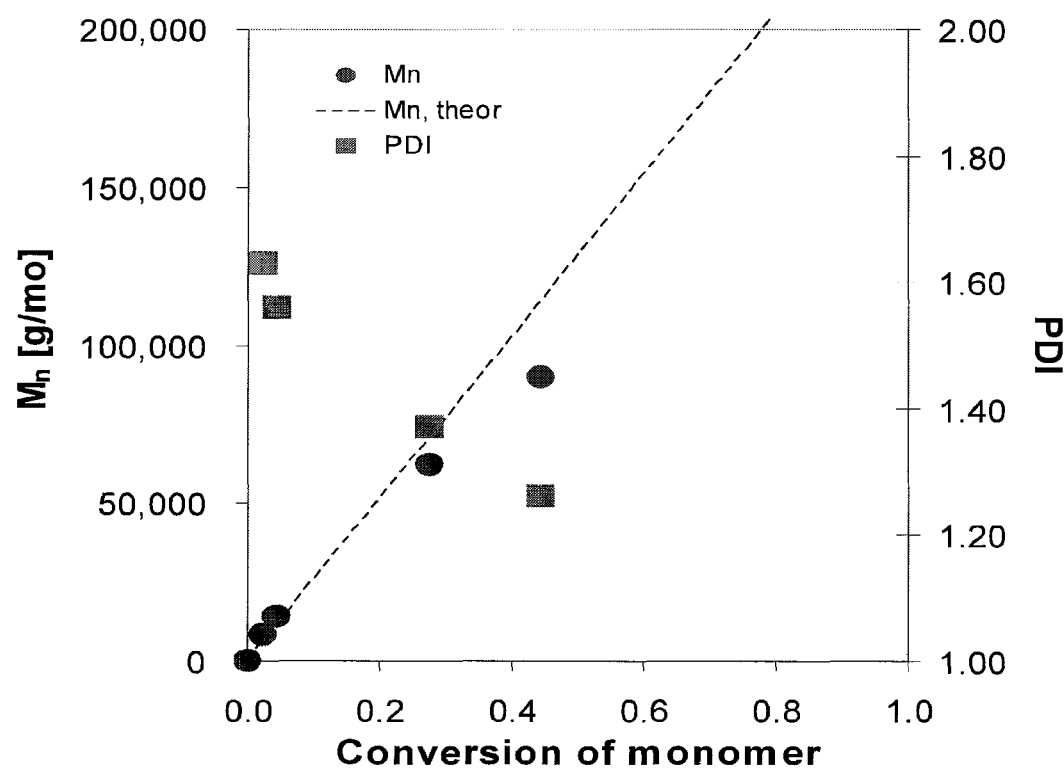

FIG. 12B. Molecular weight and PDI vs. conversion for example 2A.

Figure 12C:
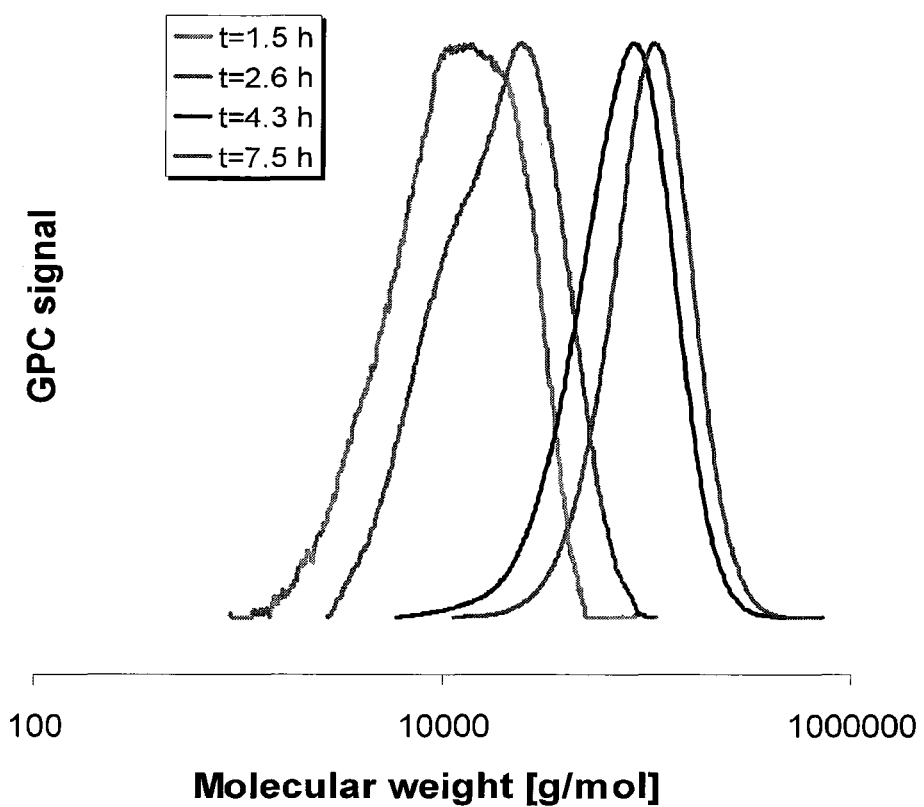

FIG. 12C. GPC curves for example 2A.

Figure 12D:
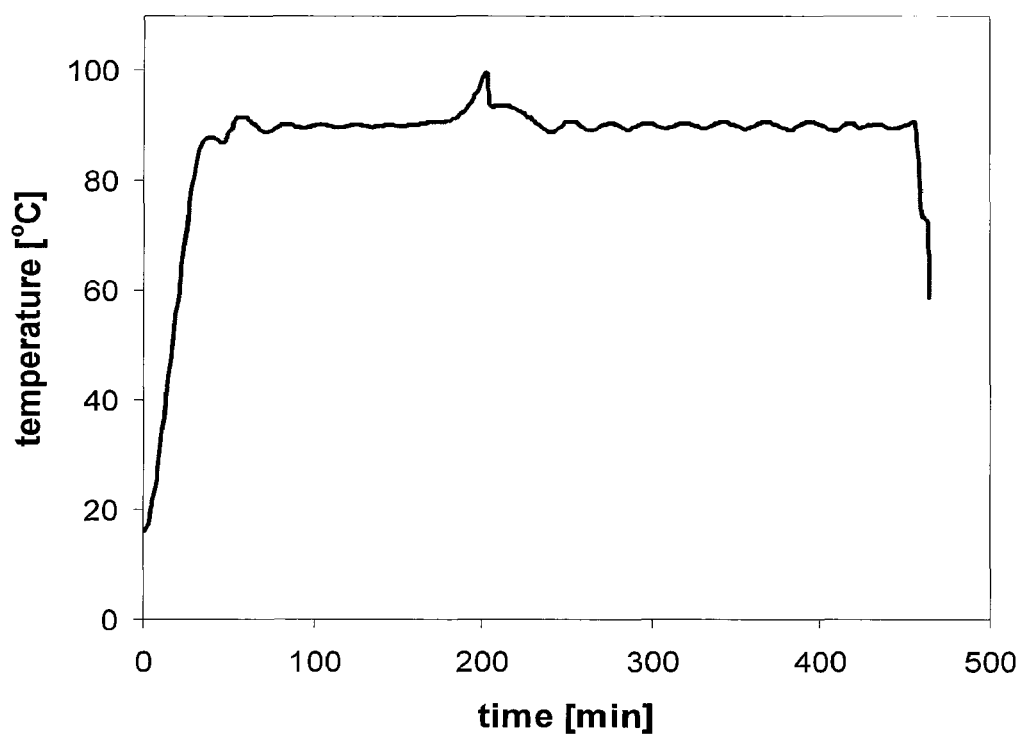

FIG. 12D. Temperature profile for example 2A.

Figure 13A:
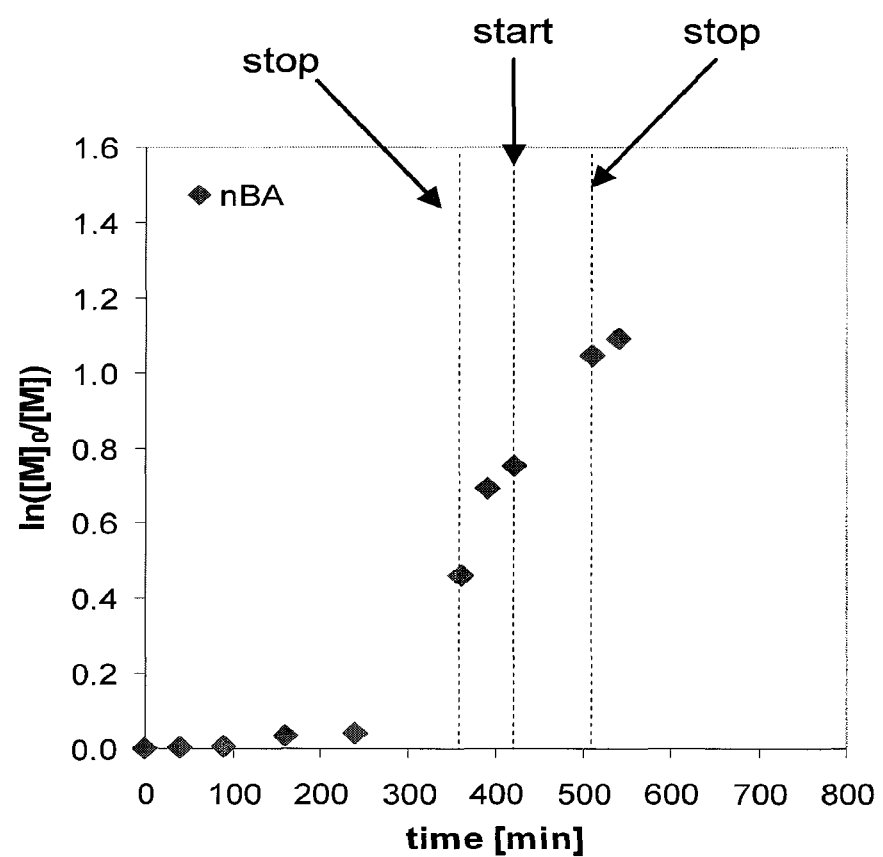
Figure 13B:
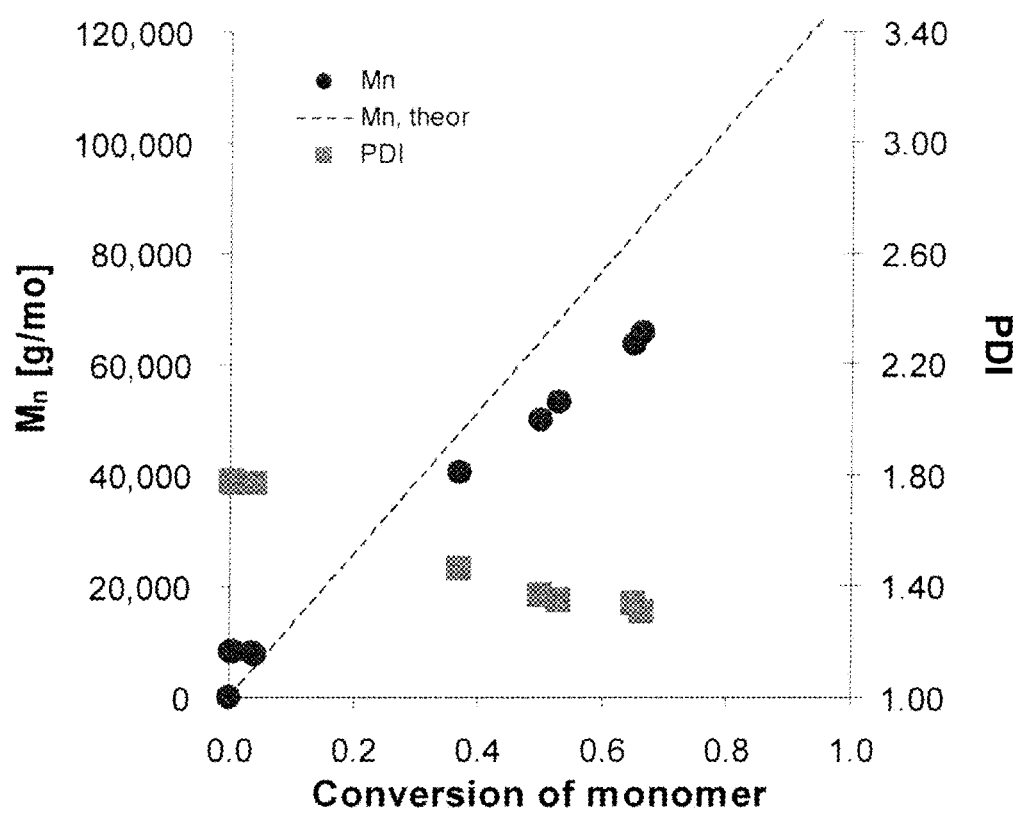
Figure 13C:
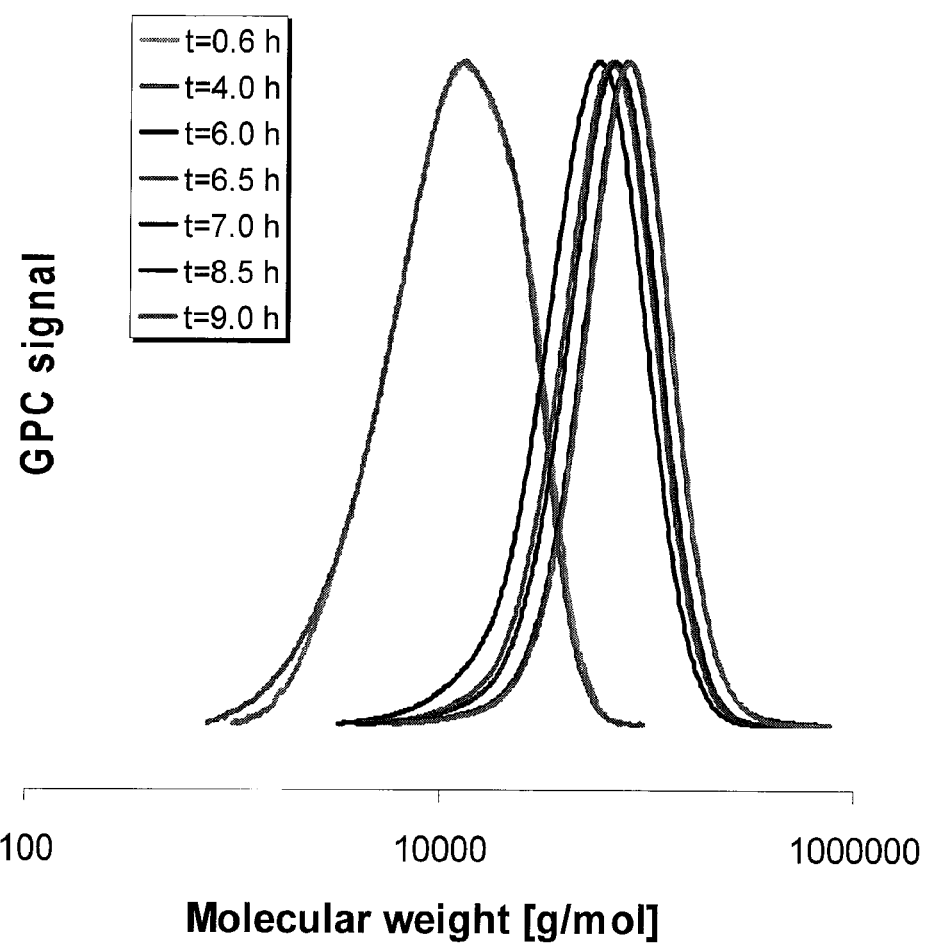

FIGS. 13A-13C. ICAR Polymerization of nBA using V-70 for ICAR ATRP of nBA with feeding of V-70 (experiment WJ-08-0006-194), wherein:

FIG. 13A is the kinetic plot for example 2B;

FIG. 13B is the molecular weight and PDI vs. conversion for example 2B; and

FIG. 13C are GPC traces for example 2B. Conditions: nBA/DEBMM/CuBr$_2$/TPMA/V-70=1000/1/0.05/0.1/–; in bulk [nBA]=6.67 mol/L, 50 ppm of Cu, T=70° C. Feeding rate slow: 0.002 mol equivalent of V-70 vs. DEBMM in 1 h (V-70 in 40 ml of solvent to 850 ml of the reaction solution).

Figure 14:
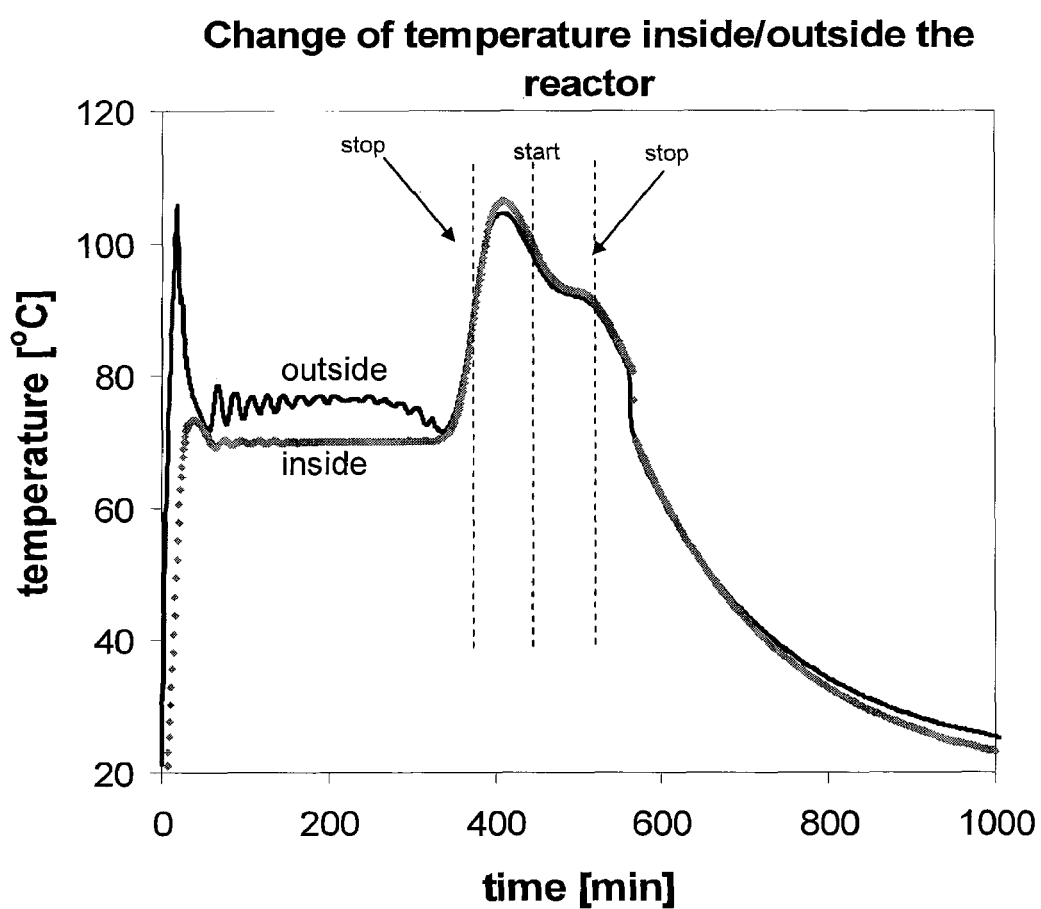

FIG. 14. Temperature profile for run WJ-08-006-194 (example 2B).

Figure 15A:
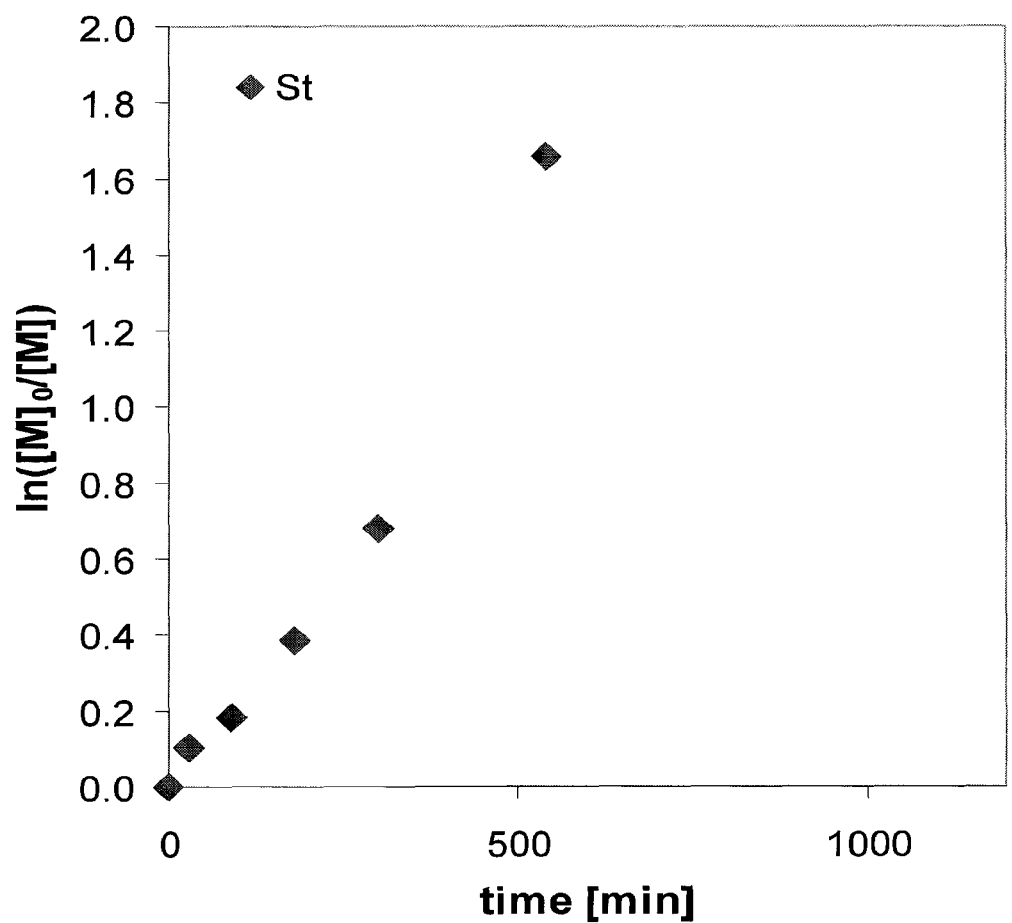
Figure 15B:
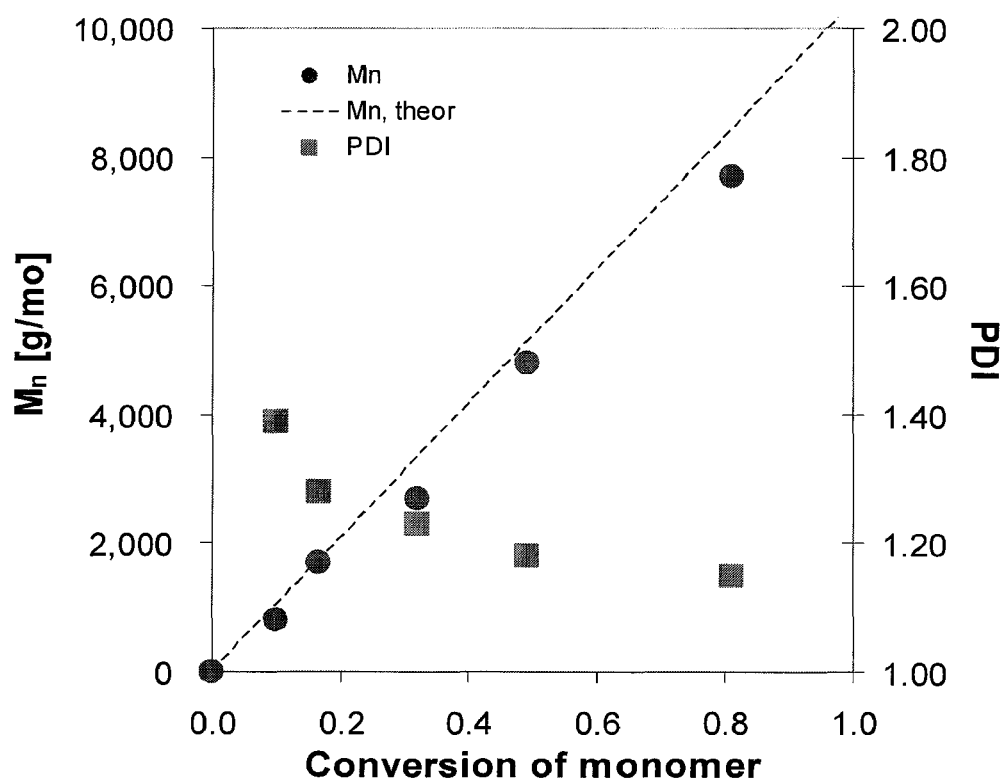
Figure 15C:
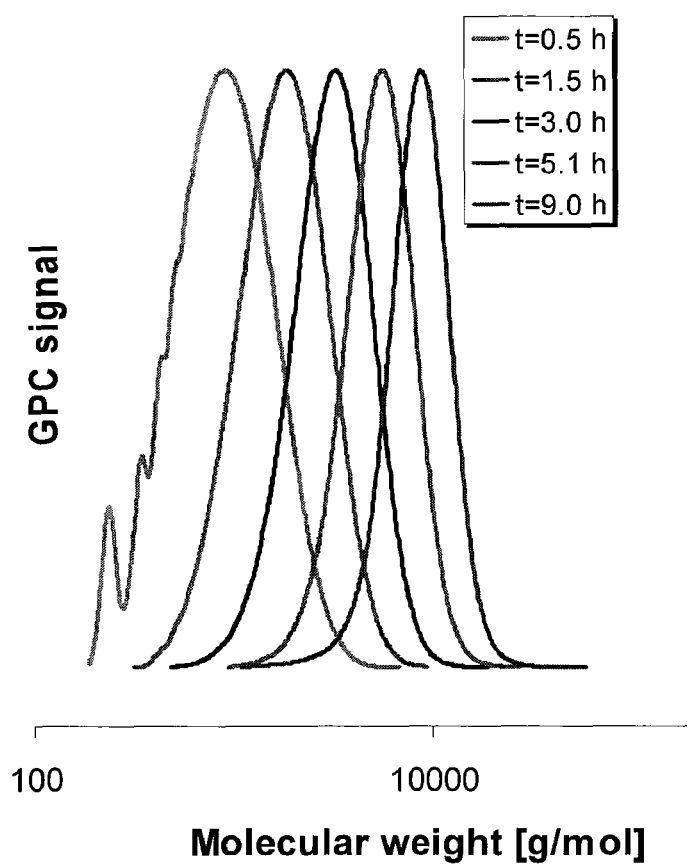

FIGS. 15A-15C. ICAR polymerization of styrene (for WJ-08-006-194), wherein:

FIG. 15A is a kinetic plot;

FIG. 15B shows molecular weight and PDI vs. conversion; and

FIG. 15C are GPC traces for ICAR ATRP of St with feeding of AIBN (experiment WJ-08-006-192). Conditions: St/DEBMM/CuBr$_2$/TPMA/AIBN=100/1/0.005/0.1/0.005; in bulk [St]=8.31 mol/L, 50 ppm of Cu, T=100° C. Feeding rate slow: 0.008 mol equivalent of AIBN vs. DEBMM in 1 h (AIBN in 40 ml of solvent to 850 ml of the reaction solution).

Figure 16A:
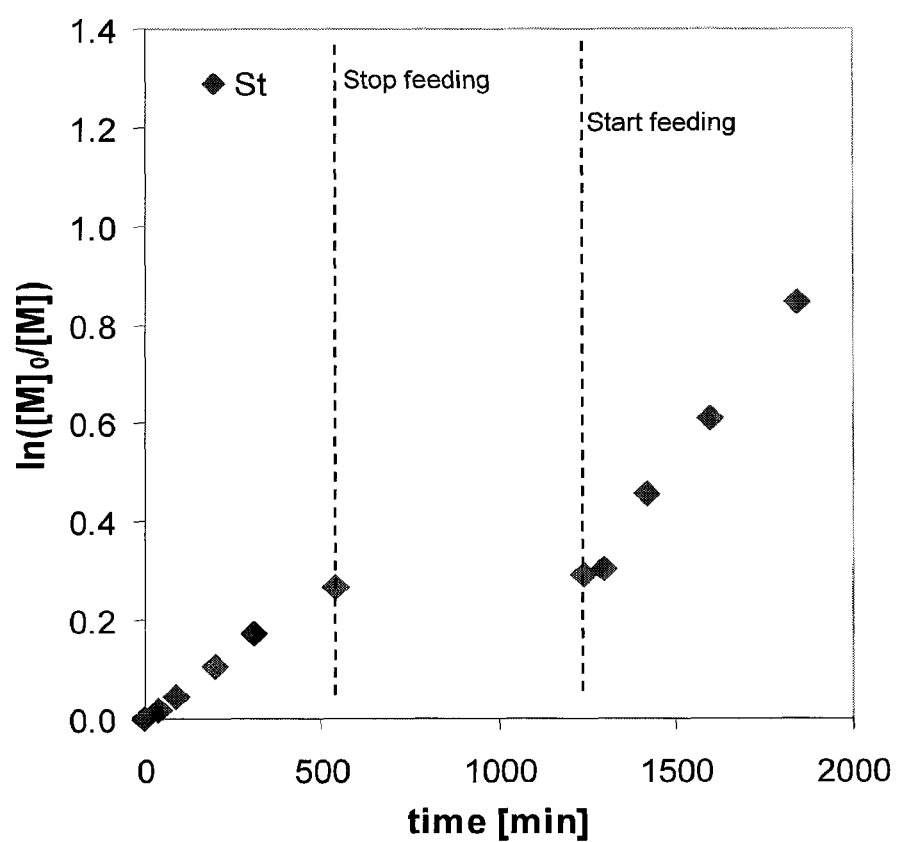
Figure 16B:
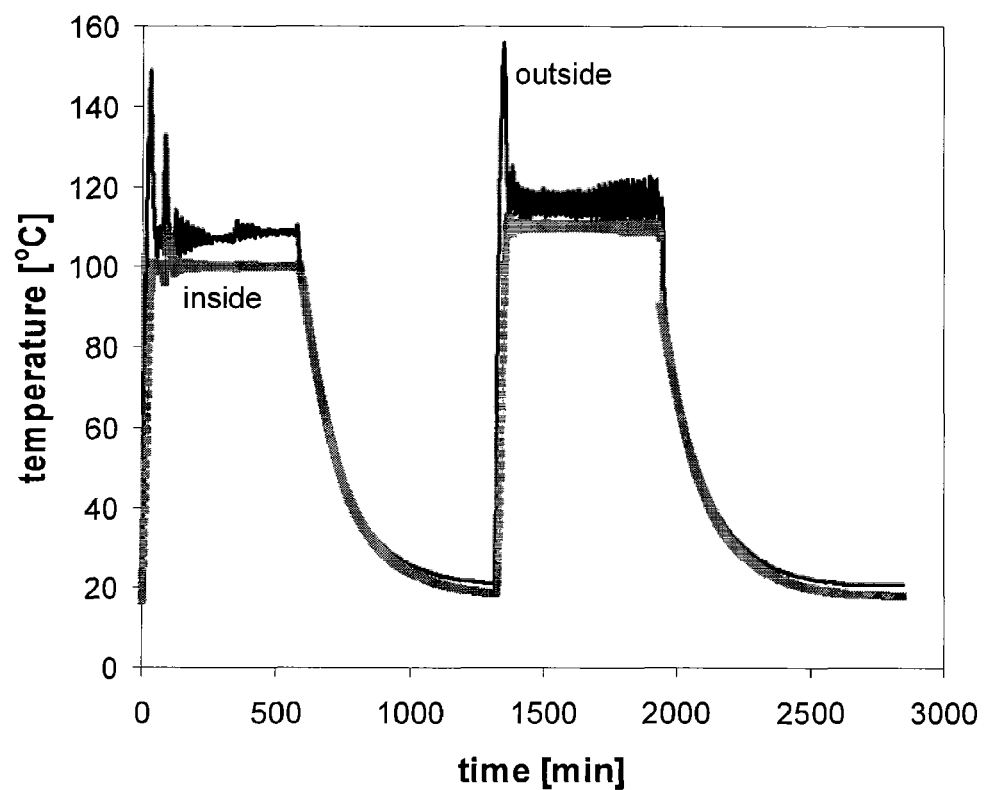

FIGS. 16A and 16B. Polymerization of St (high DP)—(experiment WJ-08-006-193). Automation of process, wherein:

FIG. 16A is a kinetic plot; and

FIG. 16B is the temperature profile. ICAR ATRP of St with feeding of AIBN (experiment WJ-08-006-193). Conditions: St/DEBMM/CuBr$_2$/TPMA/AIBN=1000/1/0.05/0.15/0.025; in bulk [St]=8.31 mol/L, 50 ppm of Cu, T=100-110° C. Feeding rate slow: 0.008 mol equivalent of AIBN vs. DEBMM in 1 h (AIBN in 40 ml of solvent to 850 ml of the reaction solution).

Figure 17A:
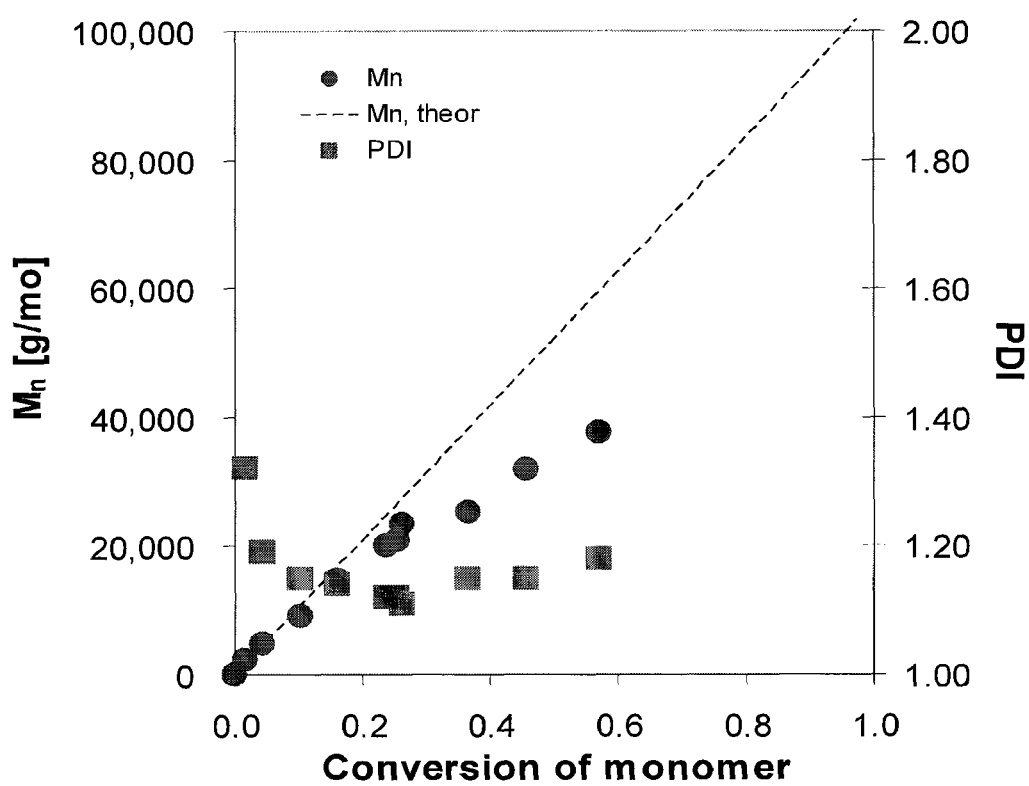
Figure 17B:
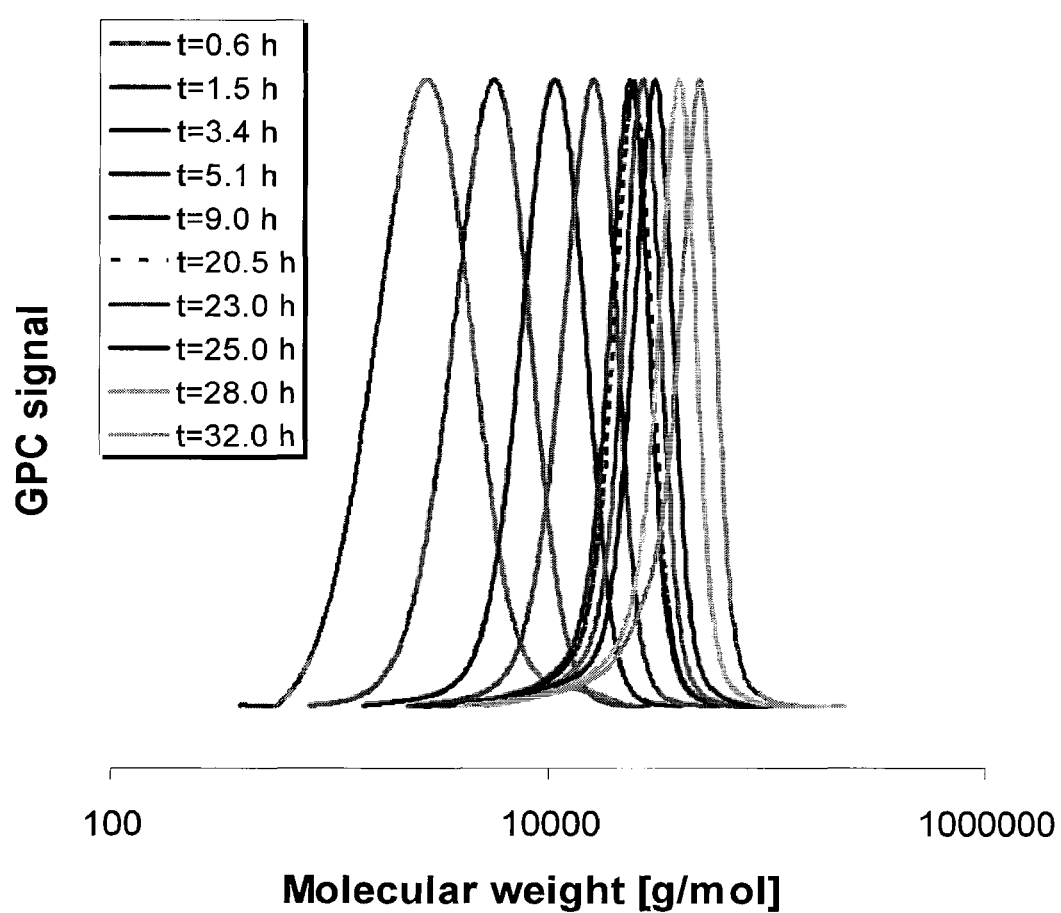

FIGS. 17A and 17B. Kinetics for ICAR ATRP of St with feeding of AIBN (experiment WJ-08-006-193) targeting high DP, wherein:

FIG. 17A is the molecular weight and PDI vs. conversion; and

FIG. 17B are GPC traces. Conditions: St/DEBMM/CuBr$_2$/TPMA/AIBN=1000/1/0.05/0.15/0.025; in hulk [St]=8.31 mol/L, 50 ppm of Cu, T=100-110° C. Feeding rate slow: 0.008 mol equivalent of AIBN vs. DEBMM in 1 h (AIBN in 40 ml of solvent to 850 ml of the reaction solution).

DESCRIPTION OF THE EMBODIMENTS OF THE INVENTION

The term "hydrophilic" is understood to mean, in relation to a material, such as a polymeric arm, or a polymeric segment of a polymeric arm, that the material is water soluble and comprises hydrophilic segments having an HLB equal to or greater than 8, for example, an HLB equal to 16-20, or equal to or greater than 18, 19, or 19.5. In certain embodiments, the hydrophilic segment may comprise at least 75 mol % of water-soluble monomer residues, for example, between 80 mol % to 100 mol % or at least 85 mol %, 90 mol %, 95 mol %, or at least 97 mol % water-soluble monomer residues.

The term "hydrophobic" is understood to mean, in relation to a material, such as a polymeric arm, or a polymeric segment of a polymeric arm, that the material is water insoluble and comprises hydrophilic segments having an HLB less than 8, for example, an HLB less than 7. In certain embodiments, the hydrophobic segment may comprise at least 75 mol % of water-insoluble monomer residues, for example, between 80 mol % to 100 mol % or at least 85 mol %, 90 mol %, 95 mol %, or at least 97 mol % water-insoluble monomer residues.

The term "monomer residue" "monomeric residue" is understood to mean the residue resulting from the polymerization of the corresponding unsaturated monomer. For example, a polymer derived from the polymerization of an acrylic acid monomer (or derivatives thereof, such as acid protected derivatives of acrylic acid including but not limited to methyl ester or t-butyl ester of acrylic acid), will provide polymeric segments, identified as PAA, comprising repeat units of monomeric residues of acrylic acid, i.e., "—CH(CO$_2$H)CH$_2$—". For example, a polymer derived from the polymerization of styrene monomers will provide polymeric segments, identified as PS, comprising repeat units of monomeric residues of styrene, i.e., "—CH(C$_6$H$_5$)CH$_2$—." For example, a polymer derived from the polymerization of monomeric divinylbenzene monomers will provide polymeric segments comprising repeat units of monomeric residues of divinylbenzene, i.e., "—CH$_2$CH(C$_6$H$_5$)CHCH$_2$—."

Suitable unsaturated monomers that may be useful in the reactions and/or formation of the (co)polymers, in the various embodiments presented and disclosed in this application, may include but are not limited to, those selected from protected and unprotected acrylic acid; such as methacrylic acid; ethacrylic acid; methyl acrylate; ethyl acrylate; n-butyl acrylate; iso-butyl acrylate; t-butyl acrylate; 2-ethylhexyl acrylate; decyl acrylate; octyl acrylate; methyl methacrylate; ethyl methacrylate; n-butyl methacrylate; iso-butyl methacrylate; t-butyl methacrylate; 2-ethylhexyl methacrylate; decyl methacrylate; methyl ethacrylate; ethyl ethacrylate; n-butyl ethacrylate; iso-butyl ethacrylate; t-butyl ethacrylate; 2-ethylhexyl ethacrylate; decyl ethacrylate; 2,3-dihydroxypropyl acrylate; 2,3-dihydroxypropyl methacrylate; 2-hydroxyethyl acrylate; 2-hydroxypropyl acrylate; hydroxypropyl methacrylate; glyceryl monoacrylate: glyceryl monoethacrylate; glycidyl methacrylate; glycidyl acrylate; acrylamide; methacrylamide: ethacrylamide; N-methyl acrylamide; N,N-dimethyl acrylamide; N,N-dimethyl methacrylamide; N-ethyl acrylamide; N-isopropyl acrylamide; N-butyl acrylamide; N-t-butyl acrylamide; N,N-di-n-butyl acrylamide; N,N-diethylacrylamide; N-octyl acrylamide; N-octadecyl acrylamide; N,N-diethylacrylamide; N-phenyl acrylamide; N-methyl methacrylamide; N-ethyl methacrylamide; N-dodecyl methacrylamide; N,N-dimethylaminoethyl acrylamide; quaternised N,N-dimethylaminoethyl acrylamide; N,N-dimethylaminoethyl methacrylamide; quaternised N,N-dimethylaminoethyl methacrylamide; N,N-dimethylaminoethyl acrylate; N,N-dimethylaminoethyl methacrylate; quaternised N,N-dimethyl-aminoethyl acrylate; quaternised N,N-dimethylaminoethyl methacrylate; 2-hydroxyethyl acrylate; 2-hydroxyethyl methacrylate; 2-hydroxyethyl ethacrylate; glyceryl acrylate; 2-methoxyethyl acrylate; 2-methoxyethyl methacrylate; 2-methoxyethyl ethacrylate; 2-ethoxyethyl acrylate; 2-ethoxyethyl methacrylate; 2-ethoxyethyl ethacrylate; maleic acid; maleic anhydride and its half esters; fumaric acid; itaconic acid; itaconic anhydride and its half esters; crotonic acid; angelic acid; diallyldimethyl ammonium chloride; vinyl pyrrolidone; vinyl imidazole; methyl vinyl ether; methyl vinyl ketone; maleimide; vinyl pyridine; vinyl pyridine-N-oxide; vinyl furan; styrene sulphonic acid and its salts; allyl alcohol; allyl citrate; allyl tartrate; vinyl acetate; vinyl alcohol;

vinyl caprolactam; vinyl acetamide; vinyl formamide; acrylonitrile; and mixtures thereof.

Other suitable unsaturated monomers that may be useful in the reactions and/or formation of the (co)polymers, in the various embodiments presented and disclosed in this application, may include but are not limited to, those selected from methyl acrylate; methyl methacrylate; methyl ethacrylate; ethyl acrylate; ethyl methacrylate; ethyl ethacrylate; n-butyl acrylate; n-butyl methacrylate; n-butyl ethacrylate; 2-ethylhexyl acrylate; 2-ethylhexyl methacrylate; 2-ethylhexyl ethacrylate; N-octyl acrylamide; 2-methoxyethyl acrylate; 2-hydroxyethyl acrylate; N,N-dimethylaminoethyl acrylate; N,N-dimethylaminoethyl methacrylate; acrylic acid; methacrylic acid; N-t-butylacrylamide; N-see-butylacrylamide; N,N-dimethylacrylamide; N,N-dibutylacrylamide; N,N-dihydroxyethyllacrylamide; 2-hydroxyethyl acrylate, 2-hydroxyethyl methacrylate; benzyl acrylate; 4-butoxycarbonylphenyl acrylate; butyl acrylate; 4-cyanobutyl acrylate; cyclohexyl acrylate; dodecyl acrylate; 2-ethylhexyl acrylate; heptyl acrylate; iso-butyl acrylate; 3-methoxybutyl acrylate; 3-methoxypropyl acrylate; methyl acrylate; N-butyl acrylamide; N,N-dibutyl acrylamide; ethyl acrylate; methoxyethyl acrylate; hydroxyethyl acrylate; diethyleneglycolethyl acrylate; acrylonitrile; styrene (optionally substituted with one or more $C_1$-$C_{12}$ straight or branched chain alkyl groups); alpha-methylstyrene; t-butyl-styrene; p-methylstyrene; and mixtures thereof.

Suitable hydrophobic unsaturated monomers that may be useful in the reactions and/or formation of the (co)polymers, in the various embodiments presented and disclosed in this application, that may be used includes, but is not limited to methyl acrylate; ethyl acrylate; n-butyl acrylate; iso-butyl acrylate; t-butyl acrylate; 2-ethylhexyl acrylate; decyl acrylate; octyl acrylate; methyl methacrylate; ethyl methacrylate; n-butyl methacrylate; iso-butyl methacrylate; t-butyl methacrylate; 2-ethylhexyl methacrylate; decyl methacrylate; methyl ethacrylate; ethyl ethacrylate; n-butyl ethacrylate; iso-butyl ethacrylate; t-butyl ethacrylate; 2-ethylhexyl ethacrylate; decyl ethacrylate; 2,3-dihydroxypropyl acrylate; 2,3-dihydroxypropyl methacrylate; 2-hydroxypropyl acrylate; hydroxypropyl methacrylate; glycidyl methacrylate; glycidyl acrylate; acrylamides; styrene; styrene optionally substituted with one or more $C_1$-$C_{12}$ straight or branched chain alkyl groups; or alkylacrylate. For example, the hydrophobic monomer may comprise styrene; α-methylstyrene; t-butylstyrene; p-methylstyrene; methyl methacrylate; or t-butyl-acrylate. For example, the hydrophobic monomer may comprise styrene. In certain embodiments, the hydrophobic monomer may comprise a protected functional group.

Suitable hydrophilic unsaturated monomers that may be useful in the reactions and/or formation of the (co)polymers, in the various embodiments presented and disclosed in this application, that may be used includes, but is not limited to, protected and unprotected acrylic acid, such as methacrylic acid, ethacrylic acid; methyl acrylate; ethyl acrylate; n-butyl acrylate; iso-butyl acrylate; t-butyl acrylate; 2-ethylhexyl acrylate; decyl acrylate; octyl acrylate; methyl methacrylate; ethyl methacrylate; n-butyl methacrylate; iso-butyl methacrylate; t-butyl methacrylate; 2-ethylhexyl methacrylate; decyl methacrylate; methyl ethacrylate; ethyl ethacrylate; n-butyl ethacrylate; iso-butyl ethacrylate; t-butyl ethacrylate; 2-ethylhexyl ethacrylate; decyl ethacrylate; 2,3-dihydroxypropyl acrylate; 2,3-dihydroxypropyl methacrylate; 2-hydroxyethyl acrylate; 2-hydroxypropyl acrylate; hydroxypropyl methacrylate; glyceryl monoacrylate; glyceryl monoethacrylate; glycidyl methacrylate; glycidyl acrylate; acrylamide; methacrylamide; ethacrylamide; N-methyl acrylamide; N,N-dimethyl acrylamide; N,N-dimethyl methacrylamide; N-ethyl acrylamide; N-isopropyl acrylamide; N-butyl acrylamide; N-t-butyl acrylamide; N,N-di-n-butyl acrylamide; N,N-diethylacrylamide; N-octyl acrylamide; N-octadecyl acrylamide; N,N-diethylacrylamide; N-phenyl acrylamide N-methyl methacrylamide; N-ethyl methacrylamide; N-dodecyl methacrylamide; N,N-dimethylaminoethyl acrylamide; quaternised N,N-dimethylaminoethyl acrylamide; N,N-dimethylaminoethyl methacrylamide; quaternised N,N-dimethylaminoethyl methacrylamide; N,N-dimethyiaminoethyl acrylate; N,N-dimethylaminoethyl methacrylate; quaternised N,N-dimethyl-aminoethyl acrylate; quaternised N,N-dimethylaminoethyl methacrylate; 2-hydroxyethyl acrylate; 2-hydroxyethyl methacrylate; 2-hydroxyethyl ethacrylate; glyceryl acrylate; 2-methoxyethyl acrylate; 2-methoxyethyl methacrylate; 2-methoxyethyl ethacrylate; 2-ethoxyethyl acrylate; 2-ethoxyethyl methacrylate; 2-ethoxyethyl ethacrylate; maleic acid; maleic anhydride and its half esters; fumaric acid; itaconic acid; itaconic anhydride and its half esters; crotonic acid; angelic acid; diallyldimethyl ammonium chloride; vinyl pyrrolidone vinyl imidazole; methyl vinyl ether; methyl vinyl ketone; maleimide; vinyl pyridine; vinyl pyridine-N-oxide; vinyl furan; styrene sulphonic acid and its salts; allyl alcohol; allyl citrate; allyl tartrate; vinyl acetate; vinyl alcohol; vinyl caprolactam; vinyl acetamide; or vinyl formamide. For example, the hydrophilic unsaturated monomer may comprise protected and unprotected acrylic acid, such as methacrylic acid, ethacrylic acid; methyl acrylate; ethyl acrylate; n-butyl acrylate; iso-butyl acrylate; t-butyl acrylate; 2-ethylhexyl acrylate; decyl acrylate; octyl acrylate; methyl acrylate; methyl methacrylate; methyl ethacrylate; ethyl acrylate; ethyl methacrylate; ethyl ethacrylate; n-butyl acrylate; n-butyl methacrylate; n-butyl ethacrylate; 2-ethylhexyl acrylate; 2-ethylhexyl methacrylate; 2-ethylhexyl ethacrylate; N-octyl acrylamide; 2-methoxyethyl acrylate; 2-hydroxyethyl acrylate; N,N-dimethylaminoethyl acrylate; N,N-dimethylaminoethyl methacrylate; acrylic acid; methacrylic acid; N-t-butylacrylamide; N-sec-butylacrylamide; N,N-dimethylacrylamide; N,N-dibutylacrylamide; N,N-dihydroxyethyllacrylamide; 2-hydroxyethyl acrylate; 2-hydroxyethyl methacrylate; benzyl acrylate; 4-butoxycarbonylphenyl acrylate; butyl acrylate; 4-cyanobutyl acrylate; cyclohexyl acrylate; dodecyl acrylate; 2-ethylhexyl acrylate; heptyl acrylate; iso-butyl acrylate; 3-methoxybutyl acrylate; 3-methoxypropyl acrylate; methyl acrylate; N-butyl acrylamide; N,N-dibutyl acrylamide; ethyl acrylate; methoxyethyl acrylate; hydroxyethyl acrylate; or diethyleneglycolethyl acrylate. For example, the hydrophilic unsaturated monomer may comprise protected and unprotected acrylic acid, such as methacrylic acid, ethacrylic acid; methyl acrylate; ethyl acrylate; n-butyl acrylate; iso-butyl acrylate; t-butyl acrylate; 2-ethylhexyl acrylate; decyl acrylate; octyl acrylate; 2-hydroxyethyl acrylate; N-isopropylacrylamide; ethylene glycol methacrylate; (polyethylene glycol) methacrylate; or quaternized dimethylaminoethyl methacrylate. For example, the hydrophilic unsaturated monomer may comprise acrylic acid, such as methacrylic acid, 2-hydroxyethyl acrylate; acrylamide; vinyl pyrrolidone; vinyl pyridine; styrene sulphonic acid; PEG-methacrylate; 2-(dimethylamino)ethyl methacrylate; 2-(trimethylamino)ethyl methacrylate; 2-acrylamido-2-methylpropane sulphonic acid. For example, the hydrophilic monomer may comprise acrylic acid.

Suitable metal catalysts that may be useful in the reactions and/or formation of the (co)polymers, in the various embodiments presented and disclosed in this application, may include metals such as transition metals, like $Cu^0$, that may convert to an oxided metal in situ and/or those represented by Formula (I):

$$M_t^{+n}X'_n \qquad \text{Formula (I)}$$

wherein $M_t^{+n}$ may comprise $Cu^{+1}$; $Cu^{+2}$; $Fe^{+2}$; $Fe^{+3}$; $Ru^{+2}$; $Ru^{+3}$; $Cr^{+2}$; $Cr^{+3}$; $Mo^{+2}$; $Mo^{+3}$; $W^{+2}$; $W^{+3}$; $Mn^{+3}$; $Mn^{+4}$; $Rh^{+4}$; $Re^{+2}$; $Re^{+3}$; $Co^{+1}$; $Co^{+2}$; $V^{+2}$; $V^{+3}$; $Zn^{+1}$; $Zn^{+2}$; $Au^{+1}$; $Au^{+2}$; $Ag^{+1}$; and $Ag^{+2}$;

wherein X' may comprise halogen; $C_1$-$C_6$-alkoxy; $(SO_4)_{1/2}$; $(PO_4)_{1/3}$; $(R^1PO_4)_{1/2}$; $(R'_2 PO_4)$; triflate; hexafluorophosphate; methanesulfonate; arylsulfonate; CN; and $R^2CO_2$; wherein $R^1$ may comprise aryl or a straight or branched $C_1$-$C_{20}$ alkyl group, such as $C_1$-$C_{10}$ alkyl group, or where two $R^1$ groups may be joined to form a 5-, 6-, or 7-membered heterocyclic ring; wherein $R^2$ may comprise hydrogen or a straight or branched $C_1$-$C_6$ alkyl group which may be substituted from 1 to 5 times with a halogen; and wherein n is the formal charge on the metal (0≤n≤7).

The metal catalyst may be a metal-halide catalyst, wherein the metal-halide catalyst may be present in an active form or in an inactive form. For example, an inactive metal-halide catalyst may comprise a metal having a higher oxidation state than a metal of a corresponding activate metal-halide catalyst. The inactive metal-halide catalyst may be thought of as a pre-cursor form of an active metal-halide catalyst.

Suitable inactive metal-halide catalysts that may be useful in the reactions and/or formation of the (co)polymers, in the various embodiments presented and disclosed in this application, may include, but are not limited to, those comprising transitions metals, such as, copper, iron, and ruthenium, and one or more halides, such as chloride, bromide, iodide, or combinations thereof. For example, the inactive metal-halide catalyst may be copper(II) halide, such as copper(II) chloride, copper(II) bromide, or copper(II) iodide.

Suitable active metal-halide catalysts that may be useful in the reactions and/or formation of the (co)polymers, in the various embodiments presented and disclosed in this application, may include, but are not limited to, those comprising transition metals, such as, copper, iron, and ruthenium, and one or more halides, such as chloride, bromide, iodide, or combinations thereof. For example, the active metal-halide catalyst may be copper(I) halide, such as copper(I) chloride, copper(I) bromide, or copper(I) iodide.

For example, an inactive metal-halide catalyst, such as copper(II) bromide, may participate in a repetitive redox reaction to form an active metal-halide catalyst, such as copper(I) bromide, whereby the active metal-halide catalyst, optionally comprising one or more ligands, may homolytically remove a transferable atom or group from an initiator molecule and/or a dormant polymer chain ($P_n$—X), to form an active propagating species, $P_n^{\cdot}$, in an activating reaction with a rate of activation $k_a$ which may propagate at a rate $k_p$ before an inactive metal-halide catalyst, such as a higher oxidation state transition metal complex ($X$-$M_t^{+1}$/Ligand) deactivates the active propagating species, $P_n^{\cdot}$, by donating back a transferable atom or group to the active chain end, rate $kd_a$ (though not necessarily the same atom or group from the same transition metal complex). (Scheme 1)

Suitable ligands that may be useful in the reactions and/or formation of the (co)polymers, in the various embodiments presented and disclosed in this application, include those that may be capable of forming a complex with an active metal-halide catalyst may include, but are not limited to, tris(2-pyridylmethyl)amine (TPMA); tris[2-(dimethylamino)ethyl]amine (Me6TREN); N,N,N',N",N"-pentamethyldiethyletriamine (PMDETA); N,N,N',N",N"',N"'-hexamethyltriethylenetetramine (HMTETA); 4,4'-dinonyl bipyridine (dNbipy); or bipyridine (bipy).

Other suitable ligands that may be useful in the reactions and/or formation of the (co)polymers, in the various embodiments presented and disclosed in this application, may include, but are not limited to compounds having the formulas:

$$R^3\text{—}Z\text{—}Z^4 \qquad \text{Formula (II)}$$

$$R^3\text{—}Z\text{—}(R^5\text{—}Z)_m\text{—}R^4 \qquad \text{Formula (III)}$$

wherein $R^3$ and $R^4$ are independently selected from the group comprising hydrogen; $C_1$-$C_{20}$ alkyl; aryl; heterocyclyl and $C_1$-$C_6$ alkyl substituted with $C_1$-$C_6$ alkoxy; $C_1$-$C_4$ dialkylamino; C(=Y) $R^7$, C(=Y)$R^8$ $R^9$, and YC(=Y)$R^{10}$, wherein Y may be $NR^{10}$ or O, wherein $R^7$ may be $C_1$-$C_{20}$ alkyl, $C_1$-$C_{20}$ alkoxy, aryloxy or heterocyclyloxy, and wherein $R^8$ and $R^9$ are independently hydrogen or $C_1$-$C_{20}$ alkyl, or $R^8$ and $R^9$ may be joined together to form an $C_2$-$C_5$ alkylene group, thus forming a 3- to 5-membered ring, and wherein $R^{10}$ is hydrogen, straight or branched $C_1$-$C_{20}$ alkyl or aryl;

wherein Z may be O, S, $NR^6$, or $PR^6$, wherein $R^6$ may be $R^3$ and $R^4$, and wherein Z may be $PR^6$, wherein $R^6$ may be $C_1$-$C_{20}$ alkoxy;

wherein each $R^7$ may be independently a divalent group selected from the group comprising $C_3$-$C_3$ cycloalkanediyl, $C_3$-$C_8$ cycloalkenediyl, arenediyl, or heterocyclylene, wherein the covalent bonds to each Z may be at vicinal positions, and $C_2$-$C_4$ alkylene and $C_2$-$C_4$ alkenylene wherein the covalent bonds to each Z are at vicinal positions or at β-positions; and m is from 1 to 6.

For example, compounds of Formulas (II) or (III) may comprise an $R^3$ and $R^4$ that may be joined to form a saturated, unsaturated or heterocyclic ring. The compounds of Formulas (II) or (Ill) may comprise compounds wherein each of $R^3$—Z and $R^4$, form a ring with the $R^5$ group to which the Z may be bound to form a linked or fused heterocyclic ring system. The compounds of Formulas (II) or (III) may comprise compounds wherein one or both of $R^3$ and $R^4$ may be heterocyclyl, and in which Z may be a covalent bond; $CH_2$; a 4- to 7-membered ring fused to $R^3$ or $R^4$ or both; CO; porphyrins or porphycenes, which may be substituted with from 1 to 6 halogen atoms; $C_1$-$C_6$ alkyl groups; $C_1$-$C_6$ alkoxy groups; $C_1$-$C_6$ alkoxycarbonyl; aryl groups; heterocyclyl groups; or $C_1$-$C_6$ alkyl groups further substituted with from 1 to 3 halogens.

Other suitable ligands that may be useful in the reactions and/or formation of the (co)polymers, in the various embodiments presented and disclosed in this application, may include, but are not limited to compounds comprising the Formula (IV):

$$R^{11}R^{12}C(C(=Y)R^7)_2 \qquad \text{Formula (IV)}$$

wherein Y and $R^7$ are as defined above, and wherein each of $R^{11}$ and $R^{12}$ may be independently selected from the group comprising hydrogen; halogen; $C_1$-$C_{20}$ alkyl; aryl; or heterocyclyl; and wherein $R^{11}$ and $R^{12}$ may be joined to form a $C_3$-$C_8$ cycloalkyl ring or a hydrogenated aromatic or heterocyclic ring, any of which (except for hydrogen and halogen) may be further substituted with 1 to 5 $C_1$-$C_6$ alkyl groups, $C_1$-$C_6$ alkoxy groups, halogen atoms, aryl groups, or combinations thereof; and arenes and cyclopentadienyl ligands, wherein the cyclopentadienyl ligand may be substituted with from 1 to 5 methyl groups, or may be linked through an ethylene or propylene chain to a second cyclopentadienyl ligand.

The term "initiator" is understood to mean a molecule comprising one or more transferable atoms or groups, wherein the initiator is capable of decomposing to provide an activated species capable of reacting with unsaturated monomers to form polymeric components. For example, the initiator may be an alkyl-containing molecule comprising one or more transferable atoms or groups, such as a halide-substituted alkyl initiator, wherein the halide is the transferable atom or group.

Suitable initiators that may be useful in the reactions and/or formation of the (co)polymers, in the various embodiments presented and disclosed in this application, may include, but are not limited to, alkyl halides or substituted alkyl halides, such as diethyl 2-bromo-2-methylmalonate (DEBMM); ethyl 2-bromoisobutyrate (EBiB); methyl 2-bromopropionate (MBP); ethyl 2-chloroisobutyrate (ECiB); 1,2-bis(2-bromoisobutyryloxy)ethane (2f-BiB); a low molecular weight initiator comprising one or more transferable atoms or groups, such as a substituted alkyl halide attached to a low molecular weight molecule, or a substituted alkyl halide attached to a low molecular weight molecule having an additional non-initiating functionality; a macroinitiator having one or more transferable atoms or groups, such as a polymeric component comprising an alkyl halide moiety, for example, a polystyrene block having a halide at a terminal end; a solid inorganic material with tethered initiating groups; or a organic material with tethered initiating groups.

Other suitable initiators that may be useful in the reactions and/or formation of the (co)polymers, in the various embodiments presented and disclosed in this application, may include, but are not limited to, having Formula (V):

$$R^{13}R^{14}R^{15}C\text{—}X \qquad \text{Formula (V)}$$

wherein X comprises Cl, Br, I, $OR^{16}$, $SR^1$, $SeR^1$, $OP(=O)R^1$, $OP(=O)(OR^1)_2$, $OP(=O)OR^1$, $O\text{——}N(R^1)_2$ and $S\text{—}(=S)N(R^1)_2$, wherein $R^{16}$ is alkyl of from 1 to 20 carbon atoms in which each of the hydrogen atoms may be independently replaced by halide, $R^1$ is aryl or a straight or branched $C_1$-$C_{20}$ alkyl group, and where an $N(R^1)_2$ group is present, the two $R^1$ groups may be joined to form a 5- or 6-membered heterocyclic ring; and wherein $R^{13}$, $R^{14}$, and $R^{15}$ are each independently selected from the group comprising hydrogen, halogen, $C_1$-$C_{20}$ alkyl, $C_3$-$C_8$ cycloalkyl, $X(=Y)R^7$, $C(=Y)NR^8 R^9$, COCl, OH, CN, $C_2$-$C_{20}$ alkenyl, $C_2$-$C_{20}$ alkynyl oxiranyl, glycidyl, aryl, heterocyclyl, aralkyl, aralkenyl, $C_1$-$C_6$ alkyl in which from 1 to all of the hydrogen atoms are replaced with halogen and $C_1$-$C_6$ alkyl substituted with from 1 to 3 substituents selected from the group consisting of $C_1$-$C_4$ alkoxy, aryl, heterocyclyl, $C(=Y) R$, $C(=Y)NR^8 R^9$, oxiranyl and glycidyl;

wherein $R^7$ is alkyl of from 1 to 20 carbon atoms, alkoxy of from 1 to 20 carbon atoms, aryloxy or heterocyclyloxy; and $R^8$ and $R^9$ are independently hydrogen or alkyl of from 1 to 20 carbon atoms, or $R^8$ and $R^9$ may be joined together to form an alkylene group of from 2 to 5 carbon atoms, thus forming a 3- to 6-membered ring; such that no more than two of $R^{13}$, $R^{14}$ and $R^{15}$ are hydrogen.

The term "activated reducing agent" is understood to mean an agent capable of donating one or more electrons to reduce an inactive metal catalyst to form an active metal catalyst. For example, the activated reducing agent may be an activated radical initiator or an activated free-radical initiator. The activated reducing agent, such as a radical-containing species, may be formed from decomposition of a radical initiator, for example, thermal decomposition of a thermo-activated radical initiator to form a radical-containing species or photo-decomposition of a photo-activated radical initiator to form a radical-containing species. The activated reducing agent may initiate and/or perpetuate a polymerization reaction, such as an ATRP polymerization reaction and/or a ICAR ATRP polymerization reaction, by generating or regenerating the active metal catalyst from the inactive metal catalyst (see Scheme 2).

Some suitable activated reducing agents that may be useful in the reactions and/or formation of the (co)polymers, in the various embodiments presented and disclosed in this application, may include, but are not limited to, the radical species generated from the decomposition of azo-containing compounds such as 2,2'-azobis(2-methylpropionitrile (AIBN); a peroxide, for example, benzoyl peroxide (BPO), lauroyl peroxide, or cyclohexanone peroxide; a peroxy acid, for example, peroxyacetic acid or peroxybenzoic acid; tert-butyl peracetate; 1,1-bis(tert-butylperoxy)-3,3,5-(dibutyl phthalate) trimethylcyclohexane; 2,2'-azobis(4-methoxy-2.4-dimethyl valeronitrile) (V-70); 2,2'-azobis(2.4-dimethyl valeronitrile) (V-65); dimethyl 2,2'-azobis(2-methylpropionate) (V-601); 2,2'-azobis(2-methylbutyronitrile) (V-59); 1,1'-azobis(cyclohexane-1-carbonitrile) (V-40); 2,2'-Azobis[N-(2-propenyl)-2-methylpropionamide] (VF-096); or derivatives or combinations thereof. Other suitable activated reducing agents that may be useful in the reactions and/or formation of the (co)polymers, in the various embodiments presented and disclosed in this application, may include, but are not limited to, the radical species generated from the decomposition acetophenone; anisoin; anthraquinone; anthraquinone-2-sulfonic acid sodium salt monohydrate; (benzene) tricarbonylchromium; benzyl; benzoin ethyl ether; 4-benzoylbiphenyl; 2-benzyl-2-(dimethylamino)-4'-morpholinobutyrophenone; 4,4'-bis(diethylamino)benzophenone; camphorquinone; 2-chlorothioxanthen-9-one; (cumene)cyclopentadienyliron(II) hexafluorophosphate; dibenzosuberenone; 2,2-diethoxyacetophenone; 4,4'-dihydroxybenzophenone; 2,2-dimethoxy-2-phenylacetophenone; 4-(dimethylamino)benzophenone; 4,4'-dimethylbenzil; 2,5-dimethylbenzophenone; 3,4-dimethylbenzophenone; 4'-ethoxyacetophenone; 2-ethylanthraquinone; ferrocene; 3'-hydroxyacetophenone; 4'-hydroxyacetophenone; 3-hydroxybenzophenone; 4-hydroxybenzophenone; 1-hydroxycyclohexyl phenyl ketone; 2-hydroxy-2-methylpropiophenone; 2-methylbenzophenone; 3-methylbenzophenone; methybenzoylformate; 2-methyl-4'-(methylthio)-2-morpholinopropiophenone; phenanthrenequinone; 4'-phenoxyacetophenone; thioxanthen-9-one); or derivatives or combinations thereof.

Other suitable activated reducing agents that may be useful in the reactions and/or formation of the (co)polymers, in the various embodiments presented and disclosed in this application, may include, but are not limited to, the radical species comprising a hydroxyl radical (HO˙); alkoxy radical, such as a substituted alkoxy radical (RO˙); peroxy acid radical, such as a substituted peroxy acid radical (R(CO)OO˙); nitroso radical ($R_2NO˙$); wherein R may independently represent an $C_1$-$C_{20}$ alkyl group or substituted alkyl group; aryl or substituted aryl, or heteroaryl or substituted heteroaryl.

The term "non-activated reducing agent" is understood to mean a precursor agent that decomposes to form an activated reducing agent. For example, a non-activated reducing agent may decompose, such as thermally decompose or photochemically decompose, or undergo a chemical transformation, to form an activated reducing agent. For example, a suitable non-activated reducing agent that may be useful in the reactions and/or formation of the (co)polymers, in the various embodiments presented and disclosed in this application, may includes those that decompose to form an activated reducing agent, such as a hydroxyl radical (HO.); alkoxy radical, such as a substituted alkoxy radical (RO.); peroxy acid radical, such as a substituted peroxy acid radical (R(CO)OO.); nitroso radical ($R_2$NO.); wherein R may independently represent an $C_1$-$C_{20}$ alkyl group or substituted alkyl group; aryl or substituted aryl, or heteroaryl or substituted heteroaryl.

Other suitable non-activated reducing agents that may be useful in the reactions and/or formation of the (co)polymers, in the various embodiments presented and disclosed in this application, may include, but are not limited to, azo-containing compounds such as 2,2'-azobis(2-methylpropionitrile (AIBN); a peroxide, for example, benzoyl peroxide (BPO); lauroyl peroxide, or cyclohexanone peroxide; a peroxy acid, for example, peroxyacetic acid or peroxybenzoic acid; tert-butyl peracetate; 1,1-bis(tert-butylperoxy)-3,3,5-(dibutyl phthalate) trimethylcyclohexane; 2,2'-azobis(4-methoxy-2.4-dimethyl valeronitrile) (V-70); 2,2'-azobis(2.4-dimethyl valeronitrile) (V-65); dimethyl 2,2'-azobis(2-methylpropionate) (V-601); 2,2'-azobis(2-methylbutyronitrile) (V-59); 1,1'-azobis(cyclohexane-1-carbonitrile) (V-40); 2,2'-Azobis[N-(2-propenyl)-2-methylpropionamide] (VF-096); or derivatives or combinations thereof. Other suitable activated reducing agents that may be useful in the reactions and/or formation of the (co)polymers, in the various embodiments presented and disclosed in this application, may include, but are not limited to, acetophenone; anisoin; anthraquinone; anthraquinone-2-sulfonic acid sodium salt monohydrate; (benzene)tricarbonylchromium; benzyl; benzoin ethyl ether; 4-benzoylbiphenyl; 2-benzyl-2-(dimethylamino)-4'-morpholinobutyrophenone; 4,4'-bis(diethylamino)benzophenone; camphorquinone; 2-chlorothioxanthen-9-one; (cumene)cyclopentadienyliron(II) hexafluorophosphate; dibenzosuberenone; 2,2-diethoxyacetophenone; 4,4'-dihydroxybenzophenone; 2,2-dimethoxy-2-phenylacetophenone; 4-(dimethylamino)benzophenone; 4,4'-dimethylbenzil; 2,5-dimethylbenzophenone; 3,4-dimethylbenzophenone; 4'-ethoxyacetophenone; 2-ethylanthraquinone; ferrocene; 3'-hydroxyacetophenone; 4'-hydroxyacetophenone; 3-hydroxybenzophenone; 4-hydroxybenzophenone; 1-hydroxycyclohexyl phenyl ketone; 2-hydroxy-2-methylpropiophenone; 2-methylbenzophenone; 3-methylbenzophenone; methybenzoylformate; 2-methyl-4'-(methylthio)-2-morpholinopropiophenone; phenanthrenequinone; 4'-phenoxyacetophenone; thioxanthen-9-one); or derivatives or combinations thereof.

The identity of the activated reducing agent or the non-activated reducing agent, the timing of when the non-activated reducing agent is added or generates the activated reducing agent, the rate of addition of the non-activated reducing agent, and the rate of generating the activated reducing agent from it's non-activated reducing agent precursor may effect one or more of the following, including the degree of polymerization of the unsaturated monomers utilized in the polymerization reaction, the temperature of the polymerization, the ability to control the temperature and/or rate of the polymerization, and the ability to scale a polymerization reaction to an industrial scale sized reaction.

The term "activated-dependent $t_{1/2}$ value" refers to the amount of time it takes, at a particular activation condition (activation trigger), for half the concentration of non-activated reducing agent in a system to decompose.

The term "temperature-dependent $t_{1/2}$ value" refers to the amount of time it takes, at a particular temperature, for half the concentration of non-activated reducing agent in a system to decompose, such as thermally decompose, to form an activated reducing agent. The term "photo-dependent $t_{1/2}$ value" refers to the amount of time it takes, at a particular electromagnetic exposure (for example light or radiation), for half the concentration of non-activated reducing agent in a system to decompose, such as photo-chemically decompose, to form an activated reducing agent. The temperature-dependent (or photo-dependent) $t_{1/2}$ values may be similar to or longer than the time for mixing, essentially homogenously (or homogenous), of the non-activated reducing agent in the polymerization reaction system. Suitable temperature-dependent (or photo-dependent) $t_{1/2}$ values of a non-activated reducing agent to decompose to form an activated reducing agent that may be useful in the reactions and/or formation of the (co)polymers, in the various embodiments presented and disclosed in this application, may include, but are not limited to $t_{1/2}$ values of between 30 sec. and 30 min. at a particular temperature (or electromagnetic exposure), for example, $t_{1/2}$ values of between 1 min. and 30 min., such as between 1.5 min. and 30 min.; between 2 min. and 30 min.; between 3 min. and 30 min.; between 4 min, and 30 min.; between 5 min. and 30 min.; between 6 min. and 30 min.; between 7 min. and 30 min.; between 8 min. and 30 min.; between 9 min. and 30 min.; between 10 min. and 30 min.; between 1 min. and 25 min.; between 1 min. and 20 min.; between 1 min. and 15 min.; between 1 min. and 10 min.; between 1 min. and 5 min.; between 30 sec. and 20 min.; between 30 sec. and 15 min.; between 30 sec. and 10 min.; between 30 sec. and 5 min.; between 5 min. and 25 min.; between 5 min. and 20 min.; between 5 min. and 15 min.; between 5 min. and 10 min.; or between 10 min. and 20 min. at a particular temperature (or electromagnetic exposure). Suitable temperature-dependent (or photo-dependent) $t_{1/2}$ values of a non-activated reducing agent to decompose, at a particular temperature (or electromagnetic exposure), to form an activated reducing agent that may be useful in the reactions and/or formation of the (co)polymers, in the various embodiments presented and disclosed in this application, may include, but are not limited to $t_{1/2}$ values of less than 30 min., for example, less than 25 min., such as less than 20 min.; less than 15 min.; less than 10 min.; less than 9 min.; less than 8 min.; less than 7 min.; less than 6 min.; less than 5 min.; less than 4 min.; less than 3 min.; less than 2 min.; less than 1 min.; or 30 sec.

As noted above even though ICAR and ARGET ATRP were successfully applied to the preparation of polymeric materials on the laboratory scale, unexpected problems were encountered when larger scale synthesis were conducted. These problems are exemplified by the following discussion involving scaling-up the ICAR system but are also relevant for ARGET ATRP, RAFT and NMP systems.

Precise temperature control throughout the reaction medium is required—if this is not achieved, an increase in temperature will cause the radical initiator which is present in the system to decompose at a faster rate and reduce all $Cu^{II}$ to $Cu^I$ species. The loss of $Cu^{II}$ deactivator from the system results in an uncontrolled polymerization in addition to a temperature exotherm. Moreover control over temperature in an exothermic polymerization reaction is challenging in large scale polymerization procedures due to inefficiencies in heat transfer processes in increasingly viscous media. In standard free radical polymerization systems viscous polymer solutions can lead to the Trommsdorf effect.

Figure 1:
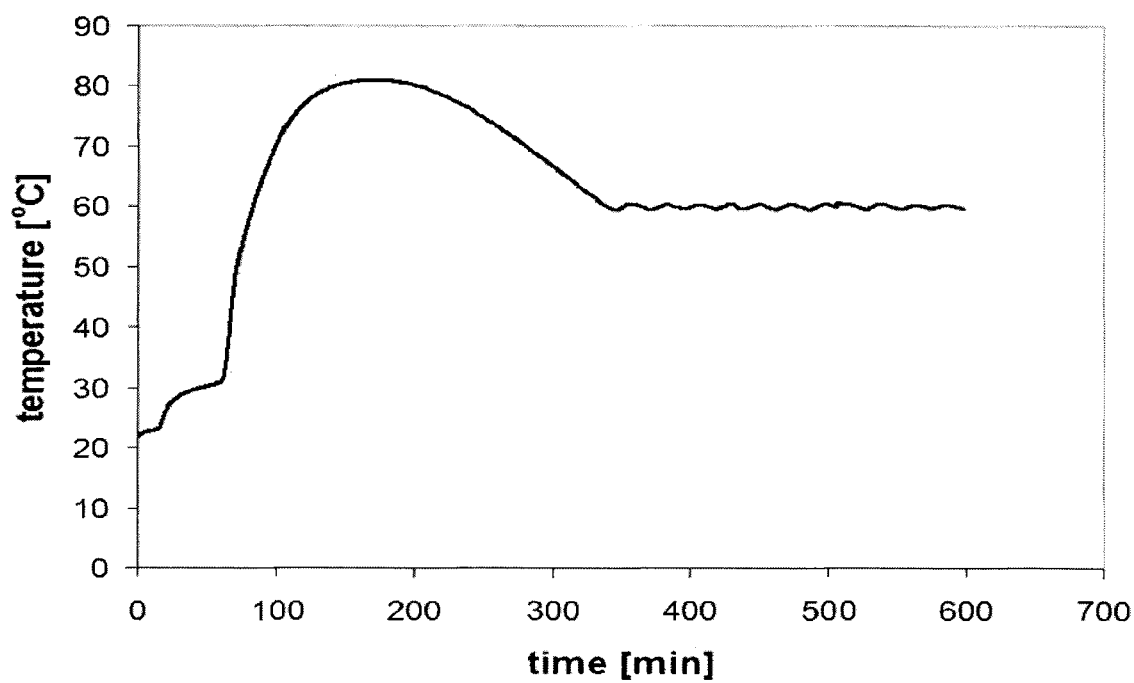

FIG. 1 presents a temperature profile that follows the reaction temperature during the polymerization of nBA using ARGET ATRP on a 1 liter scale. The stirred reaction mixture was heated to 60° C., but due to the exothermic polymerization process the temperature inside the flask increased above 80° C. The polymerization was not well controlled due to overheating. This indicates that the use of internal cooling (e.g., a cooling coil) may not be efficient enough to uniformly keep the temperature within a 2-3° C. temperature range.

Long reaction times due to lower temperatures are used in the publications discussing ICAR/ARGET, and other CRP systems. Lower temperatures are targeted to allow a slow generation of radicals (ICAR) or slow reaction of the added reducing agent with the $Cu^{II}$ complex that had been added at the beginning of the reaction resulting in reaction times that are longer than desired for an economic industrial process.

Lower temperatures also increase the viscosity of the system and limit the range of monomers that can be polymerized to high conversion, for example monomers that form polymers with a glass transition temperature, Tg, close to or below the reaction temperature reach a glassy state at high conversion and control is lost Lack of easy automation of the whole process—as FIG. 1 illustrates, there is no easy way to automate the ICAR/ARGET ATRP with the current experimental setup and the presence of an excess of radical initiator requires good temperature control.

Although small amounts of catalyst and radical initiator (or reducing agent) are used, a further reduction of the amount of copper catalyst and radical initiator is still desired.

Limited accessible molecular weights (MW) of the polymer. For many applications, it is essential to prepare high MW polymers; i.e., polymers with segments above the chain entanglement MW, therefore it is very important to minimize the effect of "side" reactions between the growing radicals and the catalyst that limit the attainable MW. ARGET and ICAR techniques can partially solve this problem due to the use of low catalyst concentration but the problems noted above with side reactions associated with transition metal, ligand and reducing agent have to be resolved by further reducing the concentration of one or more of the reagents.

The new disclosed method will alleviate/resolve all of the above stated limitations.

The new method relies on precise continuous control of the $Cu^{II}/Cu^{I}$ ratio during an ICAR/ARGET ATRP, or instantaneous concentration of radicals in RAFT polymerization, or targeted concentration of the persistent radical present in an NMP process, by feeding a radical initiator (or reducing agent) to the polymerization mixture at a controlled rate and optionally using multiple addition ports to evenly distribute the agent throughout the whole reaction medium. Feeding should occur at a such a rate that the amount of radical initiator (or reducing agent) added or generated can properly compensate for all the termination reactions that had occurred since the last addition and convert only the appropriate amount of $Cu^{II}$ to $Cu^{I}$ (Scheme 3a). Therefore, the amount of added radical initiator, or reducing agent, at any time of feeding should approximately equal to the number of terminated chains (Scheme 3b) formed since the previous addition.

Scheme 3a. Equation used to calculate the number of terminated chains.
Scheme 3b. Schematic showing the requirements for controlled atom transfer radical polymerization under starved feeding conditions of reducing agent or radical initiator.

a)

$-\Delta[Cu^{I}] = \Delta[P_{t}] = k_{t}[P^{\bullet}]^{2}t = \text{Slope} \cdot k_{t}lk_{p}^{2}$ b)

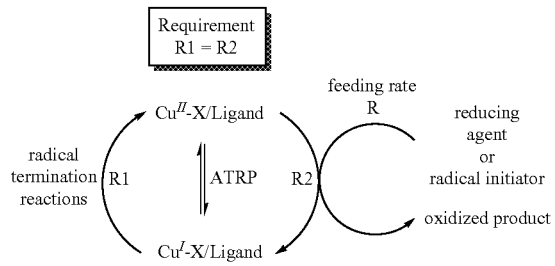

As disclosed herein if the initiator or reducing agents are slowly added throughout the reaction the amount of "excess" activator is controlled and any increase in the rate of decomposition or reduction is avoided. If the reaction temperature should rise stopping addition eventually stops the reaction. Suitable reducing agents are disclosed in incorporated references.

In contrast to the present ARGET and ICAR procedures the amount of initiator added in a single addition may be less than the stoichiometric amount required to reduce all of $Cu^{II}$ present in the reactor to $Cu^{I}$. This will be accomplished by the presence, or activation, of a very small amount of residual initiator (or reducing agent) in the reactor at any time. The amount of initiator fed to the reactor, or generated, may match the amount of termination that occurs since the previous addition/activation. If temperature would locally increase, due to a poor heat exchange or local overheating, the excess reduction of $Cu^{II}$ to $Cu^{I}$ is thereby easily contained and limited to only the amount of initiator locally present in the reaction medium. Thus, instead of adding the entire amount initiator/reducing agent at the beginning of the reaction and counting on fortuitous control over the rate of decomposition of the initiator to maintain control, only as much reducing agent/initiator as needed will be fed to the system, or instantaneously generated, during the entire process while limiting the effect of temperature fluctuations on the rate of reduction of $Cu^{II}$ to $Cu^{I}$.

If such conditions are fulfilled, 'starving conditions' for reducing agent or radical initiator during polymerization process will be achieved and will result in the desired constant $Cu^{II}$ to $Cu^{I}$ ratio. A sufficiently high amount of $Cu^{II}$ is a requirement for production of (co)polymers with narrow molecular weight distribution in a controlled ATRP process, equation 1:

$$\frac{M_w}{M_n} = 1 + \frac{1}{DP_n} + \left(\frac{[R-X]_o k_p}{k_{da}[X-Cu^{II}]}\right)\left(\frac{2}{p} - 1\right) \quad (1)$$

In one embodiment of the process after the desired ratio of $Cu^{II}/Cu^{I}$ is attained only a very small amount of radical initiator (or reducing agent) will be instantaneously present in any volume fraction of the polymerization system. As a result, the ratio of $Cu^{II}/Cu^{I}$ will be kept within the appropriate range to produce polymers with narrow molecular weight distribution, equation 1.

Several advantages accrue from the new 'feeding' method as a result of keeping the instantaneous concentration of radical initiator (or other reducing agent) very low in the polymerization system.

No need of precise temperature control—the only requirement will be to keep the temperature high enough to quickly decompose the added radical initiator, while still allowing sufficient time for distribution of the initiator throughout the targeted volume of the reaction mixture after addition. Multiple addition ports can be used for larger scale industrial equipment to minimize the time required for diffusion of the activator to all parts of the reaction medium or only sufficient light to decompose the required amount of photo-responsive initiators is pulsed into the reactor.

Safe process for exothermic reactions the effect of an exothermic reaction will be diminished by very low instantaneous concentration of radical initiator (or reducing agent) since the added tiny amount of initiator/reducing reagent cannot overwhelm the excess $Cu^{II}$ present in the reactor. This means that in the absence of added initiator/activator only a controlled ATRP reaction can occur and this reaction will slow down if an increased concentration of $Cu^{II}$ is generated by termination reactions since excess $Cu^{II}$ acts to increase the rate of deactivation of any growing radical chains.

Shorter reaction times—due to the use of higher reaction temperatures, reactions can be much faster since the rate constant of propagation increases with temperature much more than that of termination thereby retaining a high mole fraction of "living" chains. Higher reaction temperature also results in lower viscosity systems at any particular conversion and hence the reaction can be driven to higher conversion as well as preparation of higher molecular weight polymers. The conversion of monomer to polymer can therefore exceed 80%, preferably exceed 90% and optimally exceed 95%.

Full automation possible—as only tiny amounts of radical initiator (or reducing agent) are present at any instant in the polymerization medium, the reaction should stop as soon as feeding/activation is stopped. Thus, the rate of polymerization is controlled by the rate of generation of radicals by decomposition of the radical initiator (or by the concentration of reducing agent) and is stopped in any emergency conditions simply by incorporating a feedback loop that stops addition of radical initiator, reducing agent or activation of an added photo-responsive initiator.

Continuous feeding of initiator/reducing agent in order to minimize steady state residual concentration of the radical initiator thereby reducing initiator based side reactions.

Lower amounts of transition metal and ligand are required in the reaction. An excess of ligand is normally used in ARGET and ICAR polymerizations to counteract possibility of formation of a monomer/transition metal complex.

Possible control over PDI by increasing the $Cu^{I}/Cu^{II}$ ratio and $k_p$, which depends on monomer type and temperature.

One pot synthesis of block copolymers since higher chain end functionality is retained.

The molar % conversion that may be achieved by the polymerization reaction processes disclosed herein, may include, but is not limited to, between 65-100 molar % conversion, relative to the initial molar amount of unsaturated monomer introduced into the polymerization system, wherein the molar % conversion refers to the molar amount of unsaturated monomer converted into the form of a polymer or polymeric component. For example, the molar % conversion may be at least 65 molar % conversion, such as up to 100 molar % conversion, example, up to 99 molar % conversion, or up to 98 molar % conversion; and/or at least 70 molar %; at least 75 molar %; at least 80 molar %; at least 85 molar %; at least 90 molar %; at least 95 molar %; at least 97 molar %; or at least 98 molar % conversion, relative to the initial molar amount of unsaturated monomer introduced into the polymerization system.

Suitable temperatures to begin and/or conduct the polymerization reaction that may be useful in the reactions and/or formation of the (co)polymers, in the various embodiments presented and disclosed in this application, may include, but are not limited to, between 25° C. and the temperature at which the $t_{1/2}$ conversion rate is at least 30 sec. (i.e., temperature at $t_{1/2}$=30 sec.), for example, between 25° C. and temperature at $t_{1/2}$=1 min., such as between 25° C. and temperature at $t_{1/2}$=2 min.; between 25° C. and temperature at $t_{1/2}$=3 min.; between 25° C. and temperature at $t_{1/2}$=4 min.; between 25° C. and temperature at $t_{1/2}$=5 min.; between 25° C. and temperature at $t_{1/2}$=6 min.; between 25° C. and temperature at $t_{1/2}$=7 min.; between 25° C. and temperature at $t_{1/2}$=8 min.; between 25° C. and temperature at $t_{1/2}$=9 min.; between 25° C. and temperature at $t_{1/2}$=10 min.; between 25° C. and temperature at $t_{1/2}$=15 min.; between 25° C. and temperature at $t_{1/2}$=20 min.; between 25° C. and temperature at $t_{1/2}$=25 min.; or between 25° C. and temperature at $t_{1/2}$=30 min.

Suitable molar ratios of unsaturated monomers to initiator that may be useful in the reactions and/or formation of the (co)polymers, in the various embodiments presented and disclosed in this application, may include, but are not limited to molar ratios of between 25-5,000:1, for example, between 100-5,000:1, such as between 250-5,000:1; between 500-5,000:1; between 750-5,000:1; between 1,000-5,000:1; between 1,500-5,000:1; between 2,000-5,000:1; between 2,500-5,000:1; between 3,000-5,000:1; between 3,500-5,000:1; between 4,000-5,000:1; or molar ratios of between 4,500-5,000:1.

Suitable ratios of inactive metal catalyst to initiator in the polymerization mixture that may be useful in the reactions and/or formation of the (co)polymers, in the various embodiments presented and disclosed in this application, may include, but is not limited to 0.001-0.5:1, for example, between 0.003-0.5:1, such as between 0.005-0.5:1; between 0.007-0.5:1; between 0.010-0.5:1; between 0.015-0.5:1; between 0.020-0.5:1; between 0.025-0.5:1; between 0.04-0.5:1; between 0.05-0.5:1; between 0.07-0.5:1; between 0.1-0.5:1; between 0.15-0.5:1; between 0.2-0.5:1; between 0.25-0.5:1; between 0.3-0.5:1; between 0.35-0.5:1; between 0.4-0.5:1; or molar ratios of between 0.45-0.5:1 and/or the metal catalyst may be present in the mixture in an amount of less than 250 ppm by mass relative to the total mass of the polymerization mixture.

Suitable amounts of metal catalyst that may be useful in the reactions and/or formation of the (co)polymers, in the various embodiments presented and disclosed in this application, may include amounts in the range of 0.1 parts per million (ppm) by mass to 250 ppm by mass relative to the total mass of the polymerization mixture, for example, between 0.1 and 225 ppm, such as between 0.1 and 200 ppm; between 0.1 and 175 ppm; between 0.1 and 150 ppm; between 0.1 and 125 ppm; between 0.1 and 100 ppm; between 0.1 and 75 ppm; between 0.1 and 50 ppm; between 0.1 and 25 ppm; between 0.1 and 20 ppm; between 0.1 and 15 ppm; between 0.1 and 10 ppm; between 0.1 and 5 ppm; between 0.1 and 3 ppm; or amounts of between 0.1 and 1 ppm.

Suitable ratios of the amount of non-activated reducing agent to initiator that may be useful in the reactions and/or formation of the (co)polymers, in the various embodiments presented and disclosed in this application, may include, but is not limited to 0.01-0.5:1, for example, between 0.02-0.5:1, such as between 0.03-0.5:1; between 0.04-0.5:1; between 0.05-0.5:1; between 0.06-0.5:1; between 0.07-0.5:1; between 0.08-0.5:1; between 0.09-0.5:1; between 0.1-0.5:1; between 0.2-0.5:1; between 0.3-0.5:1; between 0.4-0.5:1; or molar ratios of between 0.45-0.5:1.

Suitable polymers formed by methods disclosed herein that may be useful in the reactions and/or formation of the (co)polymers, in the various embodiments presented and disclosed in this application, may have a molecular weight of greater than 100,000 g/mol, for example, between 100,000 g/mol and 2,000,000 g/mol, such as between 125,000 g/mol and 1,750,000 g/mol; between 150,000 g/mol and 1,750,000 g/mol; between 200,000 g/mol and 1,500,000 g/mol; between 225,000 g/mol and 1,250,000 g/mol; between 125,000 g/mol and 1,000,000 g/mol; between 125,000 g/mol and 900,000 g/mol; between 125,000 g/mol and 800,000 g/mol; between 125,000 g/mol and 700,000 g/mol; between 150,000 g/mol and 650,000 g/mol; between 200,000 g/mol and 600,000 g/mol; between 225,000 g/mol and 650,000 g/mol; between 250,000 g/mol and 550,000 g/mol; between 350,000 g/mol and 500,000 g/mol; between 300,000 g/mol and 500,000 g/mol; between 350,000 g/mol and 750,000 g/mol; between 100,000 g/mol and 1,750.000 g/mol; between 100,000 g/mol and 1,500,000 g/mol; between 100,000 g/mol and 1,125,000 g/mol; between 100,000 g/mol and 1,000,000 g/mol; between 100,000 g/mol and 750,000 g/mol; between 100,000 g/mol and 500,000 g/mol; between 100,000 g/mol and 400,000 g/mol; between 100,000 g/mol and 300,000 g/mol; or between 100,000 g/mol and 200,000 g/mol.

Suitable polymers formed by methods disclosed herein that may be useful in the reactions and/or formation of the (co)polymers, in the various embodiments presented and disclosed in this application, may have degrees of polymerization within a polymeric arm of between 10 and 5,000, such as between 10 and 4,500; between 10 and 4,000; between 10 and 3,500; between 10 and 3,000; between 10 and 2,500; between 10 and 2,000; between 10 and 1,500; between 10 and 1,000; between 10 and 900; between 10 and 800; between 10 and 700; between 10 and 600; between 10 and 500; between 10 and 400; between 10 and 300; between 10 and 200; between 10 and 100; between 10 and 75; between 10 and 50; or between 10 and 25.

Suitable copolymers formed by methods disclosed herein that may be useful in the reactions and/or formation of the (co)polymers, in the various embodiments presented and disclosed in this application, may comprises copolymeric segments having degrees of polymerization of between 10 and 5,000, such as between 10 and 4,500; between 10 and 4,000; between 10 and 3,500; between 10 and 3,000; between 10 and 2,500; between 10 and 2,000; between 10 and 1,500; between 10 and 1,000; between 10 and 900; between 10 and 800; between 10 and 700; between 10 and 600; between 10 and 500; between 10 and 400; between 10 and 300; between 10 and 200; between 10 and 100; between 10 and 75; between 10 and 50; or between 10 and 25.

For example, a suitable copolymer formed by methods disclosed herein that may be useful in the reactions and/or formation of the (co)polymers, in the various embodiments presented and disclosed in this application, may comprises copolymeric segments of styrene residues and acrylic acid residues, wherein the degree of polymerization of the styrene residues may be between 10 and 5,000, such as between 10 and 4,500; between 10 and 4,000; between 10 and 3,500; between 10 and 3,000; between 10 and 2,500; between 10 and 2,000; between 10 and 1,500; between 10 and 1,000; between 10 and 900; between 10 and 800; between 10 and 700; between 10 and 600; between 10 and 500; between 10 and 400; between 10 and 300; between 10 and 200; between 10 and 100; between 10 and 75; between 10 and 50; or between 10 and 25; and wherein the degree of polymerization of the acrylic acid residues may be between 10 and 5,000, such as between 10 and 4,500; between 10 and 4,000; between 10 and 3,500; between 10 and 3,000; between 10 and 2,500; between 10 and 2,000; between 10 and 1,500; between 10 and 1,000; between 10 and 900; between 10 and 800; between 10 and 700; between 10 and 600; between 10 and 500; between 10 and 400; between 10 and 300; between 10 and 200; between 10 and 100; between 10 and 75; between 10 and 50; or between 10 and 25.

Preparing a polymer comprising a degree of polymerization of, for example comprising styrene residues, of between 15 and 5,000, for example, according to the process described herein, may take between 4 to 60 hours, wherein the polymerization reaction temperature is conducted at a temperature wherein the temperature-dependent (or photo-dependent) $t_{1/2}$ values of a non-activated reducing agent to decompose to form an activated reducing agent may be between 30 sec. and 30 min. Similarly, preparing a polymer comprising a degree of polymerization of, for example comprising styrene residues, of between 60 and 500, for example, according to the process described herein, may take between 10 to 12 hours, wherein the polymerization reaction temperature is conducted at a temperature wherein the temperature-dependent (or photo-dependent) $t_{1/2}$ values of a non-activated reducing agent to decompose to form an activated reducing agent may be between 30 sec. and 30 min. The temperature for the process may comprise a temperature of 10° C. below the boiling point of the unsaturated monomer, such as 15° C., 20° C., 25° C. below the boiling point of the unsaturated monomer. The temperature of the process may comprise a temperature wherein the polymerization rate may be accelerated by at least 10%, for example, 15%, 20%, 30%, 50%, 75%, or 100%.

Preparing a polymer comprising a degree of polymerization of, for example comprising acrylate residues, of between 15 and 5,000, for example, according to the process described herein, may take between 2 to 20 hours, wherein the polymerization reaction temperature is conducted at a temperature wherein the temperature-dependent (or photo-dependent) $t_{1/2}$ values of a non-activated reducing agent to decompose to form an activated reducing agent may be between 30 sec. and 30 min. Similarly, preparing a polymer comprising a degree of polymerization of, for example comprising acrylate residues, of between 60 and 500, for example, according to the process described herein, may take between 3 to 5 hours, wherein the polymerization reaction temperature is conducted at a temperature wherein the temperature-dependent (or photo-dependent) $t_{1/2}$ values of a non-activated reducing agent to decompose to form an activated reducing agent may be between 30 sec. and 30 min. The temperature for the process may comprise a temperature of 10° C. below the boiling point of the unsaturated monomer, such as 15° C., 20° C., 25° C. below the boiling point of the unsaturated monomer. The temperature of the process may comprise a temperature wherein the polymerization rate may be accelerated by at least 10%, for example, 15%, 20%, 30%, 50%, 75%, or 100%.

Suitable methods for preparing a polymer from unsaturated monomers that may be useful in the reactions and/or formation of the (co)polymers, in the various embodiments presented and disclosed in this application, may comprise forming a polymer having a degree of polymerization of 200 or less over a polymerization reaction time of 12 hours or less. For example, the prepared polymer may have a degree of polymerization of between 10 and 200, such as between 10 and 175; between 10 and 150; between 10 and 125; between 10 and 100; between 10 and 75; between 10 and 50; between 25 and 200; between 50 and 200; between 75 and 200; between 100 and 200; between 125 and 200; between 150 and 200; between 175 and 200; or combinations thereof, that may be prepared over a polymerization reaction time of between 2 hours and 12 hours, such as between 3 and 10 hours; between 4 and 9 hours; between 5 and 8 hours; between 6 and 10 hours; between 6 and 8 hours; between 2 and 7 hours; between 3 and 10 hours; or combinations thereof.

Suitable polymers formed by methods disclosed herein that may be useful in the reactions and/or formation of the (co)polymers, in the various embodiments presented and disclosed in this application, may have a polydispersity index (PDI) of less than 2.5, for example, a PDI of less that 2.0, such as less than 1.7. For example, a polymer formed by methods disclosed herein may have a PDI of between 1.0 to 2.5, such as between 1.0 and 2.3; between 1.0 and 2.0; between 1.0 and 1.9; between 1.0 and 1.8; between 1.0 and 1.7; between 1.0 and 1.6; between 1.0 and 1.5; between 1.0 and 1.4; between 1.0 and 1.3; between 1.0 and 1.2; between 1.0 and 1.1; between 1.05 and 1.75; between 1.1 and 1.7; between 1.15 and 1.65; or between 1.15 and 1.55.

In operation, the addition of the non-activated reducing agent in certain embodiments, beyond the initial amount provided to the polymerization system, may be influenced by a number of factors, such as the desire to allow for the dispersion or substantial dispersion of the non-reducing agent into the polymerization system prior to it generating the activated reducing agent. For instance, one needs to consider the temperature of the polymerization reaction at which a non-activated reducing agent, such as a thermo-activated reducing agent, like AIBN, is added, as this is related to the rate of conversion, such as $t_{1/2}$ rate of thermal decomposition, to form the activated reducing agent.

For example, in an effort to provide even- or substantially even-dispersal of the non-activated reducing agent prior to its conversion to an activated reducing agent, such factors as the rate of addition of the non-activated reducing agent, or the amount of the non-activated reducing agent that is added, or both, need to be considered and may be influenced by this relationship between reaction temperature and the rate of conversion to form the activated reducing agent. For example, if the conversion rate of the non-activated reducing agent at the particular reaction temperature is shorter than the time it takes to disperse the agent into the system evenly (or substantially evenly), then there is the potential for localized exotherms or "hot-spots" to occur, which can be both a safety hazard, but also impact the molecular weights and PDI of the polymer products formed due to high or very high concentrations of radicals in these localized regions. If the conversion rate of the non-activated reducing agent at the particular reaction temperature is much longer than the time it takes to disperse the agent into the system evenly (or substantially evenly), then this may decrease the efficiency of the polymerization reaction process, unnecessarily extending the overall time of the reaction. It may also result in the accumulation of higher amounts of reducing agent in the polymerization mixture which may be a safety hazard. In view of these concerns, the rate of addition of the non-activated reducing agent may be continuous, non-continuous, periodic or intermittent, adjustable, or combinations thereof, to achieve an even dispersal or substantially even dispersal of the non-activated reducing agent before it generates an activated reducing agent that subsequently activates an inactive metal-halide catalyst to drive the polymerization reaction.

In certain embodiments, the particular relationship between the reaction temperature and the rate of conversion, such as $t_{1/2}$ rate of thermal decomposition, to form an activated reducing agent from a non-activated reducing agent, may provide an ability to start or stop ("start-stop") the polymerization reaction in a safe, effective, and convenient manner. For instance, the progress, degree and/or rate of the polymerization reaction may be regulated or controlled by the rate of addition and/or the amount of the non-activated reducing agent that is added. For example, the progress, degree and/or rate of the polymerization reaction may be stopped by stopping the addition of the non-activated reducing agent may allow for the reaction to stop in a relatively short period of time (such as between 3-30 min.). Similarly, the progress, degree and/or rate of the polymerization reaction may be started by starting the addition of the non-activated reducing agent may allow for the reaction to start in a relatively short period of time (such as between 3-30 min., for example, within the $t_{1/2}$ conversion rate at the reaction temperature). In certain embodiments, the polymerization reaction may undergo a series of start-stop cycles during the production of a particular polymer product. Reasons for wanting to have this ability to start-stop the polymerization reaction, especially on industrial scale, may include, but are not limited to, safety concerns; determining product quality, such as regulating the molecular weights of the products or the degree of polymerization; convenience concerns, such as change of personnel shifts; altering reagent feeds, such as altering the monomer feed, for example, changing monomer identity to produce a copolymer or to add a cross-linker to form a star-macromolecule polymer; and/or combinations thereof.

For example, the determination of when to conduct a start-stop process regarding the addition of the non-activated reducing agent may be based on the molar % conversion that has been achieved by a polymerization reaction process, converting an unsaturated monomer converted into the form of a polymer or polymeric component. The molar % conversion that may signal to start, stop, or adjust the rate of an addition of a portion, or further portion, of a non-activated reducing agent may include, but is not limited to, at least 10 molar % conversion, relative to initial molar amount of unsaturated monomer introduced into the polymerization system, for example, 40 molar % conversion, such as at least 20 molar %; at least 25 molar %; at least 30 molar %; or at least 35 molar % conversion, relative to initial molar amount of unsaturated monomer introduced into the polymerization system.

In certain embodiments, the polymers prepared according to the processes described herein may be utilized in the formation of polymer compositions comprising star macromolecules. For example, the prepared star macromolecule may have a core and five or more polymeric arms. The number of arms within a prepared star macromolecule may vary across the composition of star molecules. The arms on a prepared star macromolecule may be covalently attached to the core of the star. The arms of a prepared star macromolecule may comprise one or more polymer segments or co-polymeric segments (such as block co-polymers), and at least one arm and/or at least one segment may exhibit a different solubility from at least one other arm or one other segment, respectively, in a reference liquid of interest. The prepared star macromolecule may be a mikto star macromolecule.

In certain embodiments, the polymers prepared according to the processes described herein may be utilized to prepare a star macromolecule, comprising: a plurality of arms comprising at least two types of arms, wherein the degree of polymerization of a first-arm-type is greater than the degree of polymerization of a second-arm-type, and wherein said first-arm-type has a distal end portion that is hydrophobic. The star macromolecule may be formed by first forming or obtaining the hydrophobic portion and then forming the remaining portion of the first-arm-type from the end of the hydrophobic portion and the second-arm-type in a one-pot synthesis wherein the polymerization of the second portion of the first-arm-type is commenced prior to the initialization of the second-arm-type but there is at least some point wherein portions, e.g., substantial portions, of the first-arm-type and second-alai-type are being polymerically extended simultaneously.

In certain embodiments, the polymers prepared according to the processes described herein may be utilized to prepare a star macromolecule composition, wherein the number of arms on any particular star macromolecule may vary across the population of star macromolecules in each composition, due to the synthetic process used for the synthesis of the composition. This process is called "arm first" method.

Suitable star macromolecules that may be formed at least in part by the reactions and/or (co)polymers, in the various embodiments presented and disclosed in this application, may include those having a wide range of total number of arms, for example, a star macromolecule may comprise greater than 15 arms. For example, a suitable star macromolecule may comprise between 15 and 100 arms, such as between 15 and 90 arms; between 15 and 80 arms; between 15 and 70 arms; between 15 and 60 arms; between 15 and 50 arms; between 20 and 50 arms; between 25 and 45 arms; between 25 and 35 arms; between 30 and 45 alms; or between 30 and 50 arms.

Abbreviations Used in the Following Examples
ATRP atom transfer radical polymerization
ARGET activator regenerated by electron transfer
ICAR initiator for continuous activator regeneration
DEBMM diethyl 2-bromo-2-methylmalonate
BrPN 2-bromopropionitrile
TPMA tris(2-pyridylmethyl)amine
AIBN 2,2'-azobis(2-methylpropionitrile
V-70 2,2'-azobis(4-methoxy-2.4-dimethyl valeronitrile)

EXAMPLES AND DISCUSSION OF EXAMPLES

During the initial attempts to scale up ARGET/ICAR ATRP detailed below it became clear that the number of variables that have to be controlled are significantly greater than initially expected as the scale of the reactions was increased. Therefore in order to define optimal polymerization conditions for the new 'feeding' methods for ICAR ATRP, it was crucial to generate a set of parameters for the feeding rate of radical initiator that takes into account the specific type of monomer, reaction temperature, type of radical initiator, concentrations and ratios of all reagents, etc. Kinetic modeling was conducted to select initial conditions to reach synthetic targets and understand factors affecting control under many different conditions. In addition, some additional parameters such as rate of diffusion of the initiator fed to the solution, heat transfer related to the reactor design, viscosity of polymer solution at know conversion and others were taken into account.

The potential starting points generated by computer modeling of the critical process factors were investigated by performing experiments on 1 L scale with a single source of added reducing agent. All of these factors were carefully studied to achieve good control over the polymerization process and to provide the kinetic data required for further scale up to industrial scale equipment.

Computer Simulations

The synthetic conditions of the new 'feeding' method for ICAR ATRP were modeled via computer. Comparable software has been successfully applied to many polymerization systems including normal and ICAR ATRP [*Macromolecules* 2007, 40, 6464-6472.] and allows precise calculation of the concentration of all species (including intermediates) in a reaction versus time or conversion. It also penults one to estimate the molecular weight distributions of all polymeric species. All required parameters such as rate constants, initial concentrations of all reactant and the rate of feeding of radical initiator are entered in the workshop assistant of the software. Computer simulations are simple to perform and can be completed in a short period of time, thus a broad range of different variables can be studied to optimize the new 'feeding' method for an exemplary ICAR ATRP. Typical variations for specific monomers are discussed below. In ICAR it is crucial to correlate feeding/generation rate of the radical initiator (RI) with other parameters (temperature, type of radical initiator, etc.) in order to obtain good control over the polymerization process.

Computer Simulations for Polymerization of Methyl Methacrylate

Figure 2:
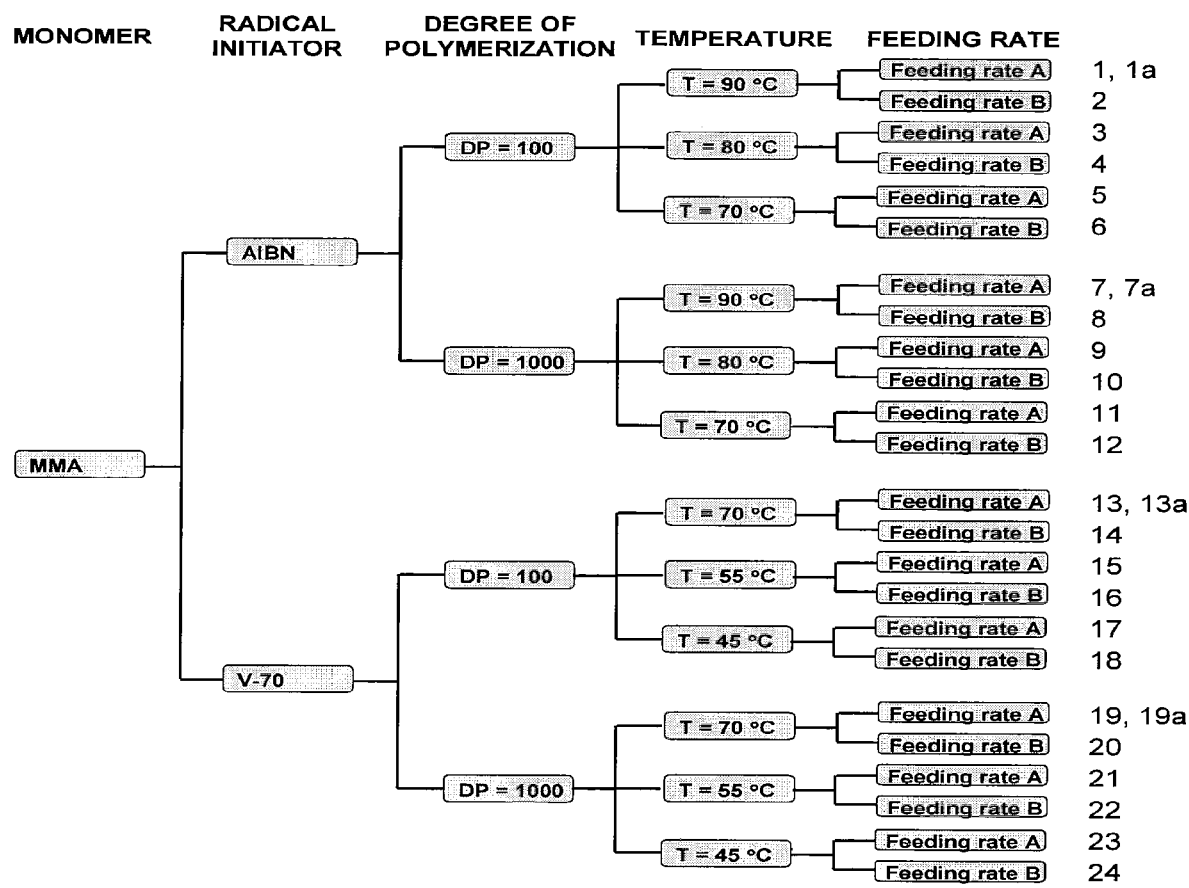

FIG. 2 shows the initial set of parameters used for computer simulations conducted for polymerization of MMA with continuous feeding of two different radical initiators at a series of temperatures targeting different DP. Preliminary results from initial simulation of the proposed method suggested that this approach to process condition evaluation is possible.

The general ratio of reagents for one exemplary non-limiting example of the new 'feeding' method for ICAR ATRP with 50 ppm amount of Cu was: M/R—X/CuBr$_2$/ligand/RI=X/1/0.01/0.01/0.05 in bulk at temperature T (where M—monomer, R—X-alkyl halide initiator, RI—radical initiator, X=100, 500). Commercially available tris(2-pyridylmethyl)amine (TPMA) was used as the initial exemplary ligand and diethyl 2-bromo-2-methylmalonate (DEBMM) was used as an exemplary alkyl halide initiator in the polymerization systems. Other catalysts and initiators were also evaluated. The RI was fed to the reaction medium at two different rates and the targeted reaction time was set for either 6 or 24 hours.

Therefore the initial set of simulations for polymerization of MMA using the new 'feeding' method were conducted with 50 ppm amount of Cu and the ratio of reagents: MMA/DEBMM/Cu$^{II}$Br$_2$/TPMA/RI=X/1/0.01/0.01/0.05 in bulk. Two different radical initiators were used, 2,2'-azobis(2-methylpropionitrile) (AIBN), with a 10 hour half-life decomposition temperature at 65° C.) and 2,2'-Azobis(4-methoxy-2.4-dimethyl valeronitrile) (V-70), with a 10 hour half-life decomposition temperature at 30 = C.). Different temperatures were applied for polymerizations with AIBN (70, 80, 90° C.) and V-70 (45, 55, 70° C.) as radical initiators. They provide half-life decomposition times of 300, 70, 20 minutes, and 60, 15, 3 minutes, correspondingly.

Two different degrees of polymerizations will be chosen (DP=X=100, 1000) in order to cover a typical range of molecular weights accessible with the new method. The feeding rate of the radical initiator will be set for 6 and 24 h as a final time.

The overall volume of the solution of radical initiator that was fed to the reaction was less than 10% versus volume of monomer (reaction volume), i.e., while dilute solutions of the initiator were added the total added solvent will be within limits associated with "monomer" removal from a bulk polymerization. The final objective was to provide conditions for polymerization of a range of methacrylate monomers.

It is expected that a broad range of type I and type II photoinitiators can be employed and simulations will examine the effects of the rate/intensity of stimulation.

Other simulations designed to provide starting conditions for polymerization reactions examined periodic addition/formation of radical initiators or reducing agents for transition metal complexes studied a range of parameters including:

type of monomer (different rate constants of propagation and termination as well as activation and deactivation will be applied to different types of monomers and catalysts). Styrene, n-butyl acrylate and methyl methacrylate were the initial three exemplary monomers as they cover the three largest classes of radically polymerizable monomers.

Type of radical initiator (different rate constants of decompositions, also depending on temperature).

Type of catalyst (different rate constants of activation and deactivation).

Degree of polymerization (DP) (both low and high MW).

Temperature (change of decomposition rates of radical initiator and all other rate constants).

Rate and method of feeding for the radical initiator/activator (slow, fast and periodical).

Other parameters such as ratios and concentrations of reagents were initially kept constant but later were also varied in order to minimize the amount of copper and initiator and optimize polymerization rate.

Figure 3A:
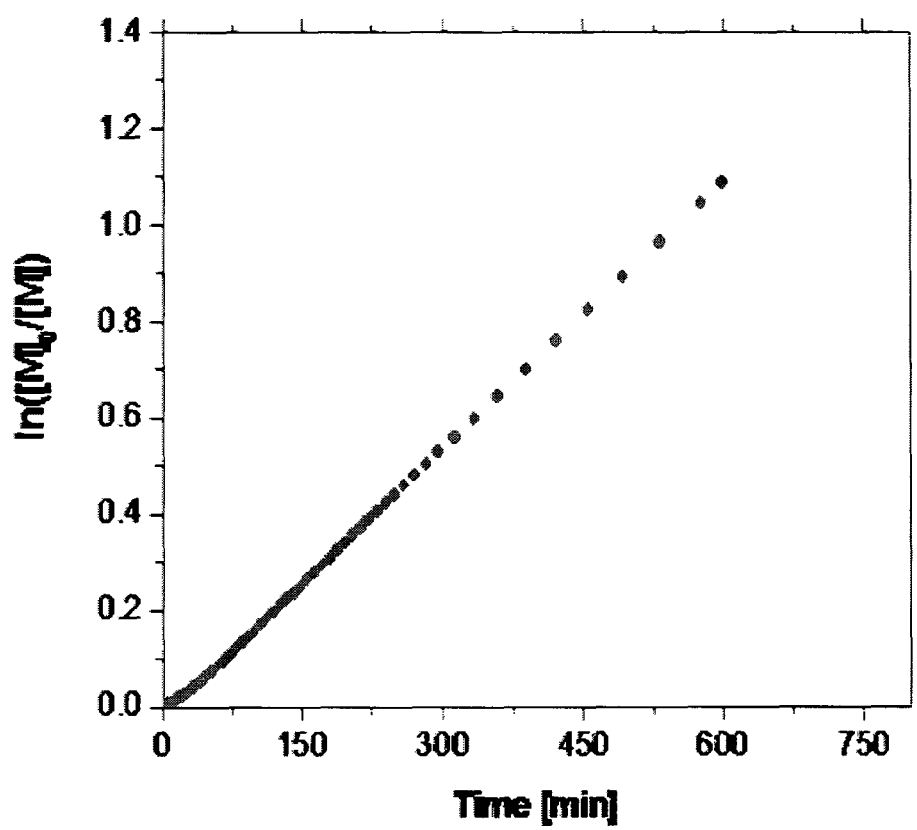
FIG. 3A is a kinetic plot.
Figure 3B:
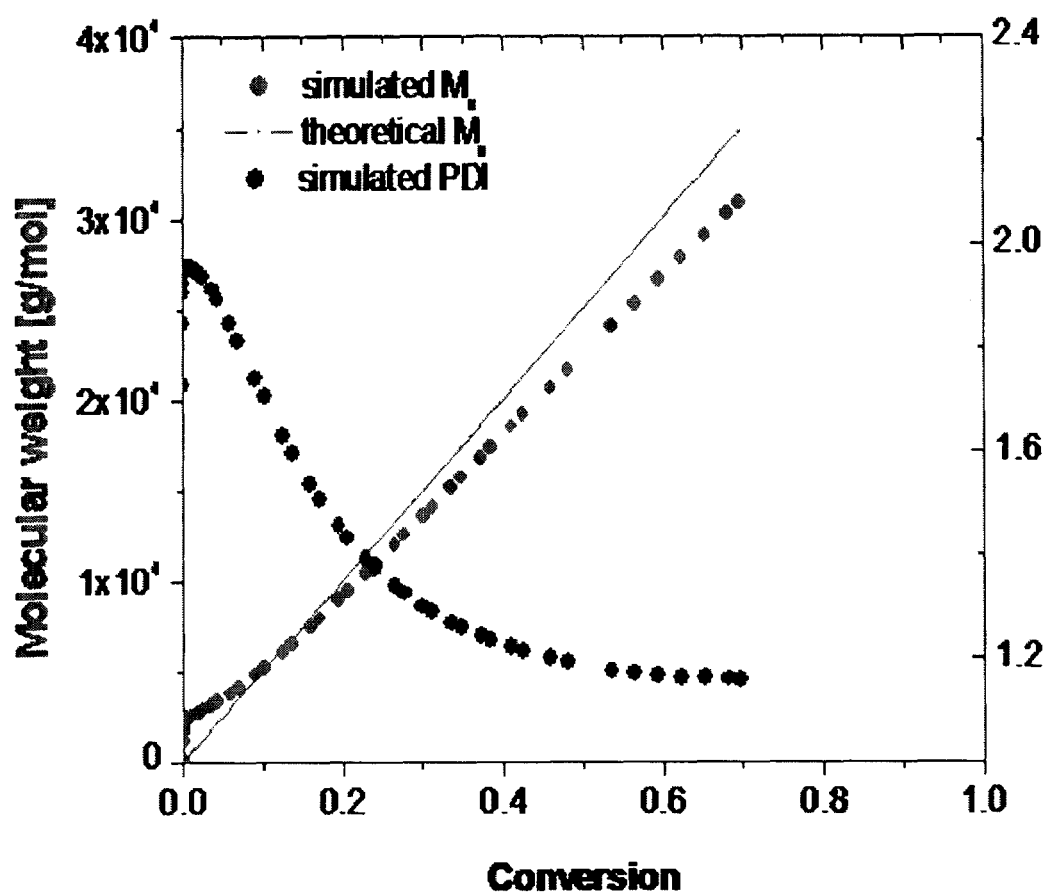
FIG. 3B shows the increase in molecular weight and decrease in PDI vs. conversion.
Figure 3C:
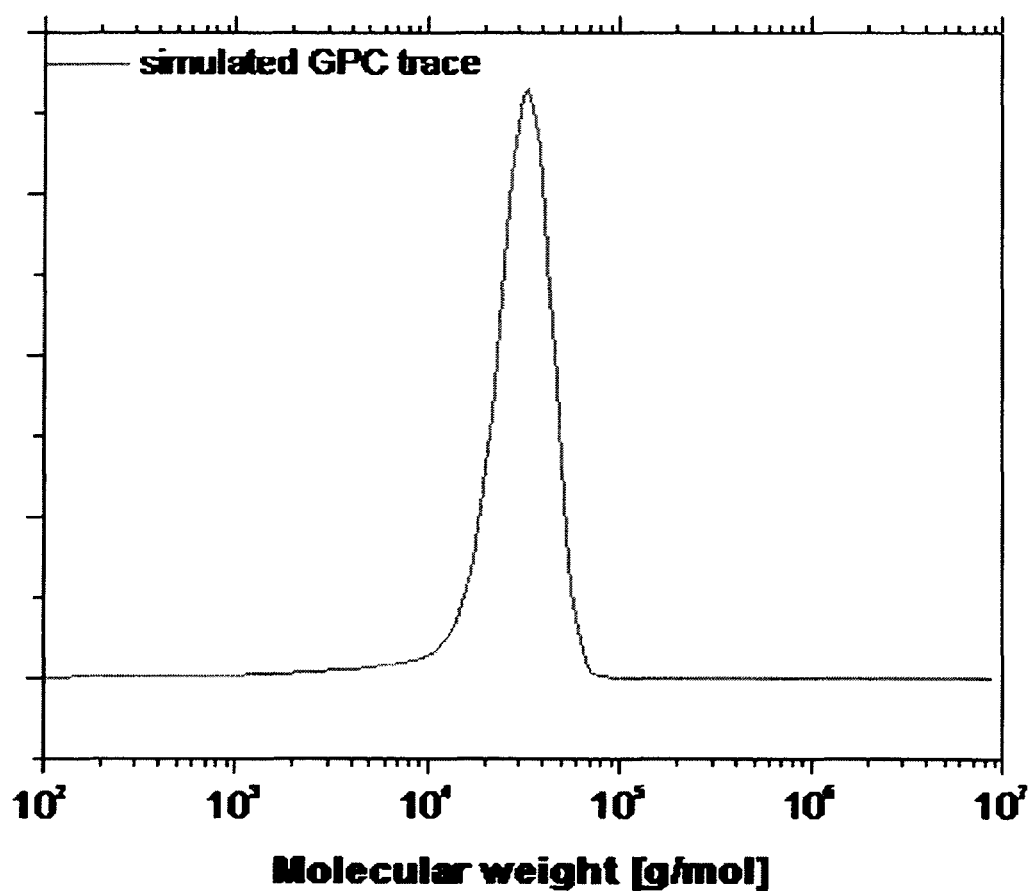
FIG. 3C is a GPC trace. All simulations done for experimental conditions: MMA/DEBMM/Cu$^{II}$Br$_2$/TPMA/AIBN=500/1/0.025/0.025/0.05 in bulk at 90° C., feeding time 10 h.

FIG. 3 shows the simulated kinetic plot, molecular weight and polydispersity (PDI) vs. conversion and GPC trace of PMMA prepared via the feeding method for ICAR ATRP. The results shown in FIG. 3 are for simulations done for experimental conditions: MMA/DEBMM/Cu$^{II}$Br$_2$ TPMA AIBN=500/1/0.025/0.025/0.05 in bulk at 90° C., with a constant concentration of initiator added over a feeding time 10 h. The linear kinetics, good control over molecular weight, low PDI and monomodal distribution of molecular weight show that the polymerization could be well controlled.

A series of simulations were conducted using methyl methacrylate, butyl acrylate and styrene as exemplary monomers. The results from the initial series of simulations for these three monomers provided starting points for reactions conducted in a 1 L reactor. Based on the experimental results, some additional changes can be made in the simulation to fully optimize the investigated polymerization system.

A similar series of simulations will be conducted using a photoresponsive initiator to determine if the rate of radical formation can be controlled by controlled photo-stimulation.

A similar series of simulations will be conducted using a reducing agent to determine if ARGET ATRP con be conducted under "starved" feeding conditions and result in improved control.

Polymerization Experiments

Polymerization experiments using the new 'feeding' method for ICAR ATRP were carried out for three representative monomers (MMA, nBA and St) at a 1 liter scale in a Ace Glass reactor equipped with a heating mantle, mechanical stirrer and thermocouple. At this scale of the reaction, challenges related with heat transfer and viscosity, as well as exothermicity, become important; as discussed the background section and shown in FIG. 1. These factors are not taken into account by computer modeling software. Thus, some adjustments were made in order to fully optimize the new 'feeding' method in the actual ICAR ATRP experimental examples.

Nonetheless, initially each monomer was polymerized with the conditions initially optimized via computer simulations. Additional adjustments were made in order to further increase control over the polymerization. These adjustments are specified for each monomer below.

The run numbers listed below were employed for internal tracking of the experiments and do not have any further significance.

Comparative Example C1

ARGET ATRP of MMA with Sn(EH)2 as reducing agent: Run 07-004-83. Scale: in 1 L reactor.

Conditions: MMA/DEBMM/CuBr$_2$/TPMA/Sn(EH)$_2$=2200/1/0.015/0.06/0.1 in DMF (0.05 volume eq. vs. MMA), (7 ppm of Cu), T=65° C.

The polymerization was performed in bulk and at 65° C. The reaction was well controlled with Mn close to theoretical values and low PDI. The kinetics of the reaction and GPC results of the polymer samples taken during the experiment are shown in FIG. 4. After 27.6 hours the final degree of polymerization (DP) of the polymer was 890 and the $M_{n(GPC)}$=90,000 with a polydispersity of 1.17. A small tailing to the low molecular weight is visible on GPC traces.

Comparative Example C2

Chain extension of polymer prepared in example C1: Run 07-004-84. Scale: 25 mL Schlenk flask.

Conditions: St/PMMA/CuBr$_2$/TPMA/Sn(EII)$_2$=5000/1/0.02/0.06/0.2 in anisole (0.1 volume eq. vs. St), (4 ppm of Cu) T=80° C. (07-004-83 as macroinitiator)

The kinetics of the reaction and GPC results of the experiment are shown in FIG. 5.

The GPC results of the polymer samples taken during the experiment indicates that the chain extension of the PMMA macroinitiator formed in example C1 with St was not fully successful. One can conclude that despite the narrow PDI of the macroinitiator the chain-end functionality is not very high, after 4000 minutes reaction some of macroinitiator was still not chain extended resulting in bimodal molecular weight distribution.

One reason for low chain-end functionality is a transfer reaction of the growing radical to Sn(EH)$_2$ indicating that a different reducing agent has to be used in order to synthesize PMMA with high molecular weight and high chain-end functionality.

Comparative Example C3

ICAR ATRP of MMA with AIBN as radical initiator. Run: 07-004-85. Scale: 1 L reactor Conditions: MMA/DEBMM/CuBr$_2$/TPMA/AIBN=2400/1/0.02/0.025/0.15 in anisole (0.03 volume eq. vs. MMA), (8 ppm of Cu), T=55° C.

The kinetics of the reaction and GPC results of the polymer samples taken during the experiment are shown in FIG. 6. In this comparator example polymerization of MMA was performed in bulk at 55° C. in the presence of AIBN instead of $Sn(EH)_2$ to avoid transfer reactions to $Sn(EH)_2$ apparent during the chain extension reaction described in example C2. After 45.5 hours reaction the DP of the polymer was 894 and the MW 89,500 with $M_n$ close to theoretical values and low PDI indicating the polymerization was well controlled. No tailing is visible on GPC traces suggesting that no transfer reactions occurred during the polymerization process.

Comparative Example C4

Chain extension of polymer prepared in example C3. Run: 07-004-89. Scale: 25 ml, Schlenk flask.

Conditions: St/PMMA/$CuBr_2$/TPMA/$Sn(EH)_2$=5000/1/0.02/0.06/0.2 in anisole (0.1 volume eq. vs. St), (4 ppm of Cu), T=80° C., time=40.2 hr. Sample C3, 07-004-85 as macroinitiator The kinetics of the reaction and GPC results of the polymer samples during experiment are shown in FIG. 7. The chain extension of PMMA C3 with St was successful. Chain-end functionality of PMMA C3 is much higher than in PMMA C, 1, no bimodal distribution of molecular weight was observed after extension, only small tailing visible on GPC traces of the polymer samples taken during the experiment. This result proves that one reason of low chain-end functionality of PMMA C1 is the transfer reaction to $Sn(EH)_2$. Indicating that either ICAR ATRP or a non-transition metal based reducing agent has to be used in order to obtain PMMA with higher chain-end functionality Comparative Example C5

ICAR ATRP of MMA with AIBN as radical initiator. Run: 08-006-48. Scale: in 1 L reactor.

Conditions: MMA/DEBMM/$CuBr_2$/TPMA/AIBN=2400/1/0.025/0.03/0.2 in bulk (anisole as internal standard), (10 ppm of Cu), T=55° C., time=41.6 hours.

The kinetics of the reaction and GPC curves of the polymer samples taken during the experiment are shown in FIG. 8 indicating that the final polymer had a DP of 1414 and $M_{n(GPC)}$ 141,600. The polymerization was well controlled at the beginning. The final PDI, sample 3 was slightly higher than sample 2, but significant temperature fluctuations were encountered when higher conversion was attempted which indicates that the flask had been heated for too long resulting in an uncontrolled polymerization. This is a consequence of the high viscosity of the solution of the glassy polymer at low temperatures. Although high molecular weight was reached, chain-end functionality may be low due to overheated polymerization solution resulting in solid glassy polymer and a broken stirring rod.

Example 1. Polymerization of Methyl Methacrylate (MMA)

Polymerization of MMA was carried out first using the new 'feeding' method for ICAR ATRP. The best polymerization conditions were chosen from the computer modeling and tested in a 1 liter scale reactor. The temperature inside the reactor was followed using a thermocouple with a second thermocouple located outside the reactor, between the wall of the reactor and the heating mantle to provide additional information of the level of temperature control attained in the reaction. The difference in temperature between the two thermocouples can be related to the efficiency of heat transfer in this system. The efficiency of heat transfer may change significantly with viscosity and will affect the control of polymerization.

Another factor which computer modeling does not take into account is the rate of diffusion of the radical initiator after feeding into a viscous solution. The radical initiator should be evenly distributed before significant decomposition occurs. In order to investigate that, at different stages of the polymerization (when solution will become progressively more viscous), a colored dye will be injected and a time of its distribution will be evaluated (visually and/or spectroscopically). The results of this study will provide information on the distribution of injection sites required for optimal control in a large scale reactor.

Polymerization of MMA Using the Proposed Method

The results of the computer simulations were used as starting points for 10 test reactions. It was determined that an excess of ligand had to be used in order to get a controlled polymerization. Polymerizations revealed linear kinetics and molecular weights were close to theoretical values. However, when targeting low DP the PDI's remained quite broad, FIG. 9. Additional reactions were then performed to optimize synthesis of PMMA using the disclosed feeding method. The results and observations during the initial experiments indicated that the reason for poor results, broad PDI, is very low initiation efficiency of DEBMM in the ICAR ATRP system, a signal from the initiator was visible on GC traces even after several hours of reaction. For high DP polymers molecular weights were lower than theoretical values and PDI initially decreased with conversion but increased at high conversion, FIG. 10. Another observation was that the polymerization mixture was becoming cloudy with reaction time. This is probably the reason for loss of the control at the end of most of the polymerization reactions. It was determined that the selected ATRP initiator (DEBMM) was mostly responsible for side reaction and destabilization of the very low concentration of copper catalyst.

Therefore a more efficient initiator, BrPN, was tested in ICAR ATRP with feeding of AIBN and good results were obtained.

After performing the first reactions with MMA, the experimental and the simulated results were compared. Differences can be attributed to effects of heat transfer, viscosity, initiator diffusion, impurities, and the amount of air in the system. These observations indicate that the reactor should be equipped with a mechanical stirrer. In order to further reduce problems related to diffusion and heat transfer, reactions can be diluted (with monomer or solvent) and stopped at lower conversions (unreacted monomers (diluents) can be recovered and reused). Additional experiments were conducted in order to optimize the reaction conditions at this scale with a single source of added initiator. The parameters that were adjusted include: temperature, targeted DP, feed rate of radical initiator, concentration of reagents, and amount of Cu catalyst.

Example 2. Polymerization of n-Butyl Acrylate

Computer Simulations for Polymerization of n-Butyl Acrylate

A computer model similar to that shown in FIG. 2 was built and then polymerization simulations were performed for n-butyl acrylate (nBA). The main goal of the simulations was to find starting conditions for real polymerization experiments by varying several different parameters in the software; type of radical initiator, degree of polymerization DP, feeding rate of radical initiator.

One of the goals for new polymerization method with controlled feeding of the initiator/activator was to make polymerization reactions as fast as possible and at the same time still have a controlled process. As in the case of PMMA, evaluation of simulated results for PnBA was based on these factors and new evaluation scale was introduced. The scale was slightly different than that for MMA due to relatively faster reactions for nBA type monomer.

Relative Control Scale Description

Very good: conversion>99% after less than 6 hours reaction and PDI<1.15 and functionality>98%, with linear kinetics.

Good: conversion=95-99% after less than 10 hours reaction or PDI=1.15-1.20 or functionality=95-98%, Intermed.: conversion=80-95% after less than 20 hour PDI=1.20-1.25 or ftinctionality=85-95%, Poor: conversion<80% after less than 20 hour or PDI>1.25 or functionality<85%.

All rates and rate constants were adjusted for each simulated polymerization as reported in Table 1 presented below.

TABLE 1

| Exp. | Relative control | Conv. [%] | Time [h] | PDI | Funct. [%] | Comments |
|---|---|---|---|---|---|---|
| 25 | Good | 99.2 | 1.7 | 1.13 | 99 | Induction period was observed |
| 25a | Poor | 99.2 | 0.5 | 1.38 | 99 | High PDI |
| 25b | Very good | 99.2 | 1.2 | 1.15 | 99 | Very short induction period was observed |
| 26 | Good | 99.2 | 3.3 | 1.14 | 99 | Induction period was observed |
| 27 | Good | 99.2 | 2.6 | 1.12 | 99 | Induction period was observed |
| 28 | Good | 99.2 | 4.8 | 1.09 | 99 | Induction period was observed |
| 29 | Good | 99.2 | 4.3 | 1.11 | 99 | Induction period was observed |
| 30 | Intermediate | 99.2 | 7.5 | 1.08 | 99 | Induction period was observed |
| 31 | Good | 99.2 | 4.5 | 1.07 | 99 | Induction period was observed |
| 31a | Poor | 99.2 | 0.9 | 1.38 | 97 | High PDI |
| 32 | Intermediate | 99.2 | 11.3 | 1.04 | 99 | Induction period was observed |
| 32b | Intermediate | 99.2 | 1.4 | 1.21 | 98 | Medium PDI |
| 33 | Good | 99.2 | 6.0 | 1.07 | 99 | Induction period was observed |
| 34 | Intermediate | 99.2 | 13.4 | 1.04 | 99 | Induction period was observed |
| 35 | Poor | 45.5 | 6.0 | 1.09 | 99 | Slow reaction |
| 36 | Intermediate | 99.2 | 18.6 | 1.04 | 99 | Induction period was observed |
| 37 | Good | 99.2 | 1.9 | 1.16 | 99 | Induction period was observed |
| 38 | Good | 99.2 | 4.1 | 1.10 | 99 | Induction period was observed |
| 39 | Good | 99.2 | 2.9 | 1.18 | 99 | Induction period was observed |
| 40 | Good | 99.2 | 5.7 | 1.11 | 99 | Induction period was observed |
| 41 | Good | 99.2 | 4.2 | 1.19 | 99 | Induction period was observed |
| 42 | Good | 99.2 | 7.8 | 1.12 | 99 | Induction period was observed |
| 43 | Good | 99.2 | 4.9 | 1.09 | 99 | Induction period was observed |
| 44 | Intermediate | 99.2 | 12.8 | 1.04 | 99 | Induction period was observed |

TABLE 1-continued

| Exp. | Relative control | Conv. [%] | Time [h] | PDI | Funct. [%] | Comments |
|---|---|---|---|---|---|---|
| 45 | Good | 99.0 | 6.0 | 1.11 | 98 | Induction period was observed |
| 46 | Intermediate | 99.2 | 14.9 | 1.05 | 99 | Induction period was observed |
| 47 | Good | 92.4 | 6.0 | 1.12 | 99 | Induction period was observed |
| 48 | Intermediate | 99.2 | 17.8 | 1.06 | 99 | Induction period was observed |

In almost all cases resulting polymers had low PDI, high chain-end functionality and molecular weights close to theoretical values. High polymerization rates were observed for most of the reactions (even for high DP) and that's why most of simulations are rated here as good since non-linear kinetics were observed. In conclusion simulations for polymerization of nBA using new 'feeding' method were successful and optimal conditions were found; e.g. Simulations 25, 25a, (see FIG. 11) 26-29, 31, 33, 37-43, 45, 47. Overall, there was not a significant difference in terms of control over the polymerization when using lower or higher T, different radical initiator or different feeding rate. As expected, reactions were faster with V-70, with higher T or faster feeding rate. The positive effect of feeding of radical initiator for acrylates is much higher than for MMA or St, discussed below. When no feeding is applied (simulation 25a), polymerization is uncontrolled for nBA (high PDI), FIG. 1.

Conditions optimized using the computer software simulations were used in experiments on 1 L scale. Results obtained during these experiments for nBA are reported below.

Example 2A. Preparation of PnBA Via Starved Feeding ICAR ATRP

Four of the best polymerization conditions were chosen from the modeling stage and first tested in a 1 liter scale reactor. The experimental set up had one difference in comparison with MMA system; the reactor was equipped with a cooling coil, needed for safety reasons—as reactions with acrylates are more exothermic. As discussed in the background, we anticipate much less exothermic effects for the "starved" feeding method. The parameters that were adjusted are: temperature, targeted DP, feed rate of radical initiator, concentration of reagents, and amount of Cu catalyst.

Run: 08-006-57
Scale: 1 L reactor
Conditions: nBA/DEBMM/CuBr$_2$/TPMA/AIBN=2000/1/0.02/0.04/0.04 in bulk (anisole as internal standard), (10 ppm of Cu), T=90° C., time=7.5 hours.

The rate of addition of the AWN solution of 34.5 mg AIBN in 15 ml of toluene was 2 ml/h, which is equivalent to adding 0.01 eq. AIBN/h compared to the amount of ATRP initiator added. The initial volume of liquid in the reactor was 840 ml. After 3 hour and 10 minutes an exothermic reaction was noted in the temperature profile and addition of AIBN was stopped and cooling water started. Cooling was continued for one minute then stopped. The reaction temperature slowly returned to 90° C. and addition of the AIBN solution was resumed after 4 hours at a reduced rate of 1 ml/h and no further exothermic reaction was observed. The reaction was stopped after 7½ hours.

The kinetics of the reaction and GPC results of the experiment are shown in FIG. 12 indicating that the final polymer had a DP of 700 and a M$_{n(GPC)}$ 89,900 with a final PDI of 1.26.

The most critical observation was that the temperature of the polymerization was well controlled and in contrast to the results shown in FIG. 1 this reaction was not excessively exothermic as a consequence of the low absolute amount of AIBN added over the initial 3 hour period and when the instantaneous concentration of initiator exceeded the concentration of the formed $CuBr_2$/TPMA catalyst due to termination reactions the resulting exotherm could be readily controlled by stopping addition of initiator. The slower rate of termination at higher conversion resulting from increased viscosity required slower rate of addition of AIBN.

Therefore in this example it was determined that the concept of "starved" feeding of an initiator did provide improved control.

Example 2B. Polymerization of nBA

Polymerization conditions from simulation 37 were taken as a starting point for run 08-006-194 with feeding of V-70 at 70° C. Polymerization was very slow at the beginning (induction period) and after 2 h rate of polymerization significantly increased. Conversion reached 96% after only 4 hours reaction. This fast polymerization process was not well controlled. Although molecular weights were close to theoretical values. PDI was high (>1.7) and did not decrease with conversion. The induction was also clearly visible on every simulation. These results suggest that a significant amount of initiator has to be consumed before there is an increase in the rate of polymerization. Therefore in run 08-006-195 nBA a higher monomer to initiator ratio (DP=1000) was employed. It can be seen from FIG. 13 that control over the polymerization was significantly improved. As in the previous case, the kinetic plot was not linear but molecular weights were close to theoretical values. GPC traces were monomodal and shifting with reaction time. Molecular weight distribution of synthesized polymer decreased during the polymerization from PDI=1.78 to 1.31. The induction period was around 5 h and after this time a strong exothermic effect was observed as shown in FIG. 14. Temperature increased from 70° C. to 110° C. The exothermic effect was controlled by stopping addition of V-70 to the reaction mixture. After stopping the addition, polymerization stopped as well as any further increase of temperature inside of the reactor.

This experiment proves that 'feeding' method is safe for exothermic polymerization reactions. The control of the exothermic effect may be of great importance in terms of safety as well as control over molecular weight, PDI and functionality of final polymer material.

Additional examples for polymerization of nBA also targeted a higher DP and a small amount of V-70 was added at the beginning of polymerization process to reduce induction period. Polymerization of nBA with lower DP was also repeated with higher amount of copper catalyst. In both reactions a well controlled polymerization was observed.

Example 3. Polymerization of Styrene (St)

The polymerization of styrene via the new 'feeding' method for ICAR ATRP was performed using the same strategy as for MMA monomer. Four of the best polymerization conditions were chosen from the computer modeling stage and tested in a 1 liter scale reactor. After preliminary results, detailed in Table 2, were obtained additional experiments were performed with improved conditions.

The parameters which were adjusted are: temperature, targeted DP, feed rate of radical initiator, concentration of reagents, and amount of Cu catalyst.

TABLE 2

Experimental conditions and properties of PSt prepared by ICAR ATRP with feeding of AIBN or thermal initiation.[a]

| Run No. | T [° C.] | St | In | Cu [ppm] | $CuBr_2$ | Ligand | AIBN | AIBN Feeding rate [eq./h] | Time (min) | Conv. (%) | $M_{n, theo}$[b] | $M_{n, GPC}$ | $M_w/M_n$ |
|---|---|---|---|---|---|---|---|---|---|---|---|---|---|
| 08-006-185 (old result) | 120 | 100 | 1 DEBMM | 50 | 0.005 | 0.1 TPMA | 0.0025 | 0 Thermal initiation | 60 | 0.11 | 1100 | 1100 | 1.28 |
| | | | | | | | | | 120 | 0.20 | 2100 | 1700 | 1.27 |
| | | | | | | | | | 240 | 0.36 | 3700 | 2800 | 1.27 |
| | | | | | | | | | 520 | 0.47 | 4900 | 3500 | 1.27 |
| | | | | | | | | | 640 | 0.48 | 5000 | 3600 | 1.27 |
| 08-006-190 | 100 | 100 | 1 DEBMM | 50 | 0.005 | 0.1 TPMA | 0 | 0.004 (3.33 ml/h) | 40 | 0.02 | 200 | 500 | 1.35 |
| | | | | | | | | | 90 | 0.05 | 500 | 900 | 1.28 |
| | | | | | | | | | 180 | 0.12 | 1300 | 1400 | 1.25 |
| | | | | | | | | | 300 | 0.27 | 2800 | 3200 | 1.20 |
| | | | | | | | | | 630 | 0.56 | 5600 | 6100 | 1.16 |
| 08-006-192 | 100 | 100 | 1 DEBMM | 50 | 0.005 | 0.1 TPMA | 0.005 | 0.008 (3.33 ml/h) | 30 | 0.10 | 1000 | 800 | 1.39 |
| | | | | | | | | | 90 | 0.17 | 1700 | 1700 | 1.28 |
| | | | | | | | | | 180 | 0.32 | 3300 | 2700 | 1.23 |
| | | | | | | | | | 300 | 0.49 | 5100 | 4800 | 1.18 |
| | | | | | | | | | 540 | 0.81 | 8400 | 7700 | 1.15 |
| 08-006-193 | 100 | 1000 | 1 DEBMM | 50 | 0.05 | 0.15 TPMA | 0.025 | 0.008 (3.33 ml/h) | 40 | 0.02 | 1600 | 2300 | 1.32 |
| | | | | | | | | | 90 | 0.04 | 4600 | 4700 | 1.19 |
| | | | | | | | | | 200 | 0.10 | 10600 | 9200 | 1.15 |
| | | | | | | | | | 310 | 0.16 | 16600 | 14700 | 1.14 |
| | | | | | | | | | 540 | 0.24 | 24500 | 20100 | 1.12 |
| | | | | | | | | | 1240 | 0.25 | 26400 | 20900 | 1.12 |
| | | | | | | | | | 1300 | 0.26 | 27200 | 23300 | 1.11 |
| | | | | | | | | | 1420 | 0.37 | 38100 | 25200 | 1.15 |
| | | | | | | | | | 1600 | 0.46 | 47500 | 31900 | 1.15 |
| | | | | | | | | | 1840 | 0.57 | 59500 | 37700 | 1.18 |

[a] polymerizations were performed in bulk in 1 L reactor with overall volume of 850 ml and with 5% of DMF as the internal standard;
[b] $M_{n, theo} = ([M]_0/[In]_0) \times$ conversion.

The polymerization kinetics were followed by measuring the rate of disappearance of monomer by gas chromatography (GC) and/or by nuclear magnetic resonance (NMR). The synthesized polymers will be characterized by gel permeation chromatography (GPC). Successful polymerization of monomer M should result in polymer P(M) with monomodal and narrow molecular weight distribution (PDI<1.4). Molecular weight of the synthesized polymers should be close to theoretical values as predicted from equation 2:

$$M_{n,theo}=([M]_0/[R-X]_0) \times \text{conversion} \times M_{monomer}. \quad (2)$$

Examples for Polymerization of Styrene Using the Proposed Method

The computer model was build and then polymerization simulations were performed for styrene (St). Table 2 presents all of the results for polymerization of St using ICAR ATRP with feeding of AIBN. In experiment WJ-08-008-190 St was polymerized in the presence of DEBMM as initiator with 50 ppm of $CuBr_2$ and excess of TPMA. Polymerization was carried at 100° C. and AIBN was fed at 0.004 eq. vs. DEBMM per hour. Polymerization reached 56% conversion in 10.5 h. Linear kinetics, were observed and molecular weights were very close to the theoretical values. In this experiment PDI decreased during the reaction time from 1.35 to 1.16. Overall, the process was fully controlled.

In the second reaction, WJ-08-006-192, FIG. 15, a higher addition rate of AIBN was applied in order to accelerate rate of polymerization. In addition, a small amount of AIBN was added at t=0 to the reaction mixture in order to reduce most of Cu(II) to Cu(I) at the beginning stage of polymerization. Polymerization was almost two times faster reaching 81% conversion in 9 hour. The kinetic plot has linear dependence and molecular weights are close to theoretical values. GPC traces are monomodal and are shifting with reaction time. Molecular weight distribution of synthesized polymers decreased during polymerization from 1.39 to 1.15. This data proves that process was fully controlled.

In final reaction reported in Table 2, reaction (WJ-08-006-193), polymerization of St was performed targeting a higher DP. St was polymerized in the presence of DEBMM as initiator with 50 ppm of CuBr2 and excess of TPMA. Polymerization was carried at 100° C. and AISN was fed at 0.008 eq. vs. DEBMM per hour. FIG. 16 shows kinetic plot for this reaction. After 9 h the addition of AIBN was stopped and heating was turned off. It can be seen from FIG. 16 that the polymerization process stopped immediately after stopping addition of the initiator. The reactor was allowed to cool down overnight (no cooling system applied) and heated again after 21.6 h up to 110° C. At this time feeding of AIBN was restarted with the same addition rate. It can be seen from the kinetic plot, FIG. 17 and molecular weights vs. conversion plot FIG. 16, that this reaction was restarted in fully controlled way.

Due to higher temperature in second phase of the reaction the rate of polymerization was higher. FIG. 16 also shows temperature inside as well as outside of the reactor, thermocouples were placed inside polymerization mixture and on the outer wall of the reactor. The temperature profile indicates good heat transfer as the difference in temperature from both thermocouples is similar and does not increase at any time during the reaction.

This set of data proves that the new 'feeding' process can be fully automated and that ICAR ATRP with controlled feeding can be successfully applied in synthesis of PSt with low as well high DP's.

Therefore in one embodiment of the invention we disclose how the rate of decomposition of the added free radical initiator is one factor controlling the rate of the CRP and the level of control over the molecular weight, molecular weight distribution and chain end functionality in the formed (co)polymer.

Another embodiment of the invention discloses that if the temperature of the reaction medium moves above the target temperature and the addition of the initiator/reducing agent is terminated, there is no further exotherm and, once the temperature drops to the target temperature, the feeding of the initiator/reducing agent can be started to reinitiate the polymerization reaction.

Another embodiment of the disclosed process is directed towards continuous control over the concentration of the persistent radical in a NMP. In this embodiment the rate of decomposition of the added initiator is selected to match the rate of radical/radical termination reactions that would otherwise build up the concentration of the stable free radical and reduce the rate of propagation.

A further embodiment of the disclosed process concerns RAFT polymerizations. In a RAFT polymerization the rate of polymerization is controlled by the rate of added initiator. Normally all of the initiator is added to the reaction at the beginning of the reaction and this could lead to an increased rate of initiator decomposition if the temperature of the reaction is not well controlled throughout the polymerization vessel during each stage of the reaction.

In another embodiment of the invention a photoresponsive initiator is employed and the rate of radical generation is controlled by intermittent controlled photo-stimulation.

While preferred embodiments of the present invention have been shown and described herein, it will be obvious to those skilled in the art that such embodiments are provided by way of example only. It is intended that the following claims define the scope of the invention and that methods and structures within the scope of these claims and their equivalents be covered thereby.

What is claimed is:

1. A RAFT polymerization process, comprising:
   i) initiating RAFT polymerization by adding a reducing agent to a RAFT polymerization mixture comprising a RAFT agent and at least a first free-radically polymerizable compound; and
   ii) mitigating uncontrolled polymerization reactions during the RAFT polymerization process by adding further amounts of the reducing agent at a controlled rate of addition to generate or regenerate the activated RAFT agent; and
   wherein the reducing agent is added at polymerization conditions at which the reducing agent has an activation-dependent $t_{1/2}$ value of between 30 sec. and 30 min; and
   wherein the controlled rate of addition is adjusted to maintain the polymerization conditions at which the reducing agent has an activation-dependent $t_{1/2}$ value of between 30 sec. and 30 min.

2. The RAFT polymerization process of claim 1, wherein the controlled rate of addition further controls: i) the rate of polymerization of the RAFT polymerization process; or ii) the temperature of the RAFT polymerization process.

3. The RAFT polymerization process of claim 1, wherein the controlled rate of addition:
   a) controls propagation of polymeric chains formed in the RAFT polymerization mixture;
   b) maintains the RAFT polymerization mixture at a targeted rate of polymerization;

c) maintains the RAFT polymerization mixture at a targeted polymerization temperature;
d) allows conversion of the at least first free-radically polymerizable compound to exceed 80% conversion;
e) reduces the termination of RAFT polymerization; or
f) a combination thereof.

4. The RAFT polymerization process of claim 1, wherein the controlled rate of addition is adjusted continuously or intermittently to maintain one or more of the targeted rate of polymerization and the targeted polymerization temperature.

5. The RAFT polymerization process of claim 1, wherein the controlled rate of addition comprises one or more of a continuous addition, an intermittent addition, or an adjustable addition.

6. The RAFT polymerization process of claim 1, wherein the reducing agent comprises an activated reducing agent, a non-activated reducing agent, or a combination thereof.

7. The RAFT polymerization process of claim 6, wherein the activated reducing agent comprises a radical species generated from the decomposition of azo-containing compound, a peroxide compound, a peroxy acid, or a combinations thereof.

8. The RAFT polymerization process of claim 6, wherein the non-activated reducing agent comprises one or more of an azo-containing compound, a peroxide compound, and a peroxy acid.

9. The RAFT polymerization process of claim 1, wherein the reducing agent comprises one or more of: 2,2'-azobis(2-methylpropionitrile) (MEM); a peroxide; a peroxy acid; tert-butyl peracetate; 1,1-bis(tert-butylperoxy)-3,3,5-(dibutylphthalate)trimethylcyclohexane; 2,2'-azobis(4-methoxy-2.4-dimethyl valeronitrile) (V-70); 2,2'-azobis(2,4-dimethylvaleronitrile) (V-65); dimethyl 2,2'-azobis(2-methylpropionate) (V-601); 2,2'-azobis(2-methylbutyronitrile) (V-59); 1,1'-azobis(cyclohexane-1-carbonitrile) (V-40); or 2,2'-azobis[N-(2-propenyl)-2-methylpropionamide] (VF-096).

10. The RAFT polymerization process of claim 1, wherein the at least first free-radically polymerizable compound comprises an unsaturated monomer.

11. The RAFT polymerization process of claim 10, wherein the unsaturated monomer is a hydrophilic unsaturated monomer.

12. The RAFT polymerization process of claim 10, wherein the unsaturated monomer is a hydrophobic unsaturated monomer.

13. The RAFT polymerization process of claim 1, wherein the RAFT agent comprises a dithioester.

14. The RAFT polymerization process of claim 1, wherein the RAFT polymerization process is:
a) conducted in a bulk polymerization process;
b) performed in the presence of a solvent;
c) is conducted from solid surfaces; or
d) a combination thereof.

15. The RAFT polymerization process of claim 1 is conducted in one or more of a biphasic polymerization process, an emulsion polymerization process, a mini-emulsion polymerization process, a microemulsion polymerization process, a reverse emulsion polymerization process, or a suspension polymerization process.

16. The RAFT polymerization process of claim 1, wherein the resulting polymer is a linear polymer or copolymer, a branched polymer or copolymer, a block copolymer, a brush polymer or copolymer, a star polymer or copolymer, or a star macromolecule.

17. The RAFT polymerization process of claim 1, wherein uncontrolled exothermic reactions are mitigated in intensity, duration, or frequency during the RAFT polymerization process.

18. The RAFT polymerization process of claim 1 allows conversion of the at least first free-radically polymerization compound to exceed about 90%, or greater, conversion.

* * * * *

UNITED STATES PATENT AND TRADEMARK OFFICE
CERTIFICATE OF CORRECTION

PATENT NO. : 11,390,696 B2  
APPLICATION NO. : 16/525289  
DATED : July 19, 2022  
INVENTOR(S) : Wojciech Jakubowski et al.

Page 1 of 1

It is certified that error appears in the above-identified patent and that said Letters Patent is hereby corrected as shown below:

In the Claims

Column 41, Line 20, Claim 7, change "of azo-containing" to --of an azo-containing--;

Column 41, Lines 21-22, Claim 7, change "or a combinations" to --or a combination--; and Column 41, Line 29, Claim 9, change "(MEM)" to --(AIBN)--.

Signed and Sealed this  
Thirteenth Day of September, 2022

Katherine Kelly Vidal  
*Director of the United States Patent and Trademark Office*